United States Patent
Leiby

(10) Patent No.: US 11,363,247 B2
(45) Date of Patent: Jun. 14, 2022

(54) MOTION SMOOTHING IN A DISTRIBUTED SYSTEM

(71) Applicant: Valve Corporation, Bellevue, WA (US)

(72) Inventor: Aaron Leiby, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/792,080

(22) Filed: Feb. 14, 2020

(65) Prior Publication Data
US 2021/0258555 A1 Aug. 19, 2021

(51) Int. Cl.
| | |
|---|---|
| H04N 13/139 | (2018.01) |
| H04N 13/161 | (2018.01) |
| H04N 19/182 | (2014.01) |
| H04N 19/517 | (2014.01) |
| H04N 13/194 | (2018.01) |
| G06F 3/01 | (2006.01) |
| G06T 17/20 | (2006.01) |
| G06T 19/00 | (2011.01) |
| H04N 13/00 | (2018.01) |

(52) U.S. Cl.
CPC .......... *H04N 13/139* (2018.05); *G06F 3/011* (2013.01); *G06T 17/20* (2013.01); *G06T 19/006* (2013.01); *H04N 13/161* (2018.05); *H04N 13/194* (2018.05); *H04N 19/182* (2014.11); *H04N 19/517* (2014.11); *H04N 2013/0085* (2013.01)

(58) Field of Classification Search
None
See application file for complete search history.

(56) References Cited

U.S. PATENT DOCUMENTS

| | | | | |
|---|---|---|---|---|
| 6,920,415 | B1 * | 7/2005 | Litke | G06T 17/20 |
| | | | | 345/423 |
| 8,269,770 | B1 * | 9/2012 | Carr | G06T 17/20 |
| | | | | 345/423 |
| 8,902,254 | B1 * | 12/2014 | Laughlin | G06T 19/006 |
| | | | | 345/633 |
| 9,401,044 | B1 * | 7/2016 | Kaufman | G06T 15/04 |
| 10,701,247 | B1 * | 6/2020 | Hossain | G06T 3/0056 |

(Continued)

OTHER PUBLICATIONS

PCT Search Report and Written Opinion for PCT Application No. PCT/US21/17967, dated Mar. 18, 2021, 9 pages.

(Continued)

*Primary Examiner* — Stefan Gadomski
(74) *Attorney, Agent, or Firm* — Lee & Hayes, P.C.

(57) ABSTRACT

Described herein are motion smoothing techniques for a display, or display system, such as a head-mounted display (HMD), to account for motion of moving or animating objects in a way that mitigates judder. The display system may be separate from, yet communicatively coupled to, a host computer where a graphics-based application, such as a video game, is outputting frames for rendering on the display system. The host computer may generate motion vectors representing compressed pixel data for transmission to the display system. The motion vectors can be used by the display system to modify pixel data of a frame. The modified pixel data for the frame is "motion-smoothed" for rendering on the display system in a manner that mitigates judder of moving or animating objects.

20 Claims, 20 Drawing Sheets

(56) References Cited

U.S. PATENT DOCUMENTS

| | | | |
|---|---|---|---|
| 10,854,012 B1* | 12/2020 | Iyer | G06T 17/05 |
| 2002/0113752 A1 | 8/2002 | Sullivan et al. | |
| 2007/0110417 A1 | 5/2007 | Itokawa | |
| 2008/0240617 A1* | 10/2008 | Douniwa | H04N 5/145 |
| | | | 382/300 |
| 2009/0109342 A1 | 4/2009 | Heng et al. | |
| 2009/0213131 A1* | 8/2009 | Rose | G06T 17/20 |
| | | | 345/581 |
| 2011/0227923 A1* | 9/2011 | Mariani | G06K 9/00208 |
| | | | 345/427 |
| 2011/0298799 A1* | 12/2011 | Mariani | G06K 9/6209 |
| | | | 345/420 |
| 2012/0021828 A1 | 1/2012 | Raitt et al. | |
| 2012/0182299 A1 | 7/2012 | Bowles et al. | |
| 2013/0083854 A1 | 4/2013 | Pace | |
| 2013/0300741 A1* | 11/2013 | Schmidt | G06T 19/20 |
| | | | 345/420 |
| 2014/0184598 A1* | 7/2014 | Quilot | G06T 17/205 |
| | | | 345/423 |
| 2014/0184599 A1* | 7/2014 | Quilot | G06T 17/10 |
| | | | 345/423 |
| 2014/0307787 A1 | 10/2014 | Zheng et al. | |
| 2014/0362240 A1 | 12/2014 | Klivington et al. | |
| 2016/0055640 A1* | 2/2016 | Menozzi | G02B 27/0093 |
| | | | 345/633 |
| 2016/0189429 A1* | 6/2016 | Mallinson | H04N 13/398 |
| | | | 345/633 |
| 2016/0350965 A1 | 12/2016 | Lum et al. | |
| 2017/0032560 A1* | 2/2017 | Dionne | G06T 17/20 |
| 2017/0115488 A1* | 4/2017 | Ambrus | G06T 11/60 |
| 2017/0124760 A1* | 5/2017 | Murakawa | G06T 15/205 |
| 2017/0213388 A1* | 7/2017 | Margolis | G06T 19/006 |
| 2017/0285736 A1* | 10/2017 | Young | G06F 3/013 |
| 2017/0287112 A1* | 10/2017 | Stafford | G06F 3/013 |
| 2017/0295373 A1* | 10/2017 | Zhang | H04N 19/176 |
| 2017/0301140 A1* | 10/2017 | Smith | G06T 19/006 |
| 2017/0374341 A1 | 12/2017 | Michail et al. | |
| 2018/0005449 A1* | 1/2018 | Wallner | G06T 19/006 |
| 2018/0108110 A1* | 4/2018 | Cuervo | G02B 27/017 |
| 2018/0144547 A1* | 5/2018 | Shakib | G06T 15/60 |
| 2018/0220119 A1* | 8/2018 | Horvitz | H04N 21/234363 |
| 2018/0240272 A1* | 8/2018 | Doolittle | G06T 3/40 |
| 2018/0252922 A1* | 9/2018 | Fujimaki | A63F 13/212 |
| 2018/0315248 A1* | 11/2018 | Bastov | G06T 19/006 |
| 2019/0042832 A1* | 2/2019 | Venshtain | G06K 9/00201 |
| 2019/0045213 A1* | 2/2019 | Raut | H04N 19/109 |
| 2019/0108681 A1* | 4/2019 | McBeth | G06T 15/005 |
| 2019/0180504 A1* | 6/2019 | Pomerantz | H04N 13/00 |
| 2019/0199467 A1* | 6/2019 | Vu | H04L 1/0017 |
| 2019/0238854 A1* | 8/2019 | Yeung | H04N 19/139 |
| 2019/0251696 A1* | 8/2019 | Wang | G02B 27/017 |
| 2019/0318548 A1* | 10/2019 | Kim | G06T 7/251 |
| 2019/0325644 A1* | 10/2019 | Bleyer | G06T 15/205 |
| 2019/0333263 A1* | 10/2019 | Melkote Krishnaprasad | |
| | | | G06F 3/012 |
| 2019/0340812 A1* | 11/2019 | Fuetterling | G06T 15/005 |
| 2019/0358541 A1* | 11/2019 | Bronder | H04N 19/513 |
| 2019/0373287 A1* | 12/2019 | Lim | H04N 19/46 |
| 2020/0020132 A1* | 1/2020 | Sinharoy | G06T 3/40 |
| 2020/0059668 A1* | 2/2020 | Ikonin | H04N 19/43 |
| 2020/0104975 A1* | 4/2020 | Banerjee | G06T 9/00 |
| 2020/0111195 A1 | 4/2020 | Vlachos et al. | |
| 2020/0169744 A1* | 5/2020 | Lee | H04N 19/109 |
| 2020/0177916 A1* | 6/2020 | Niamut | A01C 3/023 |
| 2020/0226831 A1* | 7/2020 | Su | G06T 19/20 |
| 2020/0241299 A1* | 7/2020 | Nuber | G06F 3/0304 |
| 2020/0241634 A1* | 7/2020 | Iyer | G02B 27/017 |
| 2020/0242834 A1* | 7/2020 | Chachek | G06K 9/6206 |
| 2020/0244996 A1* | 7/2020 | Iyer | G01C 21/165 |
| 2020/0249748 A1* | 8/2020 | Ranganathan | G06F 3/012 |
| 2020/0249749 A1* | 8/2020 | Akman | G06F 3/0346 |
| 2020/0258315 A1* | 8/2020 | Li | G02B 27/017 |
| 2020/0280739 A1* | 9/2020 | Fitzgerald | G06T 9/20 |
| 2020/0288164 A1* | 9/2020 | Lin | H04N 21/44218 |
| 2020/0311983 A1* | 10/2020 | Mavridis | H04N 19/597 |
| 2020/0333940 A1* | 10/2020 | Lee | G09B 23/28 |
| 2020/0336762 A1* | 10/2020 | Lee | H04N 19/182 |
| 2020/0357177 A1* | 11/2020 | Park | G06T 17/20 |
| 2020/0364901 A1* | 11/2020 | Choudhuri | G02B 27/0179 |
| 2020/0368616 A1* | 11/2020 | Delamont | A63F 13/25 |
| 2020/0380762 A1* | 12/2020 | Karafin | G06T 15/005 |
| 2021/0019953 A1* | 1/2021 | Pekelny | G06T 19/20 |

OTHER PUBLICATIONS

Office Action for U.S. Appl. No. 16/155,686, dated Dec. 26, 2019, Vlachos, "Motion Smoothing for Reprojected Frames", 24 Pages.
PCT Search Report and Written Opinion dated Dec. 2, 2019 for PCT Application No. PCT/US2019/053528, 13 pages.
Yuan et al, "Simplified and Tessellated Mesh for Relatime High Quality Rendering", retrieved on Nov. 9, 2019 at <<https://www.sciencedirect.com/science/article/abs/pii/S0097849315001144>>, Computers & Graphics, vol. 54, Feb. 2016, 13 pages.

* cited by examiner

BEFORE MOTION SMOOTHING

AFTER MOTION SMOOTHING

MOTION SMOOTHING IN A DISTRIBUTED SYSTEM

BACKGROUND

Virtual reality (VR) systems are used both within and outside of the video game industry. VR systems can be setup as all-in-one (or standalone) VR headsets or as distributed systems. In a distributed setup a VR headset may be either physically tethered or wirelessly connected to a host computer. In this distributed setup, the host computer typically executes a graphics-based application, such as a video game, that outputs frames, and the VR headset displays the frames as they are streamed from the host computer. This type of setup leverages the high-computing capacity of the host computer to display high-quality imagery on a lightweight VR headset that functions much like a "thin-client" device. Furthermore, displays for VR systems, such as those embedded in a VR headset, typically operate at a minimum refresh rate that is suitable for VR applications. For instance, 90 Hertz (Hz) is a common refresh rate for VR displays. In a "live rendering" scenario, the graphics-based application outputs frames for rendering at a frame rate that matches the refresh rate of the display. In this scenario, assuming that frames are being transferred from the host computer to the VR headset at a sufficient data transfer rate, a new frame output by the application (referred to herein as an "actual frame") can be displayed at every screen refresh. Such a live rendering scenario is often referred to as the application "hitting frame rate."

In practice, an application does not always hit frame rate for various reasons. For example, the application may intermittently drop a frame, and/or the application may temporarily output frames at a slower rate (e.g., 45 frames per second when the ideal frame rate is 90 frames per second). Moreover, in distributed systems, network congestion may introduce latency in rate at which data is transferred from the host computer to the VR headset. In these situations, a technique called "rotation-only re-projection" can be used to replace missing frames with re-projected frames in a way that accounts for the user's head rotation, making it appear to the user as if there are no missing frames. Without re-projection, for example, a deficient frame rate from the application, or late arrival of frames at the VR headset, may cause in-game stuttering or hitching. In VR applications, where the user is fully immersed in the virtual environment, the user can become nauseous if frames are missed and there is no re-projection to compensate for the missing frames. Thus, re-projection is a technique that allows for a better user experience when frames are missed. Consider an example where the application is outputting frames at half the ideal frame rate (e.g., 45 frames per second where 90 frames per second is the ideal frame rate). In this example, every other frame can be re-projected using pixel data from the most recently-rendered actual frame to create a re-projected frame that transforms the scene (e.g., through rotation and re-projection calculations) to match the re-projected scene to the user's current head orientation. This makes it look to the user as if the scene is moving in a way that is expected given the user's head rotation, even when re-projected frames are used to compensate for missing frames.

Although rotation-only re-projection prevents in-game stuttering or hitching, it produces its own unwanted visual artifacts during head rotation, at least in VR systems that use low-persistence displays (e.g., where the display is illuminated for a small fraction of the frame time). For example, although rotation-only re-projection accounts for head rotation, it does not account for virtual objects that move or animate in the scene between frames. This can cause an unwanted visual artifact called "judder" to occur with respect to moving or animating objects. Judder causes the user to perceive a "double ghosting effect" where a moving object (e.g., a bullet or a ball moving across the screen) appears to bounce between two locations (or separate from itself) frame-to-frame. Accordingly, when the user rotates his/her head while re-projection is being used, any moving or animating objects in the scene will judder.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIG. 1 illustrates a motion smoothing technique that can be implemented during re-projection to account for moving or animating objects in a scene.

DETAILED DESCRIPTION

Figure 1:
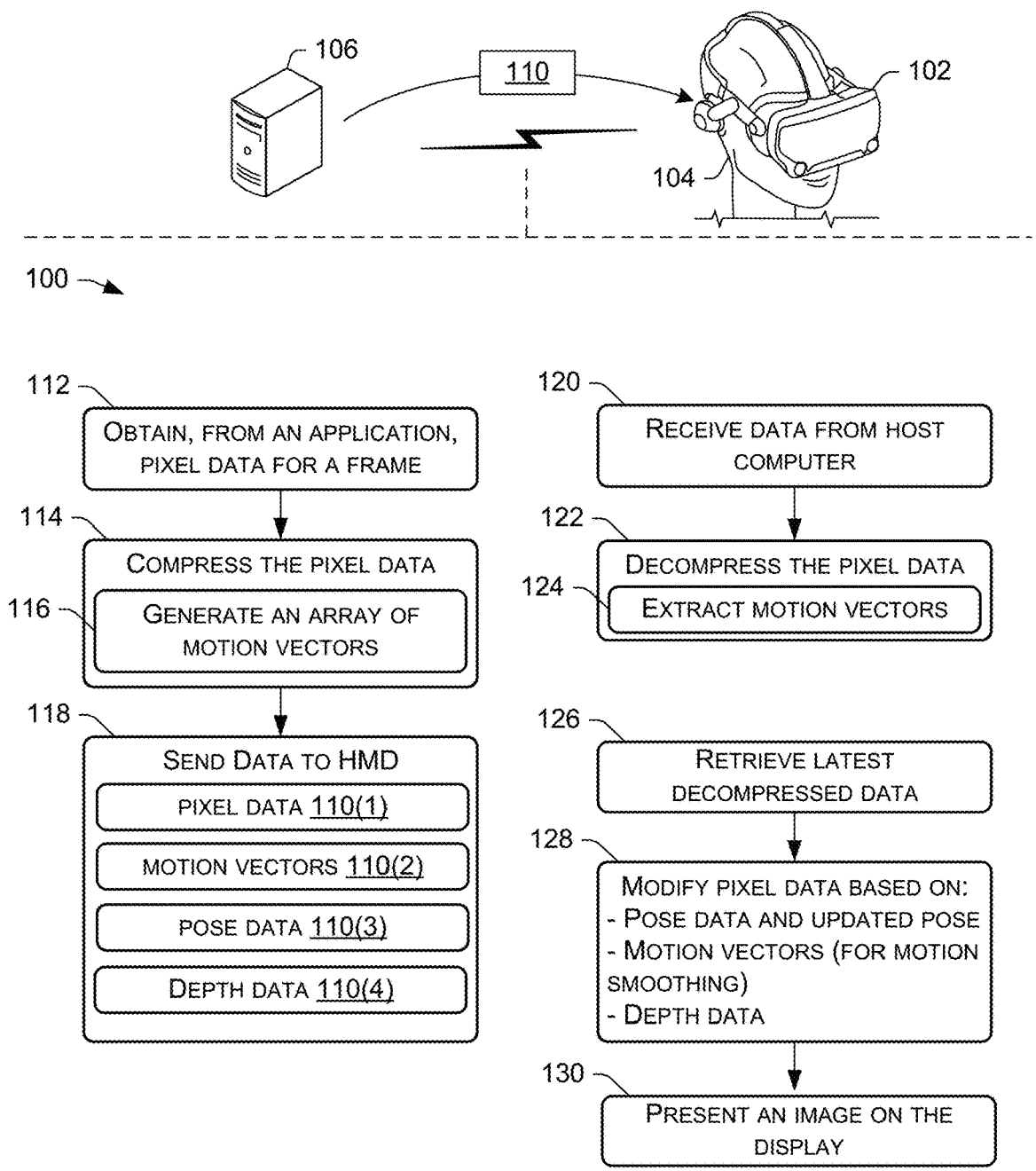
FIG. 1 is a flow diagram of an example process for rendering frames on a head-mounted display (HMD) as frames are output by an application executing on a host computer that is communicatively coupled to the HMD, in accordance with embodiments disclosed herein.

Described herein are, among other things, motion smoothing techniques to account for moving or animating objects in a scene when rendering frames on a display of a distributed system. The motion smoothing techniques described herein mitigate unwanted visual artifacts with respect to moving or animating objects, such as the aforementioned judder artifact for moving or animating objects. A head-mounted display (HMD) is an example type of display, or display system, that can implement the disclosed motion smoothing techniques when rendering images on the display. A HMD may be worn by a user for purposes of immersing the user in a virtual reality (VR) environment or an augmented reality (AR) environment. The display, or display system, such as the HMD, may be separate from, yet communicatively coupled to, a host computer. An application (e.g., a video game) executes on the host computer and generates pixel data for individual frames of a series of frames. Pixel data is sent to the HMD frame-by-frame, and one or more display panels of the HMD render images based on the received pixel data. These images are viewed by a user through the optics that are included in the HMD, making the user perceive the images as if the user was immersed in a VR or AR environment.

As mentioned, the display system, such as the HMD, may utilize a technique called "re-projection" to compensate for the application failing to hit frame rate. For example, re-projected frames can be rendered between actual frames to achieve an ideal frame rate, and each re-projected frame can be generated using pixel data from a recently-rendered actual frame that was output by an application executing on the host computer (e.g., the most recently-rendered actual frame). In the re-projected frame, a scene rendered in the previous actual frame is transformed (e.g., through rotation and re-projection calculations) in a way that accounts for the user's head rotation.

Described herein are motion smoothing techniques that are usable in a distributed system to modify pixel data for frames in a way that further accounts for the motion of objects that move or animate frame-to-frame. The motion smoothing techniques described herein use computer vision algorithms to estimate the motion (e.g., direction and magnitude) of objects over multiple frames in the form of motion vectors. For example, an array of motion vectors can be generated by the host computer as a result (e.g., as a byproduct) of compressing pixel data before the pixel data is transmitted to a display system, such as a HMD. Accordingly, the array of motion vectors may represent compressed pixel data, at least for some of the frames in a series of frames. In an illustrative example, a video encoder (e.g., the video encode chip) of a graphics processing unit (GPU) on the host computer may analyze pixel data of multiple, previously-rendered frames to generate an array of motion vectors that represent compressed pixel data for a given frame. The motion vectors can be sent to the HMD and, in addition to using the motion vectors to obtain decompressed pixel data, the motion vectors may also be used by the HMD to modify the decompressed pixel data in a way that accounts for moving or animating objects. Said another way, the motion vectors received from the host computer can be used on the HMD to extrapolate (from the object's motion in the previously-rendered frames) where the object should be located in a to-be-rendered (e.g., re-projected) frame so that judder of the moving object is mitigated.

In an example motion smoothing process, pixel data associated may be compressed on a host computer. A video encoder of a graphics processing unit (GPU) on the host computer may be used to compress the pixel data. As a result of compressing the pixel data, the video encoder may generate an array of motion vectors that represent the compressed pixel data. The host computer may send the array of motion vectors to a display system, such as a HMD. In some embodiments, the host computer may be wirelessly coupled to the HMD, but a wired connection is also contemplated herein. The HMD may receive, from the host computer, the array of motion vectors. The HMD may decompress the compressed first pixel data to obtain the pixel data (or, an approximation of the pixel data using a decompression or decoding algorithm). The HMD may further modify the pixel data based at least in part on the array of motion vectors received from the host computer to obtain modified pixel data. This modified pixel data is "motion-smoothed" in order to mitigate, if not eliminate, any judder with respect to moving or animating objects in the scene. The motion-smoothed frame can then be rendered by presenting an image on the display panel(s) of the HMD based at least in part on the modified pixel data.

The motion smoothing techniques described herein provide a more realistic, higher-fidelity viewing experience where objects move or animate within the scene in an expected fashion, even when a frame is missed. As mentioned, a frame may be missed when the application fails to hit frame rate, if network congestion arises, or possibly for other reasons. Accordingly, the motion smoothing techniques described herein compensate for these occurrences by maintaining a high-fidelity user experience in a distributed system when frames can be missed at times. The motion smoothing techniques also compensate for inherent latency in the transmission of frames, even in a live-rendering scenario when frames are not missed (i.e., when frames are received in a timely manner at the HMD). Furthermore, in wireless implementations, the techniques described herein enable motion smoothing correction in a wireless HMD, without having to add more components to the HMD, thereby allowing for a lighter-weight headset that does not get too hot and is more comfortable to wear, as compared to many all-in-one (or standalone) headsets on the market today. Furthermore, the techniques and systems described herein can leverage the motion vectors that are already generated for compressing and transmitting data from the host computer to the HMD, which means that there is no additional transport cost in using the motion vectors for motion smoothing of re-projected frames on the HMD.

It is to be appreciated that the array of motion vectors received from host computer can be used by the HMD to extrapolate to a future frame (e.g., a re-projected frame) because modified second pixel data is output to a frame buffer on the HMD after outputting first pixel data to the frame buffer. In this manner, in the examples described herein, the first frame is rendered before a re-projected frame. This extrapolation technique can be contrasted with interpolating between frames, and it is to be appreciated that the techniques and systems described herein pertain to using motion vectors received from a host computer to extrapolate to a future frame, as opposed to using the motion vectors for interpolating between frames.

Also disclosed herein are systems, for example, systems including a display system (e.g., a HMD), configured to implement the techniques and processes disclosed herein, as well as non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like. Furthermore, although a HMD is provided as an example of a display system for displaying images, it is to be appreciated that other types of display systems may benefit from the motion smoothing techniques described herein, such as handheld display devices that stream video content from a host computer, relatively large, wall-mounted or billboard display systems, and the like.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 1 is a flow diagram of an example process 100 for rendering frames on a head-mounted display (HMD) 102 (worn by a user 104) as frames are output by an application executing on a host computer 106 that is communicatively coupled to the HMD 102, in accordance with embodiments disclosed herein. FIG. 1 illustrates a motion smoothing technique that can be implemented during re-projection to account for moving or animating objects in a scene.

At the top of FIG. 1, a HMD 102 is shown as being worn by a user 104, and a host computer 106 is shown as being communicatively coupled to the HMD 102. The host computer 106 can be implemented as any type of computing device and/or any number of computing devices, including, without limitation, a personal computer (PC), a laptop computer, a desktop computer, a portable digital assistant (PDA), a mobile phone, tablet computer, a set-top box, a game console, a server computer, a wearable computer (e.g., a smart watch, etc.), or any other electronic device that can transmit/receive data.

The host computer 106 and the HMD 102 collectively represent a distributed system for executing an application (e.g., a video game) and rendering associated images on a display. In some embodiments, the host computer 106 may be collocated in the same environment as the HMD 102, such as a household of the user 104 wearing the HMD 102. Alternatively, the host computer 106 may be remotely located with respect to the HMD 102, such as a host computer 106 in the form of a server computer that is located in a remote geographical location with respect to the geographical location of the HMD 102. In a remote host computer 106 implementation, the host computer 106 may be communicatively coupled to the HMD 102 via a wide-area network, such as the Internet. In a local host computer 106 implementation, the host computer 106 may be collocated in an environment (e.g., a household) with the HMD 102, whereby the host computer 106 and the HMD 102 may be communicatively coupled together either directly or over a local area network (LAN) via intermediary network devices.

By being communicatively coupled together, the HMD 102 and the host computer 106 are configured to work together in a collaborative fashion to render a given frame by generating pixel data that is used to present a corresponding image(s) on a display panel(s) of the HMD 102. The host computer 106 and the HMD 102 may be communicatively coupled together wirelessly and/or via a wired connection. For example, the devices 102/106 may exchange data using Wi-Fi, Bluetooth, radio frequency (RF), and/or any other suitable wireless protocol. Additionally, or alternatively, the devices 102/106 may include one or more physical ports to facilitate a wired connection for data transfer therebetween.

Although a HMD 102 is presented herein as an example "display system" that can implement the disclosed motion smoothing techniques, it is to be appreciated that other types and/or implementations of a "display system" may implement the motion smoothing techniques described herein. Accordingly, it is to be understood that any reference to "HMD" herein may be substituted with the term "display" or "display system," even though it is to be appreciated that a HMD is merely an example type of display, or display system, for implementing the techniques described herein. In some examples, the HMD 102 may represent a VR headset for use in VR systems, such as for use with a VR gaming system. However, the HMD 102 may additionally, or alternatively, be implemented as an AR headset for use in AR applications, or a headset that is usable for VR and/or AR applications that are not game-related (e.g., industrial applications). In AR, a user 104 sees virtual objects overlaid on a real-world environment, whereas, in VR, the user 104 does not typically see a real-world environment, but is fully immersed in a virtual environment, as perceived via the display panel(s) and the optics (e.g., lenses) of the HMD 102. It is to be appreciated that, in some VR systems, pass-through imagery of the real-world environment of the user 104 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 102, but it is to be appreciated that the HMD 102 is not limited to implementation in VR applications.

Furthermore, the HMD 102 may include a single display panel or multiple display panels, such as a left display panel and a right display panel of a stereo pair of display panels. The one or more display panels of the HMD 102 may be used to present a series of image frames (herein referred to as "frames") that are viewable by the user 104 wearing the HMD 102. It is to be appreciated that the HMD 102 may include any number of display panels (e.g., more than two display panels, a pair of display panels, or a single display panel). Hence, the terminology "display panel," as used in the singular herein, may refer to either display panel of a pair of display panels of a two-panel HMD 102, or it may refer to a single display panel of a HMD 102 with any number of display panels (e.g., a single-panel HMD 102 or a multi-panel HMD 102). In a two-panel HMD 102, a stereo frame buffer may render, for instance, 2160×1200 pixels on both display panels of the HMD 102 (e.g., 1080×1200 pixels per display panel).

In addition, the display panel(s) of the HMD 102 may utilize any suitable type of display technology, such as an emissive display that utilizes light emitting elements (e.g., light emitting diodes (LEDs)) to emit light during presentation of frames on the display panel(s). As an example, display panel(s) of the HMD 102 may comprise liquid crystal displays (LCDs), organic light emitting diode (OLED) displays, inorganic light emitting diode (ILED) displays, or any other suitable type of display technology for HMD applications.

The display panel(s) of the HMD 102 may operate at any suitable refresh rate, such as a 90 Hertz (Hz) refresh rate, which can be a fixed refresh rate or a variable refresh rate that dynamically varies over a range of refresh rates. The "refresh rate" of a display is the number of times per second the display redraws the screen. The number of frames displayed per second may be limited by the refresh rate of the display, if using a fixed refresh rate. Thus, a series of frames may be processed (e.g., rendered) and displayed as images on the display such that a single frame of the series of frames is displayed with every screen refresh. That is, in order to present a series of images on the HMD 102, the display panel(s) of the HMD 102 may transition from frame-to-frame, in the series of frames, at the refresh rate of the display, illuminating the pixels at every screen refresh. In some embodiments, the frame rate can be throttled, and/or the application can fail to hit the target frame rate, and/or network congestion may introduce latency in data transmission. In these scenarios, re-projected frames (sometimes referred to herein as "phantom frames") can be inserted between application-rendered frames (sometimes referred to herein as "actual frames").

In general, an application(s) executing on the host computer 106 can be a graphics-based application(s) (e.g., a video game). The application(s) is/are configured to output a series of frames that may be used to present images on the display panel(s) of the HMD 102. For example, the application(s) may generate pixel data for the series of frames, and the pixel data can be used to present corresponding images on the display panel(s) of the HMD 102. In some embodiments, off-screen rendering is utilized such that the frames can be rendered to a target before being rendered on a display panel(s) of the HMD 100. Thus, "rendering," as used herein, can include rendering to a target other than a display and before rendering on the display itself, and/or rendering on the display (e.g., without, or after, off-screen rendering to a different target).

Referring now to the process 100, at 112, logic (e.g., software, hardware, and/or firmware, etc.) of the host computer 106 may obtain (or receive), from an application executing on the host computer 106, pixel data for a first frame of a series of frames. The pixel data may include pixel values for individual pixels in the array of pixels of the display panel(s) of the HMD 102. Pixel data obtained from the executing application may, in some embodiments, include a two-dimensional array of per-pixel values (e.g., color values). In some embodiments, the pixel data further includes additional data or metadata, such as depth values, luminance values, etc. In some embodiments, pixel data may include data for each pixel that is represented by a single set of color and alpha values (e.g., one color value for a red channel, one color value for a green channel, one color value for a blue channel, and one or more values for one or more alpha channels).

In some embodiments, the host computer 106 may first receive head tracking data from the HMD 102, which may be used to determine a predicted pose of the HMD 102 for generating the pixel data for a frame. That is, the host computer 106 may use the head tracking data it receives from the HMD 102 to generate pose data indicative of a predicted pose that the HMD 102 will be in at a time at which light emitting elements of the display panel(s) of the HMD 102 will illuminate for the frame that is to be rendered by the application. For example, a head tracking system of the HMD 102 may be configured to track up to six degrees of freedom of the HMD 102 (e.g., three-dimensional (3D) position, roll, pitch, and yaw), which can be sent as head tracking data to the host computer 106 to determine a predicted pose of the HMD 102 (e.g., accounting for predicted head movement resulting in a future pose of the HMD 102). Accordingly, the pose data indicative of the predicted pose can be provided as input to the application for rendering a frame, and the application may output pixel data based on the pose data. For example, the application may call a function to receive pose data, and the requested pose data (predicted to the target illumination time for the frame) may be provided to the application so that the application can render the frame according to the pose data, which corresponds to a virtual camera pose used to render the scene.

In some embodiments, the application may be further instructed to generate depth data (e.g., Z-buffer data) for the frame and/or extra pixel data (sometimes referred to herein as "out-of-bounds pixel data" or "additional pixel data"), and, in response, the logic of the host computer 106, at block 112, may obtain from the application the depth data and/or the extra pixel data associated with the frame, in addition to the pixel data mentioned above. Depth data, such as from a depth buffer (or Z-buffer) output by the application, may be indicative of occluded objects in the scene. Accordingly, depth data can be used to, among other things, adjust for the parallax of objects in the scene (e.g., a ship that is far away in world space may not move as much with head movement as a close-up object will move with the same head movement). Knowing the depth of pixels that correspond to virtual objects in the scene is helpful to know how to adjust for such parallax during re-projection on the HMD 102. Knowing the depth information also allows for warping the scene not only based on rotation of the HMD 102, but also based on translation of the HMD 102 in space. Without any depth data, the system may assume an average depth of about 2 meters. However, any suitable resolution of depth that provides a better estimate of the average depth in the scene may be beneficial when performing re-projection on the HMD 102, and the higher resolution of depth data that can be included in the available bandwidth, the better re-projection adjustments can be made on the HMD 102. That being said, there may be a benefit to transmitting lower-resolution depth data, such as lower latency. As long as the resolution of the depth data is suitable for improving re-projection adjustments on the HMD 102, it may be beneficial to include depth data.

Extra pixel data output by the application may include extra pixel values outside of the boundary of the array of pixels of the display panel(s) of the HMD 102. For example, if the display panels of the HMD 102 have an array of 2160×1200 pixels, the pixel data obtained at block 112 may correspond to the pixel values in the 2160×1200 array of pixels, while extra pixel data may correspond to pixels that are outside of the boundary of the 2160×1200 array. Accordingly, the pixel data and the extra pixel data may constitute a larger number of pixel values, such as a larger array of, say, 2400×1400 pixels, as an example. The ability to render at a larger-than-target view may allow for applying a panel mask around the periphery of the display area without any effective reduction in the field of view (FOV).

At 114, the logic of the host computer 106 may compress the pixel data obtained from the application at block 112. An example reason for compressing the pixel data at block 114 is because of bandwidth limitations of the data connection between the host computer 106 and the HMD 102. For example, there is often not enough bandwidth to send uncompressed pixel data (e.g., files) in the amount of time allotted for displaying frames at a desired frame rate (e.g., frame rate of 90 Hz or more). Although compression introduces some amount of latency in the end-to-end graphics pipeline (as compared to not compressing the pixel data), this additional time for compressing the pixel data may be accounted for in the pose prediction, and adjustments can be made on the HMD 102 to account for the latency introduced for compression.

In some embodiments, the compression performed at block 114 involves changing a format of the pixel data. For example, the compression at block 114 may utilize a video compression standard, such as High Efficiency Video Coding (HEVC) and/or extensions of HEVC, which is sometimes referred to as H.265 and/or MPEG-H Part 2. HEVC is an example of a video compression standard that can be utilized at block 114, but it is to be appreciated that other suitable video compression standards can be utilized for compressing pixel data at block 114. HEVC utilizes motion estimation for compressing pixel data, with the goal of sending less data than the uncompressed pixel data in a system where bandwidth constraints are present, yet the compressed data is sufficient to approximate the original, uncompressed data on the receiving end (e.g., at the HMD 102). As part of the motion estimation utilized in the compression operation at block 114, an array of motion vectors may be generated, which is indicated at sub-block 116. In general, a "motion vector" is a two-dimensional (2D) arrow having an X and Y component for direction, and a magnitude (typically represented by a length of the 2D arrow). The magnitude of a motion vector may be specified in any suitable unit of measurement, such as a number of pixels in both X and Y component directions. In some examples, a video encoder (e.g., a video encode chip) of a GPU of the host computer 106 may generate the array of motion vectors at sub-block 116 based on the first pixel data obtained at block 112 and based on pixel data of one or more other frames (e.g., previously-rendered frames). In order to generate the array of motion vectors at sub-block 116, the video encoder may compare per pixel values (e.g., luminance values) between the pixel data of each frame that it is tasked with analyzing, per the compression algorithm. Additionally, or alternatively, the video encoder may compare macroblocks (e.g., a block of 16 pixels (i.e., 4×4 pixel macroblock), a block of 64 pixels (i.e., 8×8 pixel macroblock), a block of 4096 pixels (i.e., a 64×64 pixel macroblock, etc.) between the pixel data of each frame that it is tasked with analyzing, per the compression algorithm. The GPU of the host computer 106 may, as part of the compression operation(s), compare portions of the pixel data between a pair of frames at any suitable resolution.

In many video compression algorithms, including HEVC, there can be different types of frames, such as I-frames, P-frames, and B-frames. I-frames can stand on their own in the sense that they contain sufficient data to reconstruct the frame during decompression. Because of this, I-frames include a relatively large amount of data and are the least compressible, as compared to P-frames and B-frames. P-frames use data from previous frames (e.g., a reference frame) to compress and then decompress, and reconstruct, the original pixel data. P-frames are relatively smaller compared to I-frames because a P-frame encodes the differences from an earlier frame, such as in the form of motion vectors. The "B" in B-frame stands for bi-directional, which means that B-frames use both preceding and future frames to compress and then decompress, and reconstruct, the original pixel data. Because I-frames are relatively large, the instances of transmitting I-frames may be reduced or minimized in the present disclosure. In some scenarios, however, it may be beneficial to transmit an I-frame, such as if a wireless connection is temporarily lost between the host computer 106 and the HMD 102 and is subsequently reestablished. In any case, a common series of frames may start with an I-frame followed by a series of P-frames. The compression of the P-frames at block 114 may involve encoding the differences from a reference frame (e.g., the I-frame, and/or a preceding P-frame, etc.) in terms of where blocks of the image have moved in the new frame relative to their locations in the reference frame. These differences may be represented by motion vectors generated at sub-block 116.

Furthermore, at 114, as will be described in more detail with reference to the process 600 of FIG. 6, logic of the host computer 106 may align (or otherwise modify) the frames used for compression before the pixel data for those frames is provided as input to the GPU of the host computer 106. This can be done because of the movement of the HMD 102 between the frames, which may have caused objects (both stationary and moving objects) to move between locations over the course of rendering the multiple consecutive frames. By aligning one frame with the other frame, or vice versa, or by adjusting both frames to align them with each other, the pixel data that represents particular static objects within the scene can be moved to generally the same location between the two frames so that the pixel data corresponding to static objects is not mistaken for moving objects by the video encoder of the GPU. The alignment performed at block 114 may comprise a rotational re-projection modification to one or both of the frames (e.g., to the pixel data of the frame(s)) to reduce the deltas (or differences) in the motion vectors due to head movement. This reduction in the deltas (or differences) in the motion vectors may provide the added benefit of reduced bandwidth in transmitting the motion vectors from the host computer 106 to the HMD 102, as described herein. Accordingly, modified pixel data may be provided as input to a GPU for compression at block 114 when generating the motion vectors at sub-block 116.

At 118, the host computer 106 may send, to the HMD 102, data 110 that may include the compressed pixel data 110(1). As mentioned above with reference to P-frames, much of the time the compressed pixel data 110(1) may be sent in the form of an array of motion vectors 110(2) generated at sub-block 116. That is, for a series of P-frames, the array of motion vectors 110(2) may represent the compressed pixel data. In cases where an I-frame is sent to the HMD 102, however, the compressed pixel data 110(1) may not include motion vectors. The data 110 sent at block 118 may further include the pose data 110(3) used by the application to generate the pixel data 110(1) for the frame. In some embodiments, the data 110 sent at block 118 may omit the pose data 110(3), and/or the data 110 may include additional data, such as depth data 110(4), extra pixel data (e.g., outside of a boundary of the display panel(s) of the HMD 102), parallax occlusion data, and/or cube map data (e.g., for rapid, large-scale head movements so that the HMD 102 has other options besides presenting dark pixels where it does not have any data). The data 110 may be sent to the HMD 102 at block 118 in various ways, depending on the implementation, such as wirelessly, over a wired connection, via a wide-area network, etc. In some embodiments, some or all of the data 110 may be sent in-band or out-of-band with the compressed pixel data 110(1), such as the motion vectors 110(2) as part of an encoded data stream. For example, the pose data 110(3), the depth data 110(4), and/or additional data, may be sent out-of-band from the compressed pixel data 110(1), such as the motion vectors 110(2).

At 120, the HMD 102 may receive, from the host computer 106, the data 110 including, without limitation, the compressed pixel data 110(1), such as the motion vectors 110(2) (which, when received, represent the compressed pixel data), the pose data 110(3), and/or the depth data 110(4), etc.

At 122, logic (e.g., software, hardware, and/or firmware, etc.) of the HMD 102 may decompress the compressed pixel data 110(1), such as by using the motion vectors 110(2) and a reference frame (e.g., pixel data 110(1) of a previous frame), to obtain the pixel data for the frame output by the application, or at least an approximation of the original pixel data. Decompressing the compressed pixel data at block 122 may use a decompression or decoding algorithm, such as a HEVC algorithm. Furthermore, as shown by sub-block 124, e.g., at least in cases where the motion vectors 110(2) represent the compressed pixel data 110(1) (e.g., for P-frames), logic of the HMD 102 may extract the motion vectors 110(2) from the data stream, such as from an encoded data stream (e.g., a HEVC stream). The decompressed pixel data 110(1), the motion vectors 110(2), and possibly additional data (e.g., the pose data 110(3), depth data 110(4), etc.) may be cached in memory of the HMD 102 so that it may be accessed at a later time, such as for use in rendering a re-projected frame, and/or in decompressing data in the future. It is to be appreciated that blocks 120-124 may iterate as frames are continually received from the host computer 106. It is to be appreciated that data 110 may be maintained (e.g., cached) in memory of the HMD 102 for a period of time, and thereafter the data 110 may be discarded to make room for storing future data 110.

At 126, logic of the HMD 102 may retrieve the latest decompressed data 110, such as the decompressed pixel data 110(1), for use in presenting an image on the display panel(s) of the HMD 102. For example, as data 110 is received at block 120 and decompressed at block 122, the retrieval operation at block 126 may determine that cached pixel data 110(1) stored in memory of the HMD 102 represents the most recently decompressed pixel data available to the HMD 10, and the logic of the HMD 102 may retrieve the most-recently-decompressed data, such as the pixel data 110(1) obtained from decompressing the most-recently-received motion vectors 110(2), from the memory. In an illustrative example, if the HMD 102 is operating at a refresh rate of 90 Hz, a frame is to be displayed roughly once every 11.11 milliseconds. In this context, if the HMD 102 has received and decompressed new data in the last 11.11 milliseconds since the last frame was displayed, the new, decompressed pixel data 110(1) may be used for rendering the next frame. On the other hand, if the HMD 102 has not received and decompressed new data in the last 11.11 milliseconds since the last frame was displayed, the pixel data 110(1) from most-recently-rendered frame may be used for rendering the next frame.

At 128, logic of the HMD 102 may modify the pixel data for the frame based at least in part on a predicted pose of the HMD 102 to obtain modified pixel data for the frame. For example, the logic of the HMD 102 may apply adjustments to the pixel data based on a comparison between the original predicted pose of the HMD 102 that was used by the application to generate the pixel data retrieved at block 126 and an updated pose predicted by logic of the HMD 102 at a time that is closer to the illumination time for the frame. This comparison may reveal a delta (or difference) between the original pose prediction at the time the application rendered the frame, and the updated pose prediction at the HMD 102 before rendering a frame on the display panel(s), and the adjustments applied at block 118 may include rotational calculations to compensate for this delta (e.g., by shifting and/or rotating the pixel data one way or another, depending on the delta between the two pose determinations).

Furthermore, at 128, logic of the HMD 102 may also modify the pixel data for the frame based at least in part on the array of motion vectors 110(2) extracted at block 124 and retrieved at block 126. As a result of the modification at block 128, modified pixel data for a re-projected frame is obtained. Although this disclosure makes a distinction between an "actual" frame and a re-projected (or, "phantom" frame), this distinction is not meant to imply that an actual frame is not oftentimes adjusted/modified at block 128 before presentation on the HMD 102. That is, the frames presented on the HMD side can be considered to be synthesized (i.e., not the same as the original frames output by the application executing on the host computer 106) due to the modification operation(s) that may be performed at block 128 on both "actual" and "phantom" frames. In this sense, every frame that is modified at block 128 may be considered to be a "re-projected" frame, as used herein. Whether the pixel data is modified, and/or the extent to which it is modified at block 128 depends on the operational performance of the system. For example, if everything goes the way it is supposed to in a live-rendering scenario, where every frame output by the application is received in a timely manner at the HMD 102, the delta between original and updated pose predictions may be close to, if not zero, and, in this case, the modifications applied at block 128, if any, may have little-to-no impact on the final output. However, in a scenario where the application fails to hit frame rate, or a frame is late-arriving or dropped in transit due to network congestion, the modifications applied to the pixel data 110(1) at block 128 may be significant to compensate for a greater delta between original and updated pose predictions. As will be described in more detail below, the modification of the pixel data for the re-projected frame based on the motion vectors 110(2) may utilize a render mesh. For example, a render mesh may be generated for the re-projected frame. The render mesh may comprise a tessellated mesh having a plurality of vertices, and vertices of the render mesh may be moved to different locations within the render mesh as moved vertices (e.g., by moving vertices (i) in directions of the non-zero motion vectors 110(2), and (ii) by amounts corresponding to magnitudes of the non-zero motion vectors 110(2)). Accordingly, the modification of the pixel data at block 128 may be in accordance with the moved vertices of the render mesh, such as by moving pixel values of the pixel data retrieved at block 126 in accordance with the move vertices to obtain modified pixel data of the re-projected frame. For example, a pixel value might be moved 4 pixels to the left, and 4 pixels upward to a new location within modified pixel data in accordance with a moved vertex within the render mesh. In some embodiments, the motion vectors 110(2) may be modified before applying the modified motion vectors 110(2) to the pixel data. For example, as described in more detail below, a filter (e.g., a N×N scalar median filter, a M×M average-max blur filter, etc.) may be applied to the array of motion vectors 110(2) to obtain a modified array of motion vectors, and the modified (e.g., filtered) array of motion vectors may be used to modify the pixel data at block 128.

Furthermore, at 128, logic of the HMD 102 may also modify the pixel data for the frame based at least in part on the depth data 110(4) retrieved at block 126. The depth data 110(4) can be used at block 128 to, among other things, adjust for the parallax of objects in the scene (e.g., a ship that is far away in world space may not move as much with head movement as a close-up object will move with the same head movement). Knowing the depth of pixels that correspond to virtual objects in the scene is helpful to know how to adjust for such parallax during re-projection on the HMD 102. Knowing the depth information also allows for warping the scene not only based on rotation of the HMD 102, but also based on translation of the HMD 102 in space. If depth data 110(4) is not received from the host computer 106, logic of the HMD 102 may assume an average depth of about 2 meters.

At 130, an image may be presented on the display panel(s) of the HMD 102 based at least in part on the modified pixel data. For example, the logic of the HMD 102 may output the modified pixel data to a frame buffer(s), and may cause an image(s) to be presented on the display panel(s) of the HMD 102 based on the modified pixel data output to the frame buffer. This may involve scanning out the modified pixel data to the display panel(s) of the HMD 102 and illuminating the light emitting elements of the display panel(s) to illuminate the pixels on the display panel(s). For a HMD 102 with a pair of display panels, this modified pixel data may correspond to a frame that represents a pair of images to be displayed on the pair of display panels, and may be output to a stereo frame buffer and scanned out, accordingly. The resulting image corresponding to the re-projected frame is "motion smoothed" by virtue of the modification of the pixel data in accordance with the motion vectors 110(2).

Figure 2:
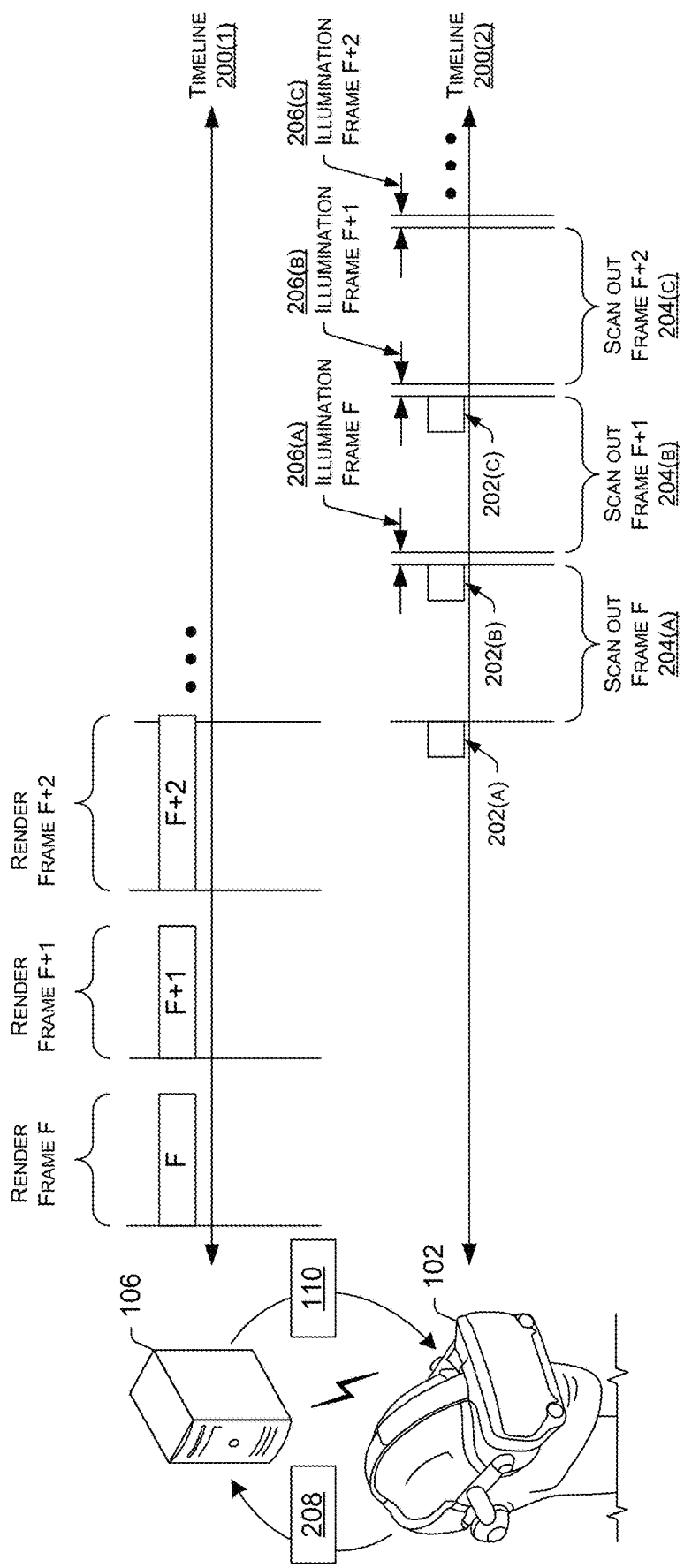
FIG. 2 is a diagram illustrating two example timelines showing respective rendering workloads of a host computer and a HMD, in accordance with embodiments disclosed herein.

FIG. 2 is a diagram illustrating two example timelines 200(1) and 200(2) showing respective rendering workloads of a host computer 106 and a HMD 102, in accordance with embodiments disclosed herein. The example of FIG. 2 depicts three example frames—frame "F", frame "F+1", and frame "F+2"—with respect to the first timeline 200(1) associated with the host computer 106. This first timeline 200(1) illustrates how the frames can be rendered in series by an application executing on the host computer 106 using a GPU(s) of the host computer 106. Here, the application renders frame F, then frame F+1, and then frame F+2, in sequence, from left to right on the first timeline 200(1). The ellipses on the first timeline 200(1) indicate that this may continue for any number of frames as the application continues to execute. The first timeline 200(1) also implies, by the vertical lines oriented orthogonally to the horizontal timeline 200(1), that the application is targeting a target frame rate (e.g., a frame rate of 90 Hz where the vertical lines would be separated by about 11.11 milliseconds). In the example of FIG. 2, the application executing on the host computer 106 happens to be hitting the target frame rate over frames F and F+1, but the application fails to hit the frame target frame rate for frame F+2. For example, it may be the case that the scene in frame F+2 includes a high number of moving objects or complex textures, and due to these complexities, and/or for other reasons, the application takes longer than the allotted time to render frame F+2. The host computer 106 may receive head tracking data 208 regarding the movement of the HMD 102 to determine a predicted pose of the HMD 102 for rendering each frame on the timeline 200(1).

The second timeline 200(2) in FIG. 2, which is associated with the HMD 102, shows rendering workloads **202(*a*), 202(*b*), and 202(*c*) of the HMD 102 for the individual frames. An individual rendering workload 202 of the HMD 102 for a given frame may represent adjustments that are applied to the pixel data 110(1) before a final image(s) is presented on the display panel(s) of the HMD 102. Such adjustments may include, without limitation, adjustments for geometric distortion, chromatic aberration, head movement, and the like, which are applied to the pixel data 110(1) before rendering a final image(s) on the HMD 102. For frames F and F+1, these adjustments are applied to the pixel data generated by the application executing on the host computer 106, and at least some of these adjustments may utilize the pose data 110(3)** received from the host computer 106 by accounting for a delta between an original predicted pose of the HMD 102 and an updated pose prediction of the HMD 102. Accordingly, frames F and F+1 on the second timeline 200(2) are meant to represent modified versions of "actual" frames in the sense that they are modified versions of the pixel data 110(1) output from the application in real-time, during a live rendering situation. By contrast, to render frame F+2, the HMD 102 may use previously-received pixel data 110(1) for a preceding frame (e.g., pixel data 110(1) for frame F+1) to generate a re-projected (or, "phantom") frame based on the pose prediction of the preceding frame and an updated pose prediction made by the HMD 102. Furthermore, the rendering workload 202(c) may include modifying the pixel data from frame F+1 based on the motion vectors 110(2) received with the data 110 for frame F+1 to "motion smooth" frame F+2, as described herein. In any case, the result of the rendering workloads 202 is the generation of modified pixel data that may be output to a frame buffer (e.g., a stereo frame buffer). The distinction herein between an "actual" frame and a "phantom" frame is not meant to imply that an actual frame is not adjusted on the HMD 102, and, in this sense, the frames generated on the HMD side are all effectively synthesized (i.e., not the same as the original frames output by the application executing on the host computer 106).

The second timeline 200(2) of FIG. 2 also shows a scan-out time 204(a), 204(b), and 204(c) for each frame, as well as an illumination time 206(a), 206(b), and 206(c) for each frame. During the scan-out time 204 for a given frame, subsets of pixel values (of the modified pixel data) are scanned out to the display panel(s) of the HMD 102 via a display port (e.g., a high-definition multimedia interface (HDMI)), and during the illumination time 206 for the given frame, the light emitting elements of the display panel(s) of the HMD 102 are illuminated to cause the pixels of the display panel(s) to illuminate. FIG. 2 illustrates an example of a global flashing type of display driving scheme, which may be used with LCD panels to simultaneously emit light from the light emitting elements of the display panel(s) at the refresh rate of the HMD 102. In an illustrative example, if the HMD 102 is operating at a 90 Hz refresh rate, the illumination time 206 for each frame may be separated by roughly 11.11 milliseconds.

Figure 3:
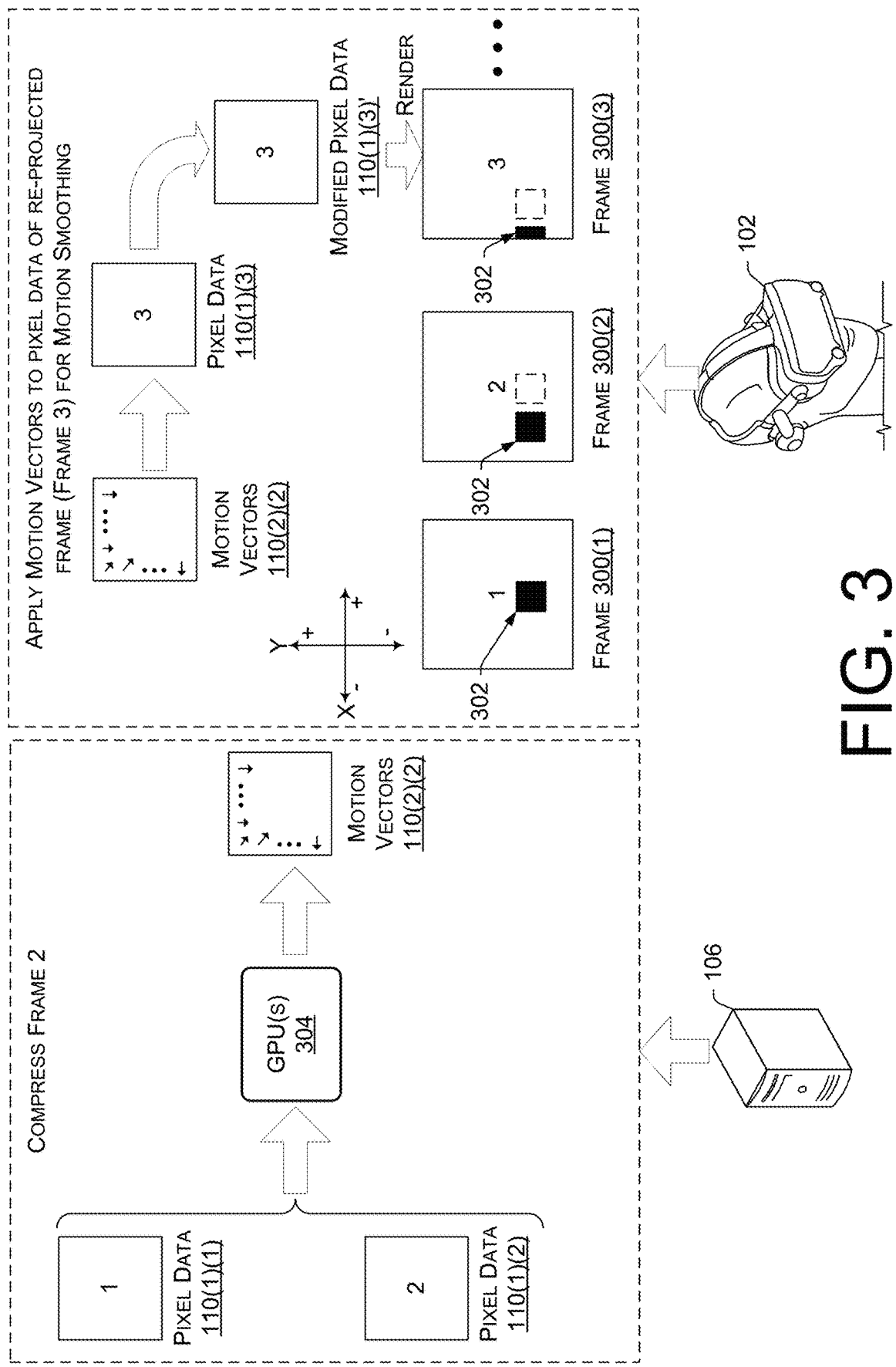
FIG. 3 is a diagram illustrating an example motion smoothing technique to account for moving or animating objects in a scene when re-projection is being used to render frames on a display, such as a HMD.

FIG. 3 is a diagram illustrating an example motion smoothing technique to account for moving or animating objects in a scene when re-projection is being used to render frames on a display, such as a HMD 102. The example of FIG. 3 depicts three example frames 300(1), 300(2), and 300(3) that are to be rendered in sequence as a series of frames 300. In the example of FIG. 3, an object 302 is shown to be moving across a scene in a leftward direction (i.e., from right to left) over the course of the frames 300(1)-300(3). The dotted outline of the object 302 in frames 300(2) and 300(3) represents the location where the object 302 was located in the previously-rendered frame 300. Here, frame 300(1) is rendered first, then frame 300(2) is rendered second, and then frame 300(3) is rendered third.

At least some of the frames 300 in the series of frames 300 may be "actual" frames in the sense that they are output from an application, such as video game application, or any other type of graphics-based application in sufficient time to present a corresponding image on the HMD 102 based on the pixel data for the frame 300. The application may be executed in a graphics pipeline that outputs pixel data 110(1) to a frame buffer for rendering the individual frames 300.

During runtime, a head tracking module of the HMD 102 may generate data about the position and orientation (pose) of the HMD 102 that is provided to the host computer 106 executing the application in order to inform the application regarding how to render a next frame 300 in the series of frames 300 in accordance with the user's 104 head pose. This allows for the application to output pixel data 110(1) for rendering imagery on the HMD 102 in a way that makes the user 104 believe he/she is looking around a virtual environment that includes objects (both static and moving objects, such as the moving object 302). Both static and moving objects are perceived to move within the scene in an expected manner along with the user's 104 head movement if the application is hitting frame rate. The motion smoothing techniques described herein are a way to compensate for the application failing to hit frame rate so that a similar visual perception is achieved with respect to moving objects.

In the example of FIG. 3, the first frame 300(1) may represent a first "actual" frame that is received from an application, the second frame 300(2) may represent a second "actual" frame received from the application and rendered after the first frame 300(1), and the third frame 300(3) may represent a re-projected frame that is generated from pixel data 110(1)(2) associated with the second frame 300(2). Hence, the "third frame 300(3)" in FIG. 3 is sometimes referred to herein as the "re-projected frame 300(3)." In the example of FIG. 3, in order to compress the second frame 300(2) (Frame 2), logic of the host computer 106 may provide, as input to a graphics processing unit (GPU) 304 of the host computer 106, first pixel data 110(1)(1) associated with the first frame 300(1) and second pixel data 110(1)(2) associated with the second frame 300(2).

A video encoder (e.g., a video encode chip) of the GPU 304 may generate an array of motion vectors 110(2)(2) based on the first pixel data 110(1)(1) and the second pixel data 110(1)(2) that was input to the GPU 304. In order to generate the array of motion vectors 110(2)(2), the video encoder of the GPU 304 may compare per pixel values (e.g., luminance values) between the pixel data 110(1) of each frame 300 that was provided as input. Additionally, or alternatively, the video encoder of the GPU 304 may compare macroblocks (e.g., a block of 16 pixels (i.e., 4×4 pixel macroblock), a block of 64 pixels (i.e., 8×8 pixel macroblock)) between the pixel data 110(1) of each frame 300 that was provided as input. In this manner, the GPU 304 may compare portions of the pixel data 110(1) between a pair of frames 300 at any suitable resolution. In some embodiments, the input pixel data 110(1)(1) and 110(1)(2) is down-sampled to a lower resolution in order to input down-sampled frames to the GPU 304. In some embodiments, the motion vectors 110(2)(2) are generated pursuant to any suitable compression algorithm, such as a HEVC algorithm.

The array of motion vectors 110(2)(2) output from the GPU 304 is sometimes referred to herein as a "motion vector field." This motion vector field 110(2)(2) can also be output at, and/or down-sampled/up-sampled to, any suitable resolution. For instance, the array of motion vectors 110(2)(2) may include a single motion vector per pixel, a single motion vector per group of pixels (e.g., one motion vector for a 4×4 macroblock, an 8×8 macroblock, an arbitrary shaped patch of pixels, etc.), or even a single motion vector for all of the pixels for a given frame 300.

Based on the comparison of the input pixel data 110(1) by the video encoder of the GPU 304, if a portion of the second frame 300(2) is similar to (e.g., within a threshold luminance value of) a portion of the first frame 300(1), and if the similar portion in each frame 300 are offset by a distance (e.g., number of pixels in X and Y component directions), this can be represented by a motion vector that is included in the array of motion vectors 110(2)(2). Consider an example where the pixel values corresponding to the object 302 in frames 300(1) and 300(2) are determined, by the video encoder of the GPU 304 to be similar (e.g., matching portions that satisfy some similarity metric based on the pixel values in the pixel data 110(1)). The motion vector for this object 302 may have a direction that points in the same direction as the movement of the object 302, or the motion vector may point in the opposite direction to that of the direction of movement of the object 302. In other words, the motion vector may point in a direction that refers back to a location of the object 302 in the previous frame 300(1) that is offset from a location of the object 302 in the subsequent frame 300(2). Thus, a motion vector in the array 110(2)(2) provides an offset from the coordinates in the second frame 300(2) to the coordinates in the first frame 300(1). The offset describes the transformation from the image in the first frame 300(1) to the image in the second frame 300(2) with respect to moving or animating objects, such as the object 302.

As mentioned, the third frame 300(3) in FIG. 3 may represent a re-projected frame, which means that the pixel data 110(1)(3) for the third frame 300(3) may be derived from the pixel data 110(1)(2) associated with a previously-rendered actual frame (in this case, the second frame 300(2)). In other words, the pixel data 110(1)(3) for the re-projected frame 300(3) is not received from the host computer 106 in real-time, but is generated from the pixel data 110(1) of the application-generated frames and is used to "fill-in" the gaps of missing frames when the application is not hitting frame rate, and/or when network congestion arises. In this case, the pixel data 110(1)(3) for the re-projected frame 300(3) is generated from the pixel data 110(1)(2) associated with the second frame 300(2) because the second frame 300(2) is the most recently-rendered frame 300 prior to the re-projected frame 300(3), in the example of FIG. 3. In some embodiments, rotation and re-projection transforms may be calculated and used to modify the second pixel data 110(1)(2) associated with the second frame 300(2) in order to generate the third pixel data 110(1)(3) for the re-projected frame 300(3), which effectively rotates, translates, and/or otherwise moves the scene that was rendered in the second frame 300(2) in such a manner that accounts for rotation of the HMD 102 since the second frame 300(2) was rendered. For example, the user 104 may rotate his/her head since a time when the second frame 300(2) is rendered, which is accounted for in the generation of the third pixel data 110(1)(3) for the re-projected frame 300(3) so that the scene is presented in accordance with this head movement.

The motion smoothing technique of FIG. 3 then modifies the third pixel data 110(1)(3) based at least in part on the array of motion vectors 110(2)(2) received from the host computer 106 in association with the second frame 300(2) to obtain modified third pixel data 110(1)(3)' for the re-projected frame 300(3). In some embodiments, this modification of the third pixel data 110(1)(3) into modified third pixel data 110(1)(3)' includes moving pixel values of the third pixel data 110(1)(3) to different locations based on non-zero motion vectors 110(2)(2) that correspond to particular pixels or groups of pixels. The movement may be in a direction and by an amount (e.g., moving a number of pixels in horizontal (+/−) and vertical (+/−) directions). The re-projected frame 300(3) is then rendered on a display (e.g., on a display panel(s) of the HMD 102) based at least in part on the modified third pixel data 110(1)(3)'. Thus, the re-projected frame 300(3), having been modified based on the motion vectors 110(2)(2) (the motion vectors 110(2)(2) having been generated from the pixel data 110 of the previously-received (and/or previously-rendered) actual frames 300(1) and 300(2) as a result (e.g., a byproduct) of compressing the pixel data 110(1)(2) for the second frame 300(2)), is "motion-smoothed" to render the object 302 in an expected position.

Figure 4:
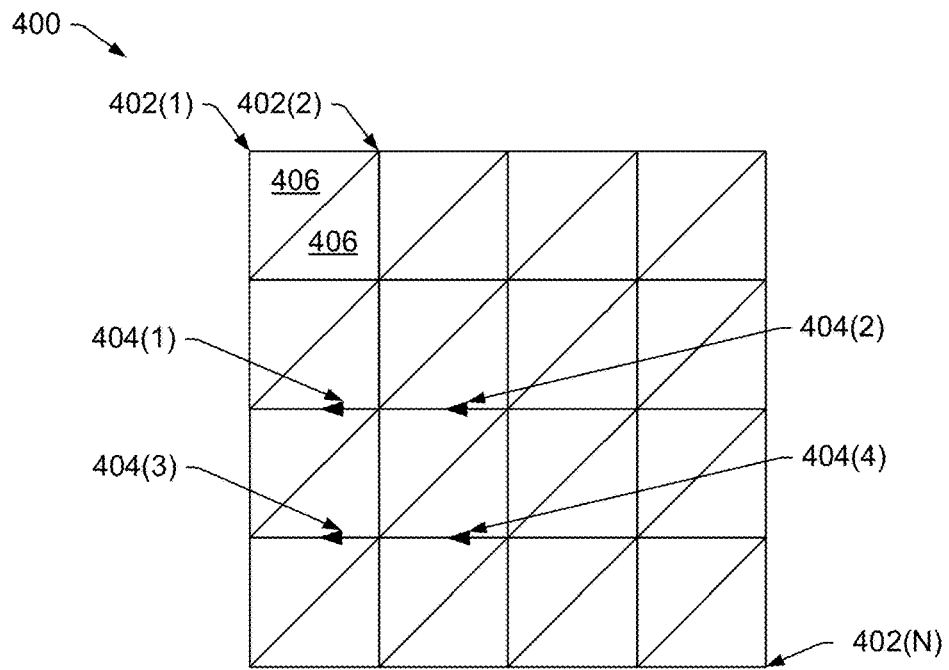
FIG. 4 is a diagram illustrating an example render mesh and how the render mesh can be used in motion smoothing for re-projected frames.
Figure 4:
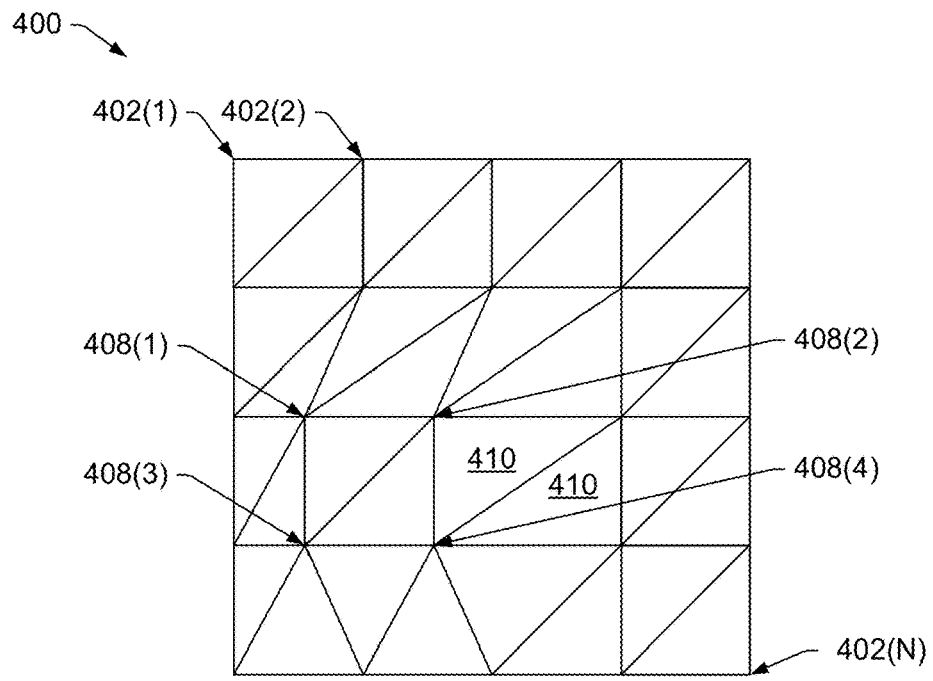

FIG. 4 is a diagram illustrating an example render mesh 400 and how the render mesh 400 can be used in motion smoothing for re-projected frames. For example, the render mesh 400 can be used by the HMD 102 to modify the third pixel data 110(1)(3) for the re-projected frame 300(3) of FIG. 3 based on the array of motion vectors 110(2) output by the GPU 304 of the host computer 106. In this example, logic of the HMD 102 may generate the render mesh 400, and vertices 402 of the render mesh 400 can be moved according to the array of motion vectors 110(2). For instance, the vertices 402 may be moved in directions of non-zero motion vectors 404, and by amounts corresponding to magnitudes of the non-zero motion vectors 404. For instance, taking the leftward moving object 302 shown in FIG. 3 as an example, a motion vector 404 may be applied in the context of the render mesh 400 to move a vertex 402 a particular number of pixels (corresponding to the magnitude of the motion vector 404) in a leftward (or negative X) direction.

The render mesh 400 is shown as a tessellated mesh having a plurality of vertices 402(1), 402(2), . . . , 402(N) (collectively 402). The tessellation of the render mesh 400 can be in any suitable geometric pattern. The example render mesh 400 of FIG. 4 is shown as a repeating pattern of triangles 406, although any suitable geometric shape can be used for the render mesh 400, including, without limitation, squares (sometimes referred to as "quads"), hexagons (e.g., for a honeycomb pattern), etc. In this example, a diagonal line from a bottom left corner of a square (or quad) to a top right corner of the square (or quad) is used to create the render mesh 400 of repeating triangles 406 having a particular orientation. A different orientation for the render mesh 400 can be created by dividing the squares (or quads) into triangles 406 using a diagonal line from a top left corner of the square (or quad) to a bottom right corner of the square (or quad), instead of the orientation shown in FIG. 4. In some embodiments, a mixture of these different orientations can also be used for a single render mesh 400, such as by dividing every other square using a diagonal line from a bottom left corner of the square (or quad) to a top right corner of the square (or quad), and dividing the squares in between using a diagonal line from a top left corner of the square (or quad) to a bottom right corner of the square (or quad). In some embodiments, logic of the HMD 102 may be configured to dynamically determine which orientation, of these multiple orientations, to use in generating the render mesh 400, based on the motion vector field 110(2) received from the host computer 106. This might be done to choose the best orientation for the geometric shapes (e.g., triangles 406) in the render mesh 400 that results in a smoothest looking, motion-smoothed image.

The render mesh 400 can also be generated at any suitable resolution. For example, a highest resolution render mesh 400 might be two adjoined triangles 406 per pixel, where each square (or quad) is mapped to a single pixel. A lower resolution might be two adjoined triangles 406 per a group of pixels, such as a group of 16 pixels. Alternatively, pixels may be mapped to the vertices 402 of the render mesh 400 at any suitable resolution. For instance, each vertex 402 might be associated with a single pixel at a highest resolution, or each vertex 402 might be associated with a group of pixels, such as a group of 16 pixels, at a lower resolution. In some embodiments, the resolution of the render mesh 400 is a same resolution as the resolution of the array of motion vectors 110(2) such that a single motion vector 404 in the array of motion vectors 110(2) maps to a vertex 402 or to a square (or quad) (e.g., two adjoined triangles 406). Achieving a matching resolution between the render mesh 400 and the array of motion vectors 110(2) can be accomplished in various ways, such as by requesting, from the GPU 304, an array of motion vectors 110(2) at a particular resolution that matches a resolution of the render mesh 400, by downsampling or up-sampling the array of motion vectors 110(2) to match the resolution as the render mesh 400, or by generating the render mesh 400 at a resolution that matches the resolution of the array of motion vectors 110(2) that is received from the host computer 106.

FIG. 4 shows an example where four non-zero motion vectors 404(1), 404(2), 404(3), and 404(4) correspond to four vertices 402 of the render mesh 400. These four motion vectors 404(1)-(4) might correspond to motion vectors that the GPU 304 detected based on the moving object 302 depicted in FIG. 3. Accordingly, the example motion vectors 404(1)-(4) may point in a leftward direction that corresponds to the directional motion of the object 302, although, as mentioned, the directionality may be opposite to that of the directional motion of an object 302 (e.g., in a rightward direction). Directionality of the motion vectors 404, may be taken into account in the motion smoothing algorithm to modify the pixel data 110(1) in the desired direction. Consider a basic example where the field of motion vectors 110(2) includes the four example motion vectors 404(1)-(4), and all of the remaining motion vectors in the array of motion vectors 110(2) are zero vectors. In this example, the pixel data 110(1)(3) for a re-projected frame 300(3) can be modified based on the non-zero motion vectors 404(1)-(4) by moving the vertices 402 that correspond to the non-zero motion vectors 404(1)-(4) to different locations within the render mesh 400 as moved vertices 408(1), 408(2), 408(3), and 408(4) (shown at the bottom of FIG. 4). The bottom of FIG. 4 shows the render mesh 400 after motion smoothing has been applied, where the moved vertices 408(1)-(4) are in different locations within the render mesh 400 as compared to the locations of the vertices 402 before motion smoothing. When the motion vectors 404(1)-(4) are applied in this manner, the moved vertices 408(1)-(4) cause one or more portions of the render mesh 400 to distort, such as by stretching or warping particular ones of the geometric shapes (e.g., triangles 406) in the render mesh 400. In the example of FIG. 4, some of the triangles 406 are stretched as a result of motion smoothing to create stretched triangles 410, as shown at the bottom of FIG. 4. The pixel values (of the pixel data 110(1)(3) for the re-projected frame 300(3)) that correspond to the moved vertices 408(1)-(4) are rendered at different pixels locations that correspond to the locations of the moved vertices 408(1)-(4) within the render mesh 200. Pixel locations between the moved vertices 206(1)-(4) and the non-moved vertices 402 may be blended (e.g., by applying a gradient, such as by interpolating the pixel values between the moved vertices 408(1)-(4) and the non-moved vertices 402). In some embodiments, a depth buffer can be utilized to determine a final set of pixel values that are output to a frame buffer of the modified pixel data 110(1)(3)' for the re-projected frame 300(3). That is, there may be multiple pixel values at the location in the image corresponding to the moved vertices 408(1)-(4) as a result of applying the motion vectors 404(1)-(4) to the render mesh 400. In this case, whichever pixels values are associated with a "closer" (smaller) depth value may be rendered in lieu of rendering another pixel value at that location that is associated with a "farther" (greater) depth value.

Figure 5:
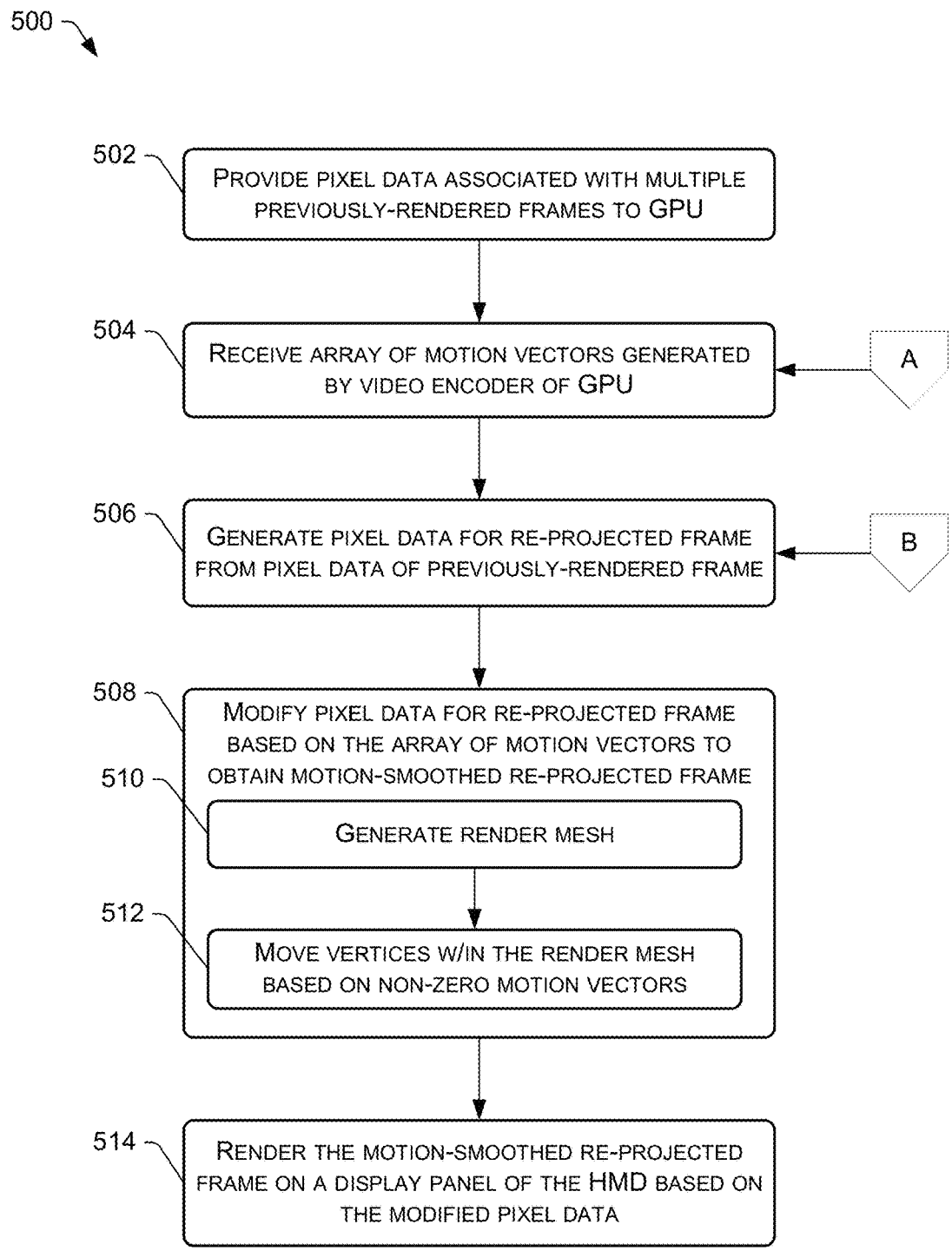
FIG. 5 is a flow diagram of an example process for generating a re-projected frame using motion vectors generated by a graphics processing unit (GPU) as part of a motion smoothing technique, in accordance with embodiments disclosed herein.

FIG. 5 is a flow diagram of an example process 500 for generating a re-projected frame using motion vectors generated by a graphics processing unit (GPU) as part of a motion smoothing technique, in accordance with embodiments disclosed herein. For discussion purposes, the process 500 is described with reference to the previous figures.

At 502, logic of the host computer 106 may provide pixel data 110(1) associated with previously-rendered frames 300 as input to a GPU 304. For instance, pixel data 110(1) associated with the two most recently rendered frames 300 may be provided as input to the GPU 304 as part of a compression algorithm for compressing pixel data 110(1) prior to transmission of compressed pixel data 110(1). These frames 300 may be actual frames received from an application (e.g., a video game application), such as a first frame 300(1) rendered in the past, and a second frame 300(2) rendered after the first frame 300(1). Accordingly, the second frame 300(2) may represent a most recently rendered frame output by the application executing on the host computer 106, and the first frame 300(1) and the second frame 300(2) may have been output by the application consecutively in a series of frames 300, although the pixel data 110(1) provided as input at block 502 need not be pixel data 110(1) for consecutively rendered frames. For instance, an intermediate frame(s) 300 may be rendered between the first frame 300(1) and the second frame 300(2), and the pixel data 110(1) provided as input at block 502 may pertain to the first frame 300(1) and the second frame 300(2).

At 504, an array of motion vectors 110(2) may be received from the GPU 304. The array of motion vectors 110(2) received at block 504 may have been generated by a video encoder of the GPU 304 based at least in part on the first pixel data 110(1)(1) associated with the first frame 300(1) and the second pixel data 110(1)(2) associated with the second frame 300(2) (e.g., based on a comparison between the first pixel data 110(1)(1) and the second pixel data 110(1)(2)). The video encoder of the GPU 304 may be configured to use a suitable computer vision and/or video encoding algorithm (e.g., HEVC) that looks for similarity between pixel values (or groups of pixel values), such as by determining whether a difference between compared pixel values is less than a threshold difference. Anything within such a similarity metric may be considered to be matching pixel data 110(1) between the two frames 300.

At 506, logic of the HMD 102 may generate third pixel data 110(1)(3) for a re-projected frame 300(3) based at least in part on the second pixel data 110(1)(2) of the second frame 300(2). In this case, the second frame 300(2) represents the frame rendered immediately before the re-projected frame 300(3). For example, between blocks 504 and 506, the HMD 102 may have received compressed second pixel data 110(1)(2) for the second frame 300(2), decompressed the pixel data 110(1)(2), modified the pixel data 110(1)(2) to account for an updated pose prediction of the HMD 102, and presented an image on the HMD 102 for the second frame 300(2), and at block 506, the HMD 102 is preparing to render a re-projected frame 300(3) as the next frame.

At 508, the logic of the HMD 102 may modify the third pixel data 110(1)(3) based at least in part on the array of motion vectors 110(2)(2) to obtain modified third pixel data 110(1)(3)' for the re-projected frame 300(3). As shown by sub-blocks 510 and 512, the modification of the pixel data 110(1)(3) for the re-projected frame 300(3) may utilize a render mesh 400.

Accordingly, at 510, the logic of the HMD 102 may generate a render mesh 400 for the re-projected frame 300(3). The render mesh 400 may comprise a tessellated mesh having a plurality of vertices 402. In some embodiments, the resolution of the render mesh 400 may match a resolution of the array of motion vectors 110(2)(2) such that there is a one-to-one correspondence between a motion vector 404 and an "element" of the render mesh 400 (e.g., elements such as vertices 402 of the render mesh 400, squares (or quads) of the render mesh 400, etc.). Obtaining a matching resolution between the motion vector field 110(2)(2) and the render mesh 400 may include any of the techniques described herein, such as requesting that the GPU 304 output the motion vector field 110(2)(2) at a particular resolution, down-sampling or up-sampling the resolution of the motion vector field 110(2)(2), and/or generating the render mesh 400 at a resolution that matches the resolution of the motion vector field 110(2)(2) output by the GPU 304.

At 512, the logic may move vertices 402 (of the plurality of vertices 402) of the render mesh 400 to different locations within the render mesh 400 as moved vertices 408. The vertices 402 may be moved (i) in directions of the non-zero motion vectors 404, and (ii) by amounts corresponding to magnitudes of the non-zero motion vectors 404. Accordingly, the modification of the third pixel data 110(1)(3) at block 508 may be in accordance with the moved vertices 408 of the render mesh 400, such as by moving pixel values of the third pixel data 110(1)(3) in accordance with the move vertices 408 to obtain modified third pixel data 110(1)(3)' of the re-projected frame 300(3). For example, a pixel value of the third pixel data 110(1)(3) might be moved 4 pixels to the left, and 4 pixels upward to a new location within modified third pixel data 110(1)(3)' in accordance with a moved vertex 408 within the render mesh 400.

In some embodiments, multiple motion vector fields 110(2) may be received at block 504 based on different sets of previously rendered frames 300 input at block 502, and additional motion-related parameters may be determined based on the multiple motion vector fields 110(2) to use in motion smoothing at block 508 for a re-projected frame. For example, in addition to the previous two frames 300(1) and 300(2), which results in the array of motion vectors 110(2)(2) received at block 504, the algorithm of FIG. 5 may, in some embodiments, go back one or more additional frames, such as by providing the first frame 300(1) and a "zeroth" frame 300(0) that was rendered prior to the first frame 300(1) as input to the GPU 304 and receiving an additional array of motion vectors 110(2) based on that different pair of input frames 300. The multiple arrays of motion vectors may then be compared to determine motion-related parameters like acceleration of an object that is moving frame-to-frame, and these motion-related parameters can be applied at block 508, such as by modifying (e.g., increasing/decreasing) the magnitude of a final motion vector 404 that is applied to the third pixel data 110(1)(3) to move a pixel value more or less in terms of the motion-smoothing adjustment.

At 514, the logic of the HMD 102 may render the re-projected frame 300(3) on a display (e.g., on a display panel(s) of the HMD 102) based at least in part on the modified third pixel data 110(1)(3)'. The resulting re-projected frame 300(3) that is rendered at block 514 is "motion smoothed" by virtue of the modification of the third pixel data 110(1)(3) in accordance with the motion vectors 110(2) received from the GPU 304. It is to be appreciated that the GPU 304 may represent one or more GPUs 304. For example, multiple GPUs 304 may be utilized to render a given frame 300 on stereo display panels of the HMD 102, and the pixel data 110(1) of frames 300 input to these GPUs 304 can be partitioned accordingly (e.g., a left half of the pixel data 110(1) may be provided as input to a first GPU 304 and a right half of the pixel data 110(1) may be provided as input to a second GPU 304).

Figure 6:
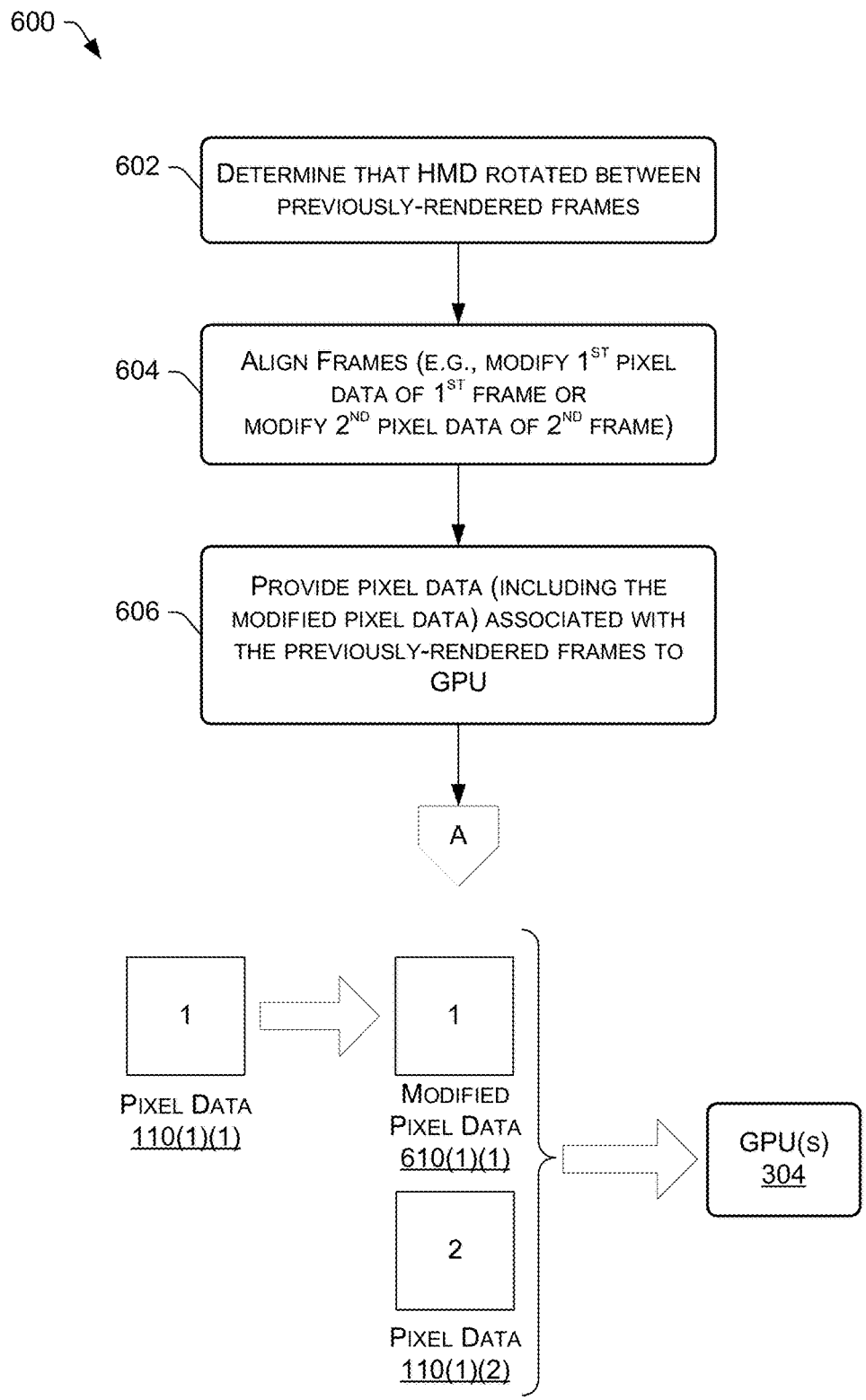
FIG. 6 is a flow diagram of an example process for aligning pixel data of previously-rendered frames before the pixel data is input to a GPU for motion vector estimation, in accordance with embodiments disclosed herein.

FIG. 6 is a flow diagram of an example process 600 for aligning pixel data of previously-rendered frames before the pixel data is input to a GPU for motion vector estimation, in accordance with embodiments disclosed herein. For discussion purposes, the process 600 is described with reference to the previous figures. Furthermore, as shown by the off-page reference "A" in FIGS. 5 and 6, the process 600 may represent operations that are performed prior to the operations at block 504 of FIG. 5, and the process 500 may, in some embodiments, continue with the operations of blocks 504-514.

At 602, logic (e.g., logic of the host computer 106) may determine, based on rotation data received from the HMD 102, that the HMD 102 has rotated from a first orientation to a second orientation between rendering the previously-rendered frames 300 whose pixel data 110(1) is to be provided as input to the GPU 304. For example, a user 104 may have rotated his/her head in a rightward direction between time, t1, and time, t2, which may correspond to the times of rendering the first frame 300(1) and the second frame 300(2).

At 604, the previously-rendered frames 300 may be aligned before the pixel data 110(1) for those frames 300 is provided as input to the GPU 304 of the host computer 106. This is done because of the movement of the HMD 102 between the frames 300, which may have caused objects (both stationary and moving objects) to move between locations over the course of rendering the two frames 300(1) and 300(2). By aligning one frame 300(1) with the other frame 300(2), or vice versa, the pixel data 110(1) that represents particular static objects within the scene can be moved to generally the same location between the two frames 300(1) and 300(2) so that the pixel data 110(1) corresponding to static objects is not mistaken for moving objects by the video encoder of the GPU 304. The alignment at block 604 may include modifying at least one of: (i) the first pixel data 110(1)(1) (associated with the first frame 300(1)) to obtain modified first pixel data 610(1)(1) that aligns a scene in the first frame 300(1) with the second orientation of the HMD 102 at a time of rendering the second frame 300(2), or (ii) the second pixel data 110(1)(2) (associated with the second frame 300(2)) to obtain modified second pixel data that aligns a scene in the second frame 300(2) with the first orientation of the HMD 102 at a time of rendering the first frame 300(1). The diagram at the bottom of FIG. 6 shows the former case—where the first pixel data 110(1)(1) is modified to obtain modified first pixel data 610(1)(1) that aligns a scene in the first frame 300(1) with the second orientation of the HMD 102. It is to be appreciated, however, that either the first pixel data 110(1)(1) or the second pixel data 110(1)(2) can be modified for alignment purposes. The alignment at block 604 may comprise a rotational re-projection modification to one or both of the frames' pixel data to reduce the deltas in the motion vectors 110(2) due to head movement. This reduction in deltas in the motion vectors 110(2) may provide the added benefit of reduced bandwidth in transmitting the motion vectors 110(2) from the host computer 106 to the HMD 102, as described herein.

At 606, the logic of the host computer 106 may provide the modified pixel data of one of the previously-rendered frames 300 and the original pixel data 110(1) of the other frame 300 as input to a GPU 304. The example shown in the diagram of FIG. 6 depicts providing the modified first pixel data 610(1)(1) and the original second pixel data 110(1)(2) as input to the GPU 304. As mentioned, the process 600 may continue from block 606 to block 504 of the process 500 (as shown by the off-page reference "A"). Accordingly, an array of motion vectors 110(2) may be received from the GPU 304 at block 504 based on the pixel data provided as input to the GPU 304 at block 606, and the remaining operations of the motion smoothing algorithm of FIG. 5 may be performed to render a re-projected frame 300(3) that is motion smoothed.

Figure 7:
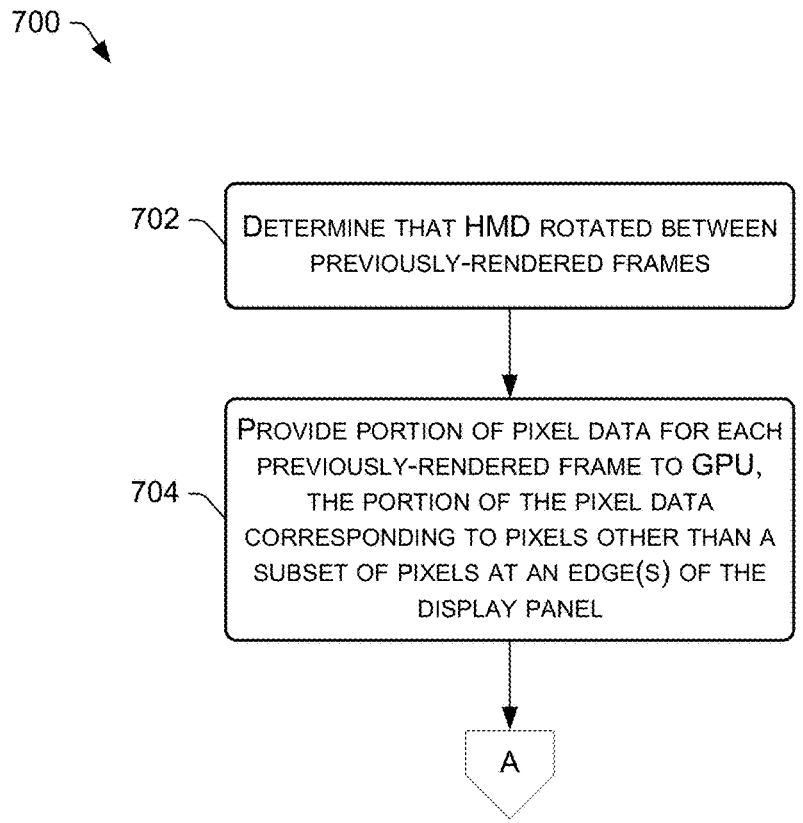
FIG. 7 is a flow diagram of an example process for excluding some pixel data of previously-rendered frames, and providing a remaining portion of the pixel data as input to a GPU for motion vector estimation, in accordance with embodiments disclosed herein.
Figure 7:
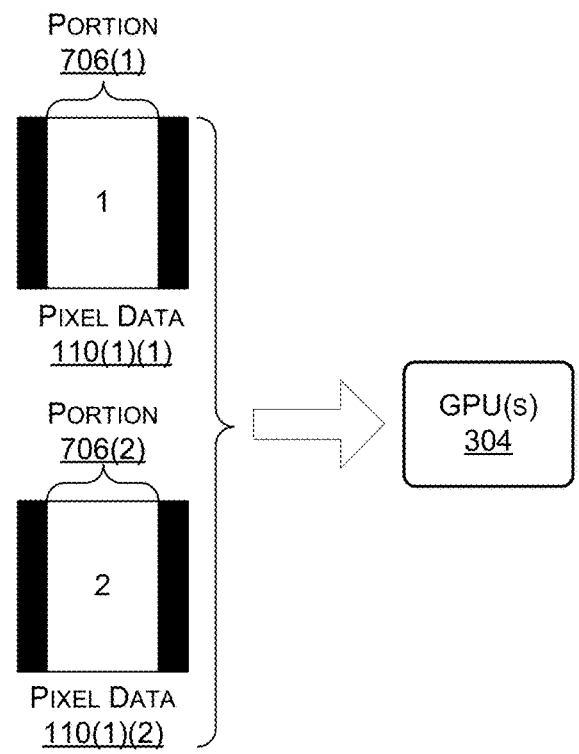

FIG. 7 is a flow diagram of an example process 700 for excluding some pixel data of previously-rendered frames, and providing a remaining portion of the pixel data as input to a GPU for motion vector estimation, in accordance with embodiments disclosed herein. For discussion purposes, the process 700 is described with reference to the previous figures. Furthermore, as shown by the off-page reference "A" in FIGS. 5 and 7, the process 700 may represent operations that are performed prior to the operations at block 504 of FIG. 5, and the process 500 may, in some embodiments, continue with the operations of blocks 504-514.

At 702, logic (e.g., logic of the host computer 106) may determine, based on rotation data received from the HMD 102, that the HMD 102 has rotated from a first orientation to a second orientation between rendering the previously-rendered frames 300 that are to be provided as input to the GPU 304 (e.g., for compression of pixel data). The previously-rendered frames 300 may be the first frame 300(1) and the second frame 300(2) shown in FIG. 3.

At 704, the logic (e.g., logic of the host computer 106) may provide a portion of available pixel data 110(1) as the input to the GPU 304. The portion of the available pixel data 110(1) provided as input to the GPU 304 may include, for example, a portion 706(1) of the first pixel data 110(1)(1) and a portion 706(2) of the second pixel data 110(1)(2) that each corresponds to pixels other than a subset of pixels at one or more edges of a display panel of the HMD 102. For instance, as shown in FIG. 7, the portions 706 of the pixel data 110(1) provided as input to the GPU 304 exclude a remaining portion of the pixel data 110(1) at the left and right edges of the display panel (shown in black in FIG. 7). In other words, the pixel data 110(1) at the left and right edges of the display panel is not provided to the GPU 304 so that the GPU 304 focuses its motion estimation efforts on the center portions 706 of the pixel data 110(1) between the left and right edges of the display panel. For HMD 102 rotation in the positive and/or negative vertical direction, the excluded portion of the pixel data 110(1) may be the top and bottom edges of the image. In any case, excluding a portion of the pixel data 110(1) at the edge(s) of the image, and exclusively providing a remaining portion 706 of the pixel data 110(1) to the GPU 304 effectively results in zero motion vectors 404 at the edge(s) of the image, which may be useful in situations where unwanted visual artifacts manifest near edges of the image that could result in outlier motion vectors 404 that are not otherwise characteristic of a moving object 302. As mentioned, the process 700 may continue from block 704 to block 504 of the process 500 where an array of motion vectors 110(2) is received from the GPU 304 based on the pixel data provided as input to the GPU 304 at block 704, and the motion smoothing algorithm of FIG. 5 may be performed to render a re-projected frame 300(3) that is motion smoothed.

Figure 8:
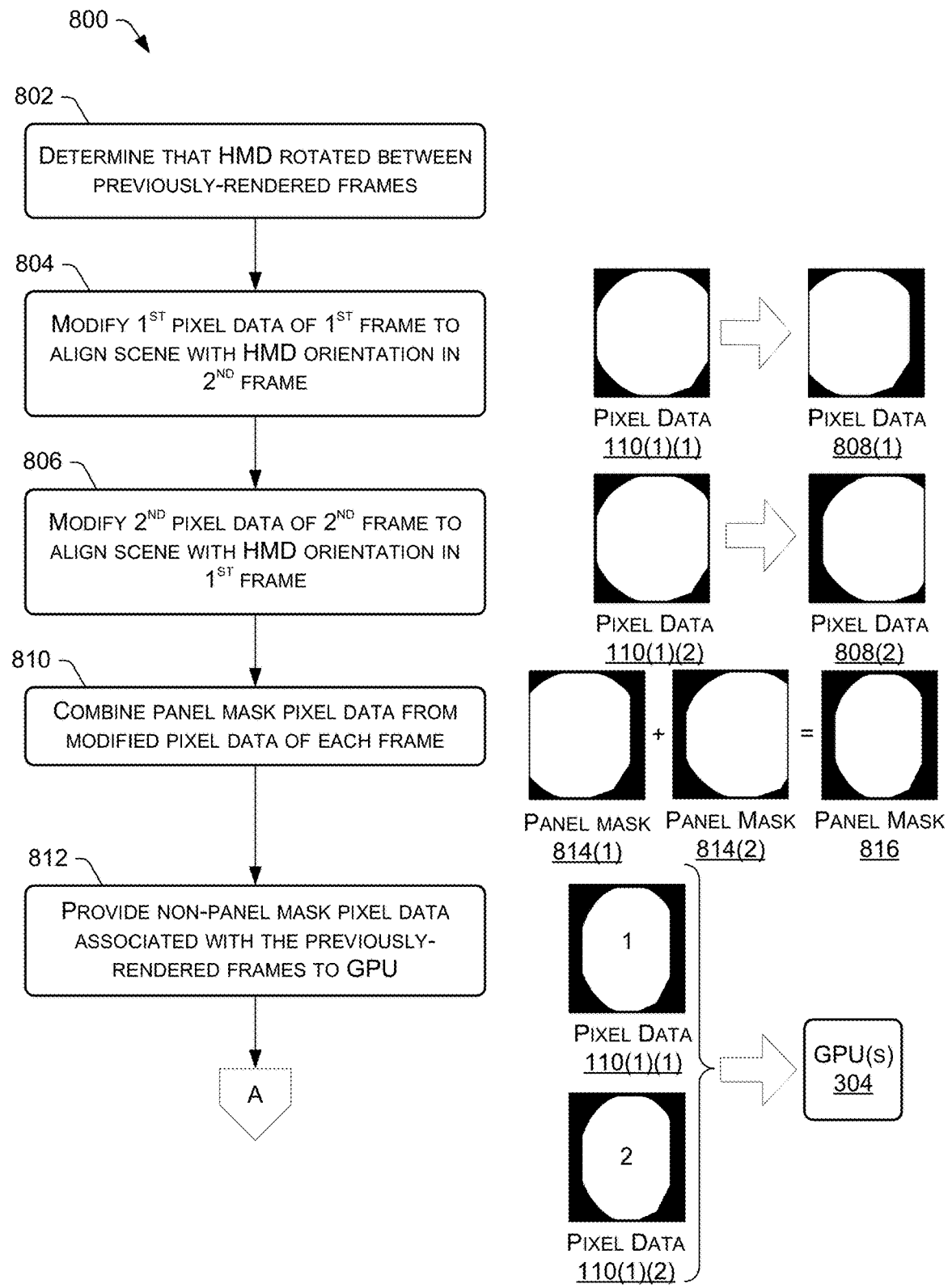
FIG. 8 is a flow diagram of an example process for aligning pixel data of previously-rendered frames, excluding a panel mask portion of the pixel data of the previously-rendered frames, and providing a remaining portion of the pixel data as input to a GPU for motion vector estimation, in accordance with embodiments disclosed herein.

FIG. 8 is a flow diagram of an example process 800 for aligning pixel data of previously-rendered frames, excluding a panel mask portion of the pixel data of the previously-rendered frames, and providing a remaining portion of the pixel data as input to a GPU for motion vector estimation, in accordance with embodiments disclosed herein. For discussion purposes, the process 800 is described with reference to the previous figures. Furthermore, as shown by the off-page reference "A" in FIGS. 5 and 8, the process 800 may represent operations that are performed prior to the operations at block 504 of FIG. 5, and the process 500 may, in some embodiments, continue with the operations of blocks 504-514.

At 802, logic (e.g., logic of the host computer 106) may determine, based on rotation data received from the HMD 102, that the HMD 102 has rotated from a first orientation to a second orientation between rendering the previously-rendered frames 300 that are to be provided as input to the GPU 304. The previously-rendered frames may be the first frame 300(1) and the second frame 300(2) shown in FIG. 3.

At 804, the logic (e.g., logic of the host computer 106) may modify the first pixel data 110(1)(1) associated with the first frame 300(1) to obtain modified first pixel data 808(1) that aligns a scene in the first frame 300(1) with the second orientation of the HMD 102. In the example of FIG. 8, a portion of the first pixel data 110(1)(1) represents data corresponding to a panel mask (shown in black) rendered at a periphery of a display panel of the HMD 102 with each frame. Accordingly, a panel mask portion 814(1) of the modified first pixel data 808(1) (i.e., the portion shown in black in FIG. 8) represents the data corresponding to the panel mask in the modified first pixel data 808(1). As mentioned, the application may be instructed to generate extra pixel data when rendering frames, the extra pixel data corresponding to the panel mask. In this way, there is no effective reduction in the FOV when applying the panel mask.

At 806, the logic (e.g., logic of the host computer 106) may modify the second pixel data 110(1)(2) associated with the second frame 300(2) to obtain modified second pixel data 808(2) that aligns a scene in the second frame with the first orientation of the HMD 102. Again, a portion of the second pixel data 110(1)(2) represents the data corresponding to the panel mask (shown in black) rendered at the periphery of the display panel of the HMD 102 with each frame. Accordingly, a panel mask portion 814(2) of the modified second pixel data 808(2) (i.e., the portion shown in black in FIG. 8) represents the data corresponding to the panel mask in the modified second pixel data 808(2).

At 810, the logic (e.g., logic of the host computer 106) may combine the panel mask portion 814(1) of the modified first pixel data 808(1) with the panel mask portion 814(2) of the modified second pixel data 808(2) to determine a subset of pixels having a common value that corresponds to the panel mask 816. This can be thought of as a Venn diagram of sorts, where the subset of pixels corresponding to the panel mask 816 is a combined version of the modified panel mask in the modified first pixel data 808(1) and the modified second pixel data 808(2).

At 812, the logic (e.g., logic of the host computer 106) may provide, as the input to the GPU 304, a particular portion (e.g., a center portion) of the first pixel data 110(1)(1) and a particular portion (e.g., a center portion) of second pixel data 110(1)(2) that each corresponds to pixels other than the subset of pixels corresponding to the panel mask 816. This allows for the GPU 304 to ignore motion estimations for the portion of the pixel data 110(1) in each previously-rendered frame that is covered by the panel mask 816 pixels, and the GPU 304 can focus its motion estimation efforts on the center, non-panel mask portions of the pixel data 110(1) for each frame 300. As mentioned, the process 800 may continue from block 812 to block 504 of the process 500 where an array of motion vectors 110(2) is received from the GPU 304 based on the pixel data provided as input to the GPU 304 at block 812, and the motion smoothing algorithm of FIG. 5 may be performed to render a re-projected frame 300(3) that is motion smoothed.

Figure 9:
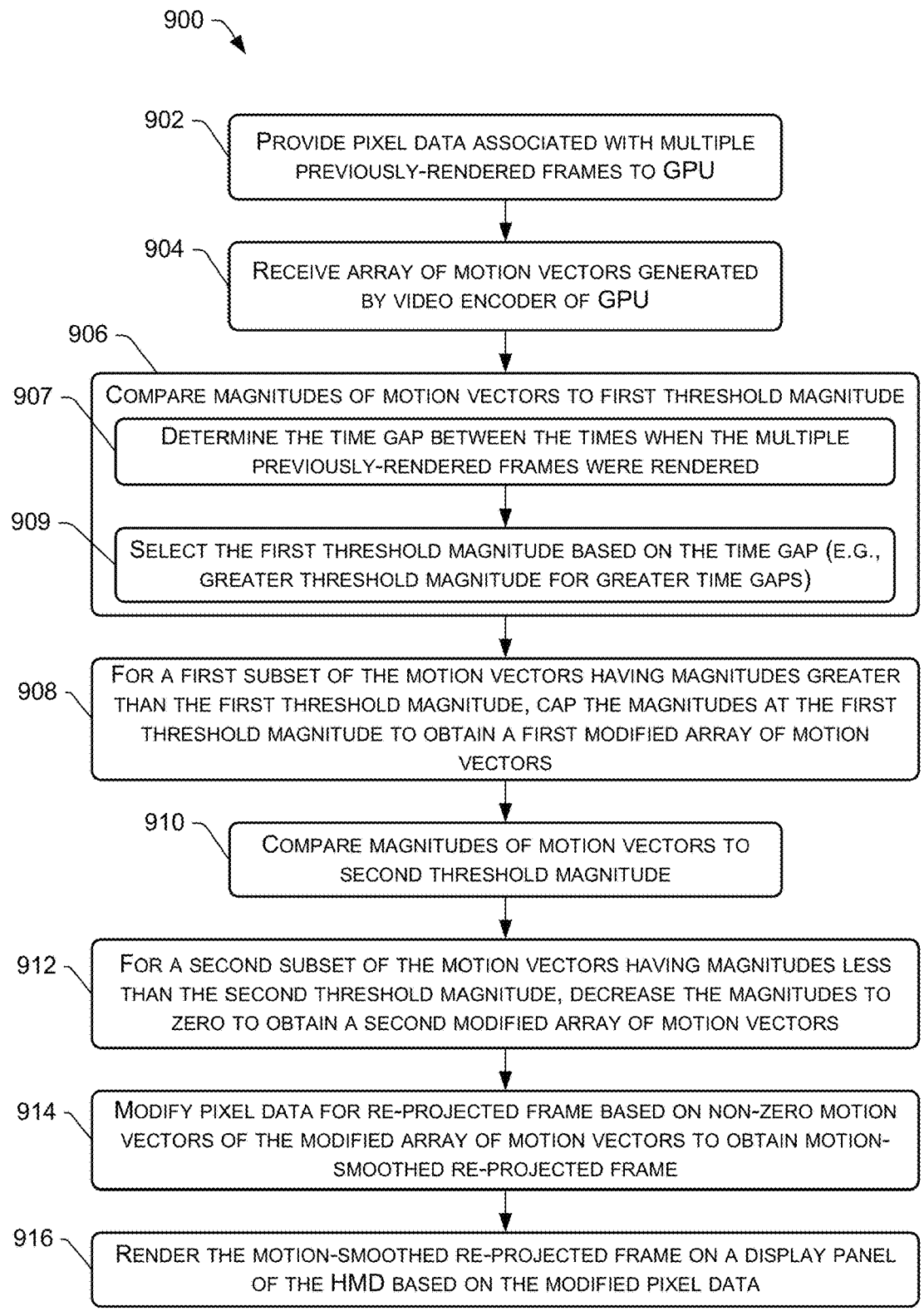
FIG. 9 is a flow diagram of an example process for thresholding the motion vectors that are output from a GPU before they are used to generate a re-projected frame as part of a motion smoothing technique, in accordance with embodiments disclosed herein.

FIG. 9 is a flow diagram of an example process 900 for thresholding the motion vectors that are output from a GPU before they are used to generate a re-projected frame as part of a motion smoothing technique, in accordance with embodiments disclosed herein. For discussion purposes, the process 900 is described with reference to the previous figures.

At 902, logic (e.g., logic of the host computer 106) may provide pixel data 110(1) associated with previously-rendered frames 300 as input to a GPU 304. The operation(s) performed at block 902 may be similar to those described with respect to block 502 of the process 500.

At 904, the logic (e.g., logic of the host computer 106) may receive an array of motion vectors 110(2) from the GPU 304. The operation(s) performed at block 904 may be similar to those described with respect to block 504 of the process 500.

At 906, logic (e.g., logic of the HMD 102, after receipt of the motion vectors 110(2) from the host computer 106) may compare magnitudes (or lengths) of individual motion vectors in the array of motion vectors 110(2) to a first threshold magnitude to determine a first subset of motion vectors 110(2) having magnitudes greater than the first threshold magnitude. The first threshold magnitude may be utilized to mitigate the impact of this subset of high-magnitude outlier motion vectors 110(2), which may represent changes between frames that are something other than movement or animation of a virtual object 302. Unusually high magnitude motion vectors may occur for various reasons. The GPU 304 may find pixels in the top right of the second frame 300(2) to be similar enough to pixels at the bottom left of the first frame 300(1), and may output a resulting motion vector 404 with a relatively high magnitude compared to other motion vectors 404 in the array, even though this motion vector 404 does not represent movement or animation of a virtual object 302 between the frames 300. In some cases, a video game may allow a user to teleport to a different location where the scenes change drastically between frames 300, causing large motion vectors 404 to be generated by the video encoder of the GPU 304. In these, and other cases, it may be useful to threshold these large motion vectors 404.

At 907, when the multiple previously-rendered frames 300 include a first fame 300(1) and a second frame 300(2), the logic (e.g., logic of the HMD 102) may determine a time period (or gap) between a first time when a first frame 300(1) was rendered and a second time when a second frame 300(2) was rendered.

At 909, the first threshold magnitude used in the comparisons at block 906 may be selected based at least in part on the time period between the first time and the second time. In an illustrative example, the first threshold magnitude, measured in degrees of movement from the user's point of view per unit time, is 6 degrees of movement per 11.11 ms of time between the two frames 300(1) and 300(2). Thus, the longer in time the two frames 300(1) and 300(2) are apart, the greater the first threshold magnitude, and, hence, the longer (in magnitude) the motion vectors 110(2) are allowed to be. This is because once you have motion past a certain speed, motion smoothing may not be as effective, and may actually cause adverse visual artifacts (e.g., by making parts of the scene look "swimmy").

At 908, the logic (e.g., logic of the HMD 102) may decrease the magnitudes of the first subset of motion vectors 110(2) determined to have magnitudes greater than the first threshold magnitude so that the magnitudes are capped at the first threshold magnitude. This creates a first modified array of motion vectors 110(2). In other words, for those motion vectors 110(2) that exceed the first threshold magnitude, the logic is configured to cap (or limit) the magnitude of those motion vectors 110(2) to the first threshold magnitude so that the first modified array of motion vectors 110(2) includes magnitudes that are equal to or less than the first threshold magnitude, and does not include any magnitudes that are greater than the first threshold magnitude. In some embodiments, instead of capping the magnitudes of the motion vectors 110(2) at a first threshold magnitude and using all of the non-zero motion vectors for motion smoothing, the logic may discard the first subset of motion vectors 110(2) having magnitudes that meet or exceed the first threshold magnitude so that they are not used in motion smoothing at all.

At 910, the logic (e.g., logic of the HMD 102) may compare magnitudes (or lengths) of individual motion vectors in the array of motion vectors 110(2) to a second threshold magnitude to determine a second subset of motion vectors 110(2) having magnitudes less than the second threshold magnitude. The second threshold magnitude may be utilized to mitigate the impact of this subset of low-magnitude outlier motion vectors 404, which may represent changes between frames that are often caused by constant head movement of the user and/or head tracking that, while precise, is not precise to the degree of absolute zero motion. Because of this, the output of the GPU 304 seldom provides zero-length motion vectors 404. Rather, it is more common for the output of the GPU 304 to have a significant amount of noise due to ambient head motion and/or tracking jitter, as noted above. In other words, the pixels between two consecutive frames rarely match up 100%. In an illustrative example, the second threshold magnitude, measured in pixels of motion, is a threshold of 2 pixels of motion. In this example, any motion vectors with magnitudes (or lengths) less than 2 pixels of motion, are considered low-magnitude outlier vectors.

At 912, the logic (e.g., logic of the HMD 102) may decrease the magnitudes of the second subset of motion vectors 110(2) determined to have magnitudes less than the second threshold magnitude (e.g., the low-magnitude outlier motion vectors with lengths less than 2 pixels of motion) to a length/magnitude of zero. This creates a second modified array of motion vectors 110(2) that does not include any motion vectors with magnitudes less than the second threshold magnitude. This is sometimes referred to herein as applying a small dead-zone to the motion vectors 110(2).

At 914, the logic (e.g., logic of the HMD 102) may modify the pixel data 110(1)(3) for the re-projected frame based on the second modified array of motion vectors 110(2) with magnitudes capped at the first threshold magnitude and without any motion vectors 404 with magnitudes less than the second threshold. In some embodiments, such as when a first subset of motion vectors are discarded instead of being capped at the first threshold magnitude, a remaining subset of motion vectors 110(2) other than the discarded first subset of motion vectors 110(2) are used to modify the pixel data 110(1)(3) for the re-projected frame at block 914. The modification of the pixel data 110(1)(3) may include any of the techniques described herein (e.g., those described with reference to block 508-512 of the process 500).

At 916, the logic (e.g., logic of the HMD 102) may render the re-projected frame 300(3) on a display (e.g., on a display panel(s) of the HMD 102) based at least in part on the modified pixel data 110(1)(3)' for the re-projected frame 300(3). The operation(s) performed at block 916 may be similar to those described with respect to block 514 of the process 500.

Figure 10:
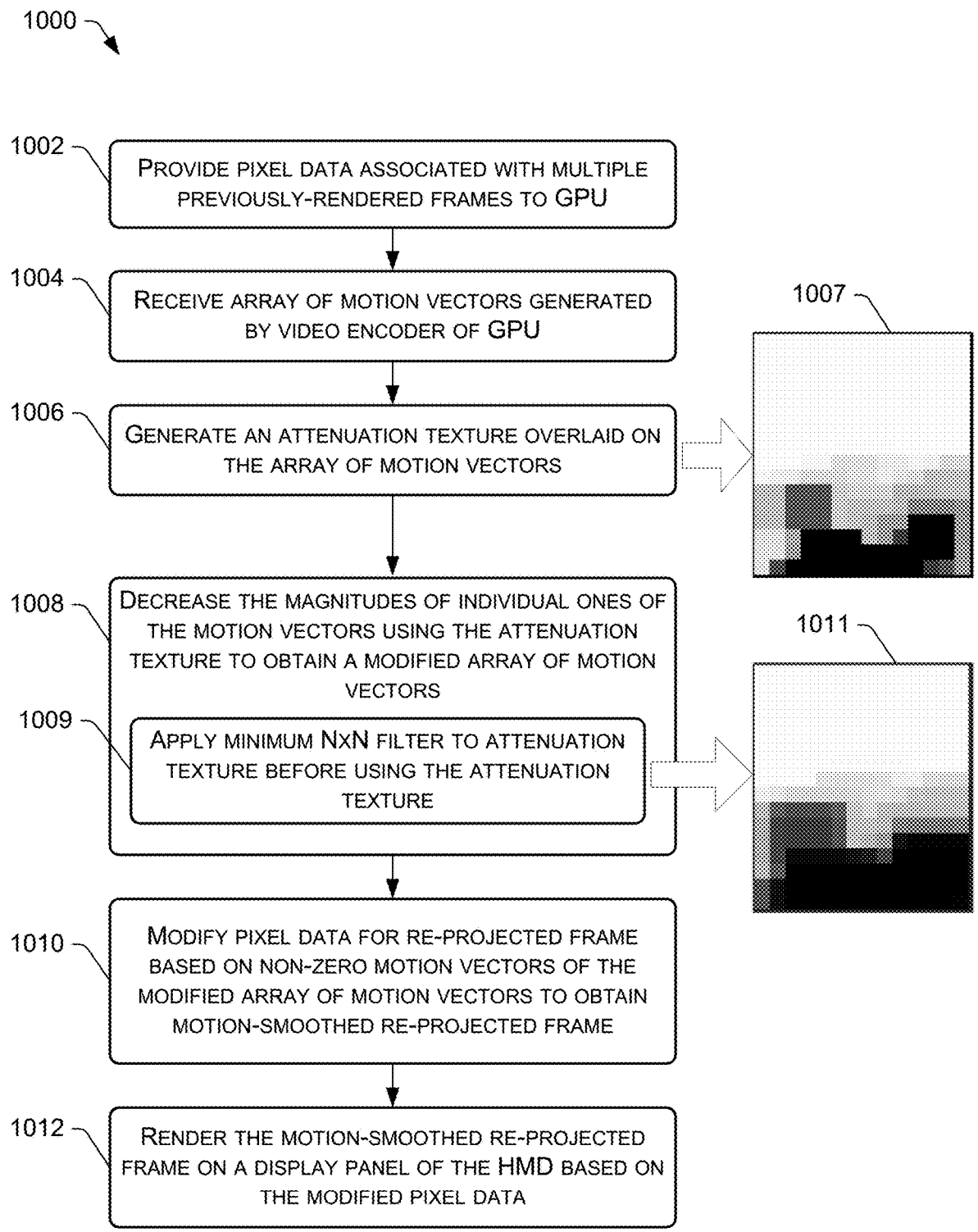
FIG. 10 is a flow diagram of an example process for attenuating the motion vectors that are output from a GPU before they are used to generate a re-projected frame as part of a motion smoothing technique, in accordance with embodiments disclosed herein.

FIG. 10 is a flow diagram of an example process 1000 for attenuating the motion vectors that are output from a GPU before they are used to generate a re-projected frame as part of a motion smoothing technique, in accordance with embodiments disclosed herein. For discussion purposes, the process 1000 is described with reference to the previous figures.

At 1002, logic (e.g., logic of the host computer 106) may provide pixel data 110(1) associated with previously-rendered frames 300 as input to a GPU 304. The operation(s) performed at block 1002 may be similar to those described with respect to block 502 of the process 500.

At 1002, the logic (e.g., logic of the host computer 106) may receive an array of motion vectors 110(2) from the GPU 304. The operation(s) performed at block 1004 may be similar to those described with respect to block 504 of the process 500.

At 1006, the logic (e.g., logic of the HMD 102, after receipt of the motion vectors 110(2) from the host computer 106) may generate an attenuation texture overlaid on the array of motion vectors 110(2) for purposes of attenuating (e.g., shortening, decreasing, etc.) the magnitudes of individual ones of the motion vectors 110(2) (e.g., if there is a low confidence in the quality of those motion vectors 110(2)). The attenuation texture may be generated at any suitable resolution such that the attenuation texture includes a plurality of texels (e.g., a grid of texels). The resolution of the attenuation texture can be a lower resolution than the resolution of the array of motion vectors 110(2) such that multiple motion vectors are within an individual texel of the attenuation texture. In an example, the attenuation texture can have a resolution such that a texel in the center of the user's field of view (FOV) is approximately 6 degrees by 6 degrees (horizontally and vertically). The resolution per texel (horizontal and vertical) may be approximate because the number of degrees per texel may not be constant across the attenuation texture. For example, the FOV of the HMD 102 may span roughly 100 degrees by 100 degrees (e.g., plus or minus about 10 degrees) in area. The attenuation texture may be generated based on a non-linear projection matrix so that the resolution varies per texel of the attenuation texture, but the resolution provides texels that are roughly 6-10 degrees×6-10 degrees. Furthermore, each texel of the attenuation texture may be assigned an attenuation value (e.g., within a range of 0.0 and 1.0). The attenuation value assigned to a given texel controls the amount by which the magnitudes of the motion vectors 404 in that texel are decreased (shortened). For example, an attenuation value of 1.0 may correspond to no attenuation, and, hence, applying an attenuation value of 1.0 to a motion vector 404 means that the motion vector 404 is left as-is (e.g., not decreased, shortened, etc.) in terms of its magnitude. An attenuation value of 0.0, however, may correspond to full attenuation, and, hence, applying an attenuation value of 0.0 to a motion vector 404 means that the motion vector 404 is decreased to zero in terms of its magnitude. An attenuation value between 0.0 and 1.0 may correspond to partial attenuation, and, hence, applying an attenuation value of say, 0.5, to a motion vector 404 means that the motion vector is decreased to 50% (half) of its original length (magnitude). Accordingly, the attenuation texture can decrease (shorten) the magnitude of a motion vector 404, but it cannot increase (lengthen) the magnitude of a motion vector 404.

FIG. 10 shows an example attenuation texture 1007, which may have been generated at block 1006 based on sudden change in luminance (or color) at the bottom of the screen between two consecutively-rendered frames 300. For example, while playing a video game, the user of the HMD 102 may select a button on a handheld controller which causes a large blue mesh to appear at the bottom half of the screen on the next rendered frame 300. In this example scenario, the GPU 304, when processing this frame 300 and a previously-rendered frame 300 as input, may find pixels in the sky that is rendered at the top of the scene with luminance values that best match the luminance values of the pixels in the large blue mesh at the bottom half of the screen. This results in the GPU 304 outputting a motion vector field 110(2) with motion vectors 404 at the bottom of the scene that are suddenly very large in magnitude, and which do not represent actual motion in the scene. In the example attenuation texture 1007, white-colored texels may represent an attenuation value of 1.0, whereas black-colored texels may represent an attenuation value of 0.0, and shades of grey-colored texels represent attenuation values between 0.0 and 1.0, exclusive.

At 1008, the logic (e.g., logic of the HMD 102) may decrease (e.g., scale down) the magnitudes of the individual motion vectors 404 in the array of motion vectors 110(2) using the attenuation texture generated at block 1006 (e.g., using the attenuation values of the attenuation texture to decrease the magnitudes of the motion vectors 110(2) by amounts corresponding to the attenuation values). This creates a modified array of motion vectors 110(2), assuming at least one attenuation value less than 1.0 in the attenuation texture. The objective is to scale down motion vectors 404 that have changed more than a threshold amount between frames 300, which most likely indicates that these motion vectors 404 don't represent actual motion within the scene and should not be mistaken for representing motion. The attenuation texture is used to find areas of the screen where the motion vectors in those areas are extreme (in terms of their magnitude) in a single frame, which indicates that either the motion vectors can't be trusted to represent actual motion, or, if they do represent actual motion within the scene, such motion is too fast for motion smoothing to have a noticeable impact anyway, and it is preferable to have a zero motion vector than to attempt motion smoothing using those motion vectors. Realistically, whenever you have motion, frame-to-frame, the motion is typically not that much different from the previous frame because the refresh rate of the display is typically on the order of 90 Hz, and it is difficult for anything to move very far in that short of time between frames. Thus, more often than not, these extreme motion vectors 404 attenuated by the attenuation texture do not represent actual motion.

As shown by sub-block 1009, in some embodiments, using the attenuation texture at block 1008 to decrease the magnitudes of the motion vectors may include applying a minimum N×N filter to the attenuation texture before using the attenuation texture to decrease the magnitudes of the motion vectors. Here, N can be any suitable number. N=3 uses a minimum 3×3 filter (i.e., 3×3 block of texels). Using the example of N=3, in applying the minimum 3×3 filter to the attenuation texture at block 1009, the logic (e.g., logic of the HMD 102) may fetch, on a per-texel basis from the attenuation texture 1007, the minimum value among the 9 attenuation values in each 3×3 block of texels centered on the corresponding texel (e.g., a block of texels including the corresponding texel and its 8 neighboring texels). Applying this minimum N×N filter at block 1009 typically results in zeroing out even more motion vectors 404 because any corresponding texel of the attenuation texture that is assigned a non-zero attenuation value, but that has a neighboring texel assigned an attenuation value of zero, will apply the attenuation value of zero to the corresponding motion vectors of that corresponding texel, thereby decreasing the motion vectors in the corresponding texel to zero, despite the corresponding texel being assigned a non-zero attenuation value in the attenuation texture 1007. In other words, motion vectors 404 in a given texel of the attenuation texture are zeroed out if a neighboring texel is assigned an attenuation value of zero, which means that the neighboring texel has lots of high-magnitude motion vectors. FIG. 10 shows an example attenuation texture 1011 that is a result of applying a minimum N×N filter to the attenuation texture 1007. The resulting attenuation texture 1011 includes more black-colored texels than the attenuation texture 1007, which means that more motion vectors are zeroed out using the resulting attenuation texture 1011.

At 1010, the logic (e.g., logic of the HMD 102) may modify the pixel data 110(1)(3) for the re-projected frame based on the modified array of motion vectors 110(2) with perhaps some of the magnitudes attenuated for attenuation values less than 1.0 in the attenuation texture. The modification of the pixel data 110(1)(3) may include any of the techniques described herein (e.g., those described with reference to block 508-512 of the process 500).

At 1012, the logic (e.g., logic of the HMD 102) may render the re-projected frame 300(3) on a display (e.g., on a display panel(s) of the HMD 102) based at least in part on the modified pixel data 110(1)(3)' for the re-projected frame 300(3). The operation(s) performed at block 1012 may be similar to those described with respect to block 514 of the process 500.

Figure 11:
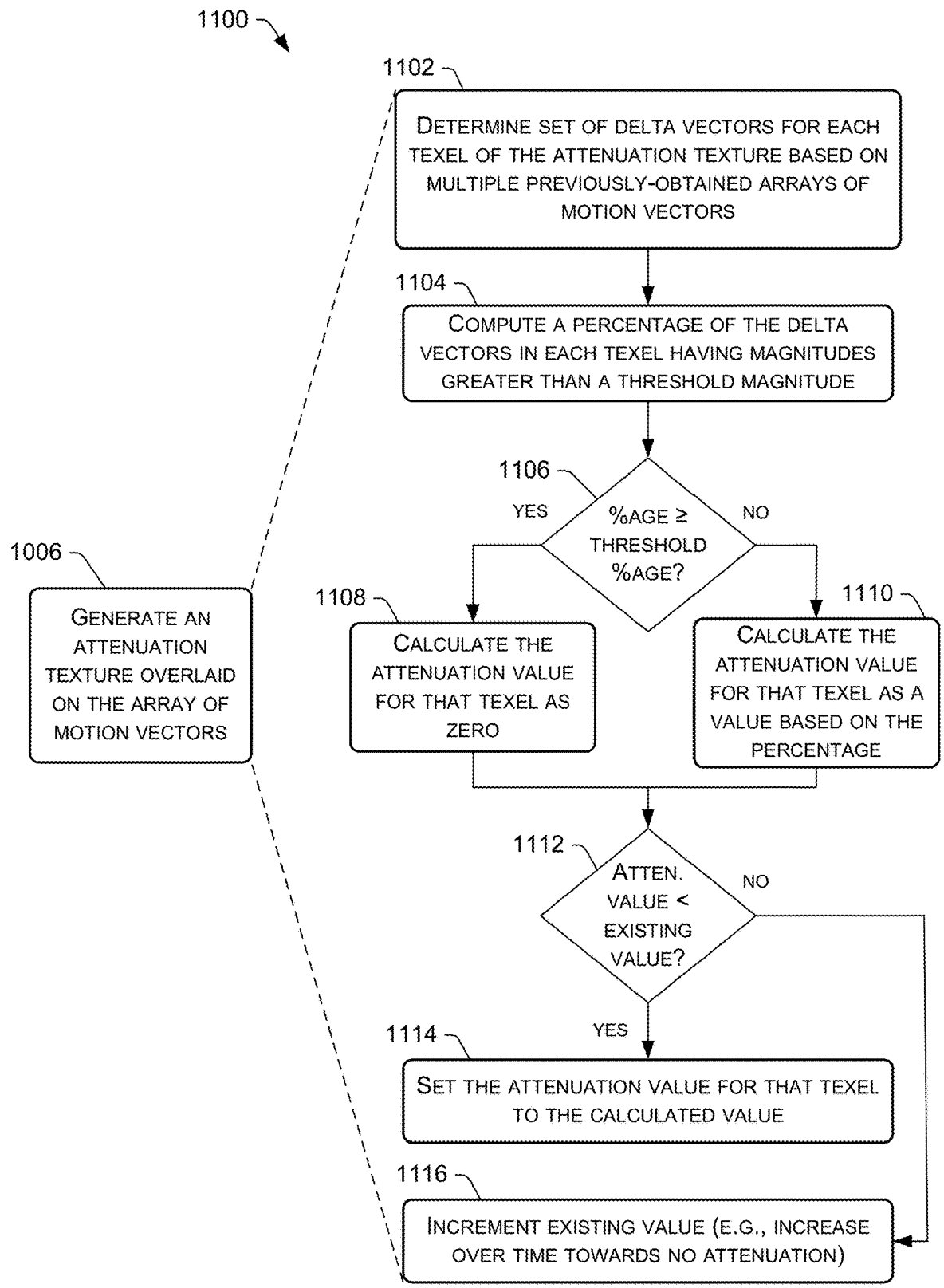
FIG. 11 is a flow diagram of an example process for generating an attenuation texture, which may be used to attenuate the motion vectors that are output from the GPU before they are used to generate a re-projected frame as part of a motion smoothing technique, in accordance with embodiments disclosed herein.

FIG. 11 is a flow diagram of an example process 1100 for generating an attenuation texture, which may be used to attenuate the motion vectors that are output from the GPU before they are used to generate a re-projected frame as part of a motion smoothing technique, in accordance with embodiments disclosed herein. Accordingly, the process 1100 may represent a sub-process of operations that may be performed to generate the attenuation texture at block 1006 of the process 1000. For discussion purposes, the process 1100 is described with reference to the previous figures.

At 1102, after receiving an array of motion vectors 110(2) from the host computer 106, logic of the HMD 102 may determine a set of delta vectors for each texel of the attenuation texture based at least in part on multiple previously-obtained arrays of motion vectors 110(2). For example, a history of arrays of motion vectors 110(2) may be maintained as a series of frames are processed, and the last two arrays of motion vectors 110(2) (e.g., the two most recent arrays of motion vectors 110(2)) may be compared to determine the set of delta vectors at block 1102 (e.g., difference vectors that indicate the difference (e.g., in terms of magnitude) between a pair of corresponding motion vectors in the two arrays).

At 1104, the logic (e.g., logic of the HMD 102) may compute a percentage of the delta vectors in each texel of the attenuation texture that have a magnitude greater than a threshold magnitude. For example, the logic, at block 1104, may evaluate the delta vectors in a given texel of the attenuation texture, identify "outlier" vectors in the texel as those delta vectors having a delta (e.g., magnitude) greater than a threshold magnitude, and compute the percentage of the outlier vectors in the texel. Any suitable threshold can be used for the purpose of identifying "outlier" vectors at block 1104, such as a threshold of about 3 degrees of movement/motion (from the user's point of view) per frame (or per 11.11 ms of time). In other words, the threshold used at block 1104 may be based on the time period (or gap) between a first time when a first frame 300(1) was rendered and a second time when a second frame 300(2) was rendered, as was described above with reference to blocks 907 and 909 of the process 900 of FIG. 9.

At 1106, the logic (e.g., logic of the HMD 102) may determine, for each texel of the attenuation texture, whether the percentage of the delta vectors in the texel that are "outlier" delta vectors meets or exceeds a threshold percentage, such as 25%. If the percentage of the delta vectors in the texel that are "outlier" delta vectors meets or exceeds the threshold percentage at block 1106, the process 1100 may follow the "YES" route from block 1106 to block 1108.

At 1108, the logic (e.g., logic of the HMD 102) may calculate the attenuation value as zero for the texels that have a number of "outlier" delta vectors that meets or exceeds the threshold percentage. In other words, the logic may calculate the attenuation value for a given texel as zero if a certain amount (e.g., 25% or more) of the delta vectors for that texel are greater than a maximum length. Applying an attenuation value of zero, as described in the process 1000, to motion vectors 404 within a given texel decreases the magnitudes of those motion vectors 404 to zero (e.g., to fully attenuate the motion vectors within that texel).

At 1106, for texels that have less than the threshold percentage of "outlier" delta vectors, the process 1100 may follow the "NO" route from block 1106 to block 1110, where the logic may calculate the attenuation value for those texels as an attenuation value that is based at least in part on the percentage computed at block 1104. For instance, if the percentage of delta vectors having magnitudes greater than the threshold magnitude for a given texel is less than a threshold percentage (e.g., 25%), the attenuation value can be set as a value that maps linearly to the percentage that was computed within a range of values less than the threshold percentage (e.g., within the range of 0%-25%). The attenuation value calculated at block 1110 are effective (when the attenuation texture is applied to the motion vector field 110(2)) to reduce noise in the remaining vectors that are not zeroed out.

At 1112, the calculated attenuation value may be compared to an existing attenuation value for that texel, based on the previously-rendered frame 300. If the attenuation value is less than the existing value at block 1112, the process 1100 may follow the "YES" route from block 1112 to block 1114, where the attenuation value for the texel is set to the attenuation value calculated at block 1108 or 1110. For instance, if there was no attenuation for that texel of the attenuation texture in the previous frame, the existing attenuation value might be equal to 1.0, and if the new attenuation value calculated at block 1108 or 1110 is less than 1.0, in this example, the attenuation value is set to that newly calculated attenuation value to attenuate the motion vectors in the given texel.

At 1112, if the calculated attenuation value is not less than the existing value for the texel in question, the process 1100 may follow the "NO" route from block 1112 to block 1116, where the existing attenuation value is incremented over time towards a maximum attenuation value (e.g., 1.0) corresponding to no attenuation. For instance, because some situations can cause erratic motion vectors that change from frame to frame, the new attenuation values can be "blended" over the previous (old) attenuation values for the texels of the attenuation texture, which means that the attenuation value incrementally increases over a period of time (e.g., over a period of 1 second) to no attenuation, assuming the calculated attenuation value is never less than the existing attenuation value for the texel over that period of time.

Figure 12:
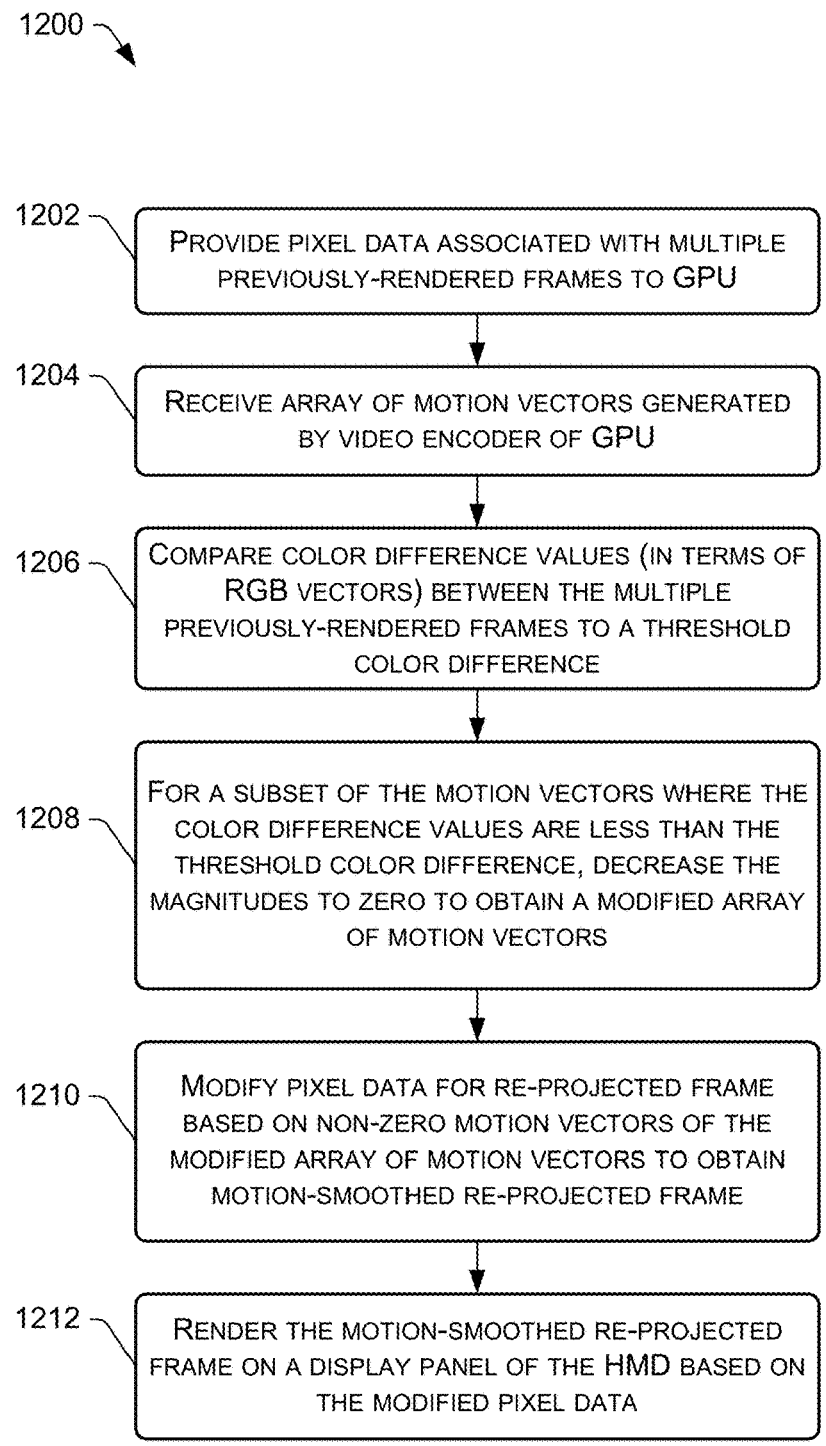
FIG. 12 is a flow diagram of an example process for zeroing out motion vectors that correspond to areas of little-to-no color change before a resulting set of motion vectors is used to generate a re-projected frame as part of a motion smoothing technique, in accordance with embodiments disclosed herein.

FIG. 12 is a flow diagram of an example process 1200 for zeroing out motion vectors that correspond to areas of little-to-no color change before a resulting set of motion vectors is used to generate a re-projected frame as part of a motion smoothing technique, in accordance with embodiments disclosed herein. For discussion purposes, the process 1200 is described with reference to the previous figures.

At 1202, logic (e.g., logic of the host computer 106) may provide pixel data 110(1) associated with previously-rendered frames 300 as input to a GPU 304. The operation(s) performed at block 1202 may be similar to those described with respect to block 502 of the process 500.

At 1204, the logic (e.g., logic of the host computer 106) may receive an array of motion vectors 110(2) from the GPU 304. The operation(s) performed at block 1204 may be similar to those described with respect to block 504 of the process 500.

At 1206, the logic (e.g., logic of the HMD 102, after receipt of the motion vectors 110(2) from the host computer 106) may compare color pixel values (in terms of RGB vectors) between the multiple previously-rendered frames 300 that were input to the GPU 304 to determine a color difference value per motion vector in the array of motion vectors 110(2). These color difference values can be compared to a threshold color difference to determine a subset of motion vectors 110(2) that are associated with little-to-no color change between frames because their color difference values are less than the threshold color difference. In some embodiments, the logic treats an RGB pixel value as a vector. The corresponding RGB vectors between the previously-rendered fames 300 are then compared in order to determine a difference (e.g., a delta vector) in color. Because each motion vector 404 in the array of motion vectors 110(2) may correspond to a block of pixels (e.g., an 8×8 block of pixels), such a color comparison may be performed on a per-motion-vector basis by comparing some or all of the RGB pixel values in an 8×8 block of pixels between frames 300. In some embodiments, the logic (e.g., logic of the HMD 102) compares color values for every other row of pixels and every other column of pixels in each 8×8 block of pixels that corresponds to a single motion vector 404 in order to determine an amount of color change (e.g., a color difference value) between frames 300, the amount of color change being associated with the particular motion vector 404. Thus, with respect to a block of pixels corresponding to a given motion vector 110(2), the color comparison between frames may involve comparing a portion (e.g., 25%) of the pixels in the corresponding blocks of pixels to conserve processing resources.

At 1208, the logic (e.g., logic of the HMD 102) may decrease, to a length/magnitude of zero, the magnitudes of the subset of motion vectors 110(2) where the color difference values are less than the threshold color difference. This creates a modified array of motion vectors 110(2) that does not include any motion vectors in areas of the scene where there was little-to-no color change between the previously-rendered frames (sometimes referred to as zero motion color differences). This can help prevent text from looking blurry or squiggly around the edges when the text is in front of a solid-colored background, for example. It also can help prevent visually-distracting artifacts from appearing whenever lights or other user interface elements in the scene gradually become brighter or dimmer.

At 1210, the logic (e.g., logic of the HMD 102) may modify the pixel data 110(1)(3) for the re-projected frame based on the modified array of motion vectors 110(2), which no longer includes any motion vectors 404 in areas where the color is effectively the same between the previously-rendered frames 300. The modification of the pixel data 110(1)(3) may include any of the techniques described herein (e.g., those described with reference to block 508-512 of the process 500).

At 1212, the logic (e.g., logic of the HMD 102) may render the re-projected frame 300(3) on a display (e.g., on a display panel(s) of the HMD 102) based at least in part on the modified pixel data 110(1)(3)' for the re-projected frame 300(3). The operation(s) performed at block 1212 may be similar to those described with respect to block 514 of the process 500.

Figure 13:
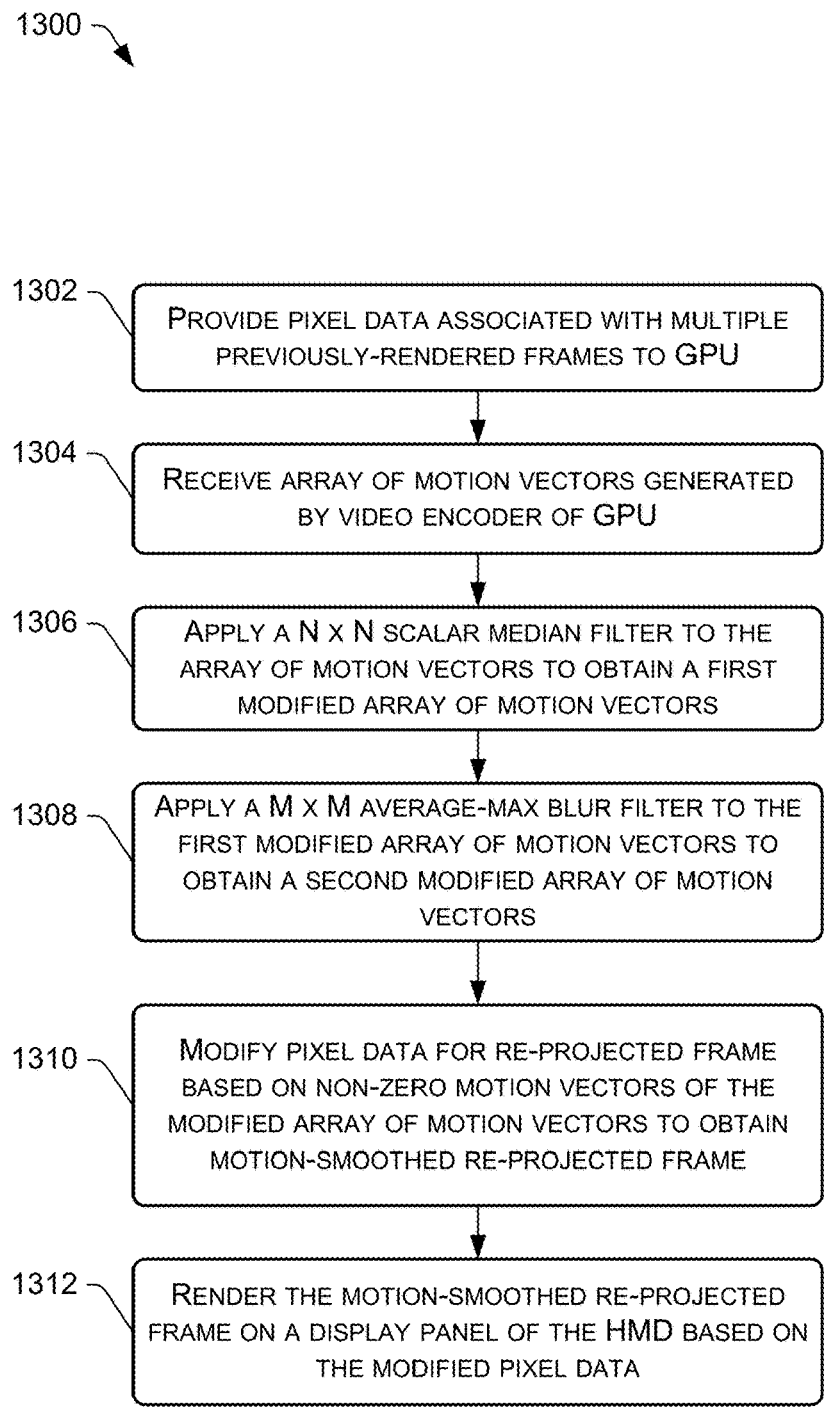
FIG. 13 is a flow diagram of an example process for "cleaning up" the motion vector field using one or more filters before a resulting set of motion vectors is used to generate a re-projected frame as part of a motion smoothing technique, in accordance with embodiments disclosed herein.

FIG. 13 is a flow diagram of an example process 1300 for "cleaning up" the motion vector field using one or more filters before a resulting set of motion vectors is used to generate a re-projected frame as part of a motion smoothing technique, in accordance with embodiments disclosed herein. For discussion purposes, the process 1300 is described with reference to the previous figures.

At 1302, logic (e.g., logic of the host computer 106) may provide pixel data 110(1) associated with previously-rendered frames 300 as input to a GPU 304. The operation(s) performed at block 1302 may be similar to those described with respect to block 502 of the process 500.

At 1304, the logic (e.g., logic of the host computer 106) may receive an array of motion vectors 110(2) from the GPU 304. The operation(s) performed at block 1304 may be similar to those described with respect to block 504 of the process 500.

At 1306, logic (e.g., logic of the HMD 102, after receipt of the motion vectors 110(2) from the host computer 106) may apply a N×N scalar median filter to the array of motion vectors 110(2) to obtain a first modified array of motion vectors 110(2). Here, N can be any suitable number, such as N=5, which would apply a 5×5 scalar median filter. In the example with N=5, the 5×5 scalar median filter is applied to each motion vector in the array of motion vectors 110(2) by looking at the 5×5 set of motion vectors 110(2) surrounding the selected motion vector. For a selected motion vector, the 5×5 area surrounding the selected vector has 25 motion vectors. The scalar median filter applied to the selected motion vector calculates the median x-component value (among the 25 x-component values), and the median y-component value (among the 25 y-component values), and then combines the median x-component value and the median y-component value to obtain the scalar median vector, and the selected motion vector may be replaced with the scalar median vector. This process iterates for each vector in the array of motion vectors 110(2). Again, any suitable value for N can be used, and N=5 is merely an example. Applying the scalar median filter at block 1306 reduces noise in the motion vector field 110(2) and helps remove outlier motion vectors. Using a scalar median filter at block 1306 is also computationally faster than applying more complex filters, such as a vector median filter, which would rely on a more complex distance algorithm that is more computationally intensive.

At 1308, the logic (e.g., logic of the HMD 102) may apply a M×M average-max blur filter to the first modified array of motion vectors 110(2) to obtain a second modified array of motion vectors 110(2). Here, M can be any suitable number, such as M=3, which would apply a 3×3 average-max blur filter. The average-max blur filter applies two separate filters independently (an average vector filter and a max-length vector filter), and then takes the vector average of the resulting vectors from those two independently-applied filters. In the example using M=3, the 3×3 average-max blur filter is applied to each motion vector in the array of motion vectors 110(2) by looking at the 3×3 set of motion vectors 110(2) surrounding the selected motion vector. For a selected motion vector, the 3×3 area surrounding the selected vector has 9 motion vectors. First, an average vector filter is applied to the selected motion vector, which calculates the average x-component value (among the 9 x-component values), and the average y-component value (among the 9 y-component values), and then combines the average x-component value and the average y-component value to obtain the average vector. Next, a max-length vector filter is independently applied to the selected motion vector, which determines the longest vector (among the 9 motion vectors). A resulting vector is then determined by taking the vector average of the average vector and the longest vector, and the selected motion vector may be replaced with the resulting vector. This process iterates for each vector in the array of motion vectors 110(2). Again, any suitable value for M can be used, and M=3 is merely an example. Applying the average-max blur filter at block 1308 provides a smoothed-out motion vector field that removes discontinuities in sub-areas of groups of motion vectors. In some embodiments, applying the average-max blur filter at block 1308 is a final "cleanup" step on the motion vector field 110(2) before the motion vector field 110(2) is used for motion smoothing, as described herein. For instance, if used in combination with the other techniques described herein, such as thresholding motion vectors, using the attenuation texture, zeroing out vectors in areas of little-to-no color difference, etc., these various operations may be performed prior to applying the average-max blur filter.

At 1310, the logic (e.g., logic of the HMD 102) may modify the pixel data 110(1)(3) for the re-projected frame based on the modified array of motion vectors 110(2) with the filtered motion vectors. The modification of the pixel data 110(1)(3) may include any of the techniques described herein (e.g., those described with reference to block 508-512 of the process 500).

At 1312, the logic (e.g., logic of the HMD 102) may render the re-projected frame 300(3) on a display (e.g., on a display panel(s) of the HMD 102) based at least in part on the modified pixel data 110(1)(3)' for the re-projected frame 300(3). The operation(s) performed at block 1312 may be similar to those described with respect to block 514 of the process 500.

It is to be appreciated that the various techniques described in the processes of FIGS. 9-13 (various techniques to modify the motion vector field output by the GPU 304) can be used in any combination and/or any order. For example, the techniques described with reference to FIG. 9 can be used in combination with the techniques described with reference to FIGS. 10 and 11, and some or all of those techniques can be used in combination with the techniques described with reference to FIG. 12, and some or all of those techniques can be used in combination with the techniques described with reference to FIG. 13. That is to say, a robust technique of obtaining an optimized motion vector field may utilize all of the techniques described with reference to FIGS. 9-13 together in a robust modification of the motion vector field. Furthermore, it is to be appreciated that, in the distributed system including a host computer 106 and a communicatively coupled HMD 102, some or all of the various techniques described in the processes of FIGS. 9-13 (various techniques to modify the motion vector field output by the GPU 304) can be performed on the host computer 106. For example, the host computer 106 may be configured to threshold the motion vectors (e.g., using an attenuation texture), and/or apply a filter to the motion vectors prior to sending a modified array of motion vectors to the HMD 102 for use in motion smoothing. In this scenario, the modified array of motion vectors 110(2) might be sent out-of-band from the compressed pixel data 110(1), and/or the zero motion vectors in the modified array of motion vectors 110(2) may be run-length encoded to compress the motion vector data prior to transmission of the motion vectors to the HMD 102.

Figure 14:
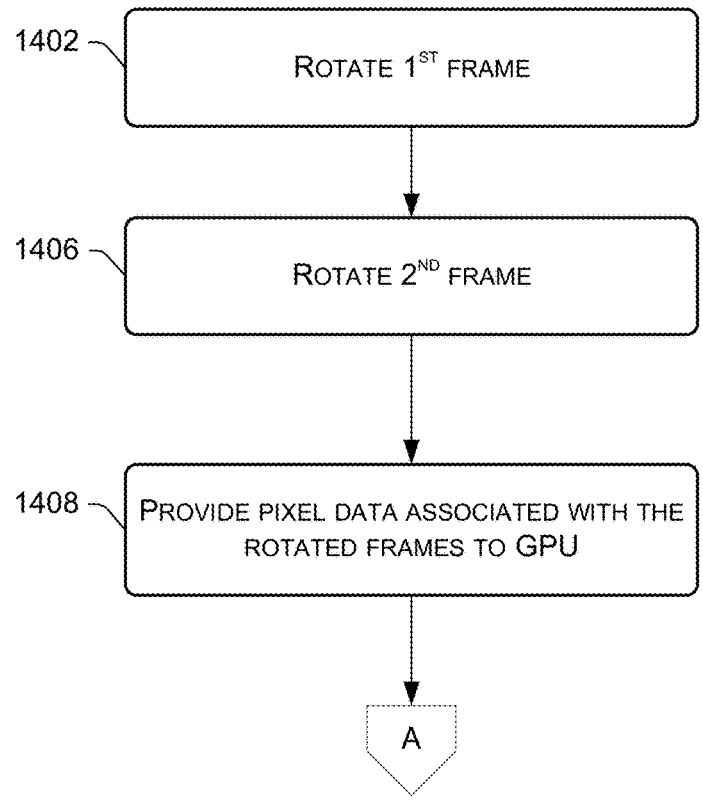
FIG. 14 is a flow diagram of an example process for rotating previously-rendered frames before the pixel data is input to a GPU for motion vector estimation, in accordance with embodiments disclosed herein.
Figure 14:
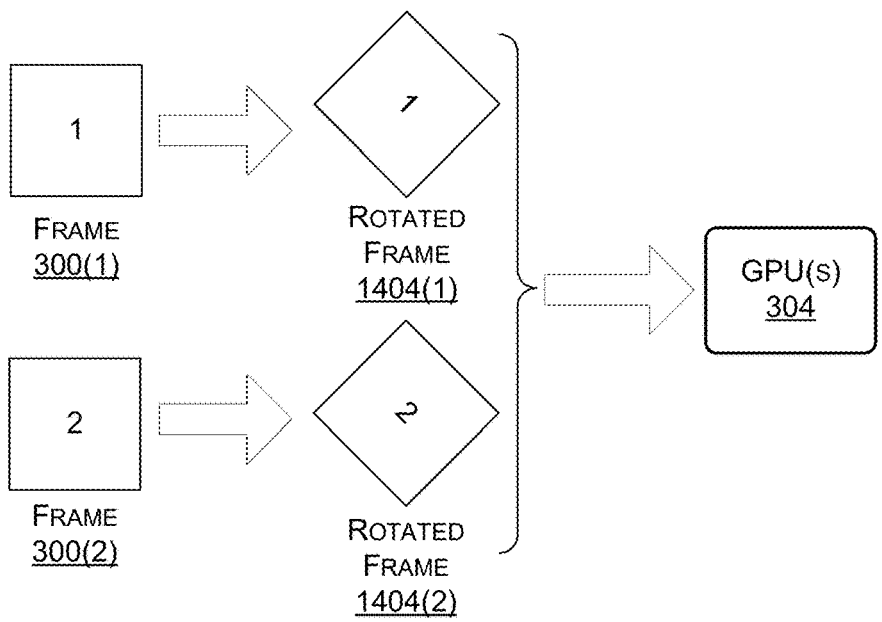

FIG. 14 is a flow diagram of an example process 1400 for rotating previously-rendered frames before the pixel data is input to a GPU for motion vector estimation, in accordance with embodiments disclosed herein. For discussion purposes, the process 1400 is described with reference to the previous figures.

At 1402, logic (e.g., logic of the host computer 106) may rotate a first frame 300(1), of multiple previously-rendered frames 300 whose pixel data 110(1) is to be provided as input to the GPU 304, by an amount of rotation to obtain a first rotated frame 1404(1).

At 1406, the logic (e.g., logic of the host computer 106) may rotate a second frame 300(2), of the multiple previously-rendered frames 300, by an amount of rotation to obtain a second rotated frame 1404(2).

At 1408, the logic (e.g., logic of the host computer 106) may provide pixel data of the rotated frames 1404(1) and 1404(2) as input to a GPU 304. The process 1400 may continue from block 1408 to block 504 of the process 500 (as shown by the off-page reference "A"). Accordingly, an array of motion vectors 110(2) may be received from the GPU 304 at block 504 based on the pixel data provided as input to the GPU 304 at block 1408, and the remaining operations of the motion smoothing algorithm of FIG. 5 may be performed to render a re-projected frame 300(3) that is motion smoothed.

The process 1400 may mitigate the effect of horizontal and/or vertical architectural edges in a scene from causing "strange" motion vectors that are not truly representative of a moving or animating object. The multiple previously-rendered frames 300(1) and 300(2) may be rotated at blocks 1402 and 1406 by the same amount of rotation, or, each frame 300(1) and 300(2) may be rotated by different amounts of rotation at blocks 1402 and 1406, respectively. In some embodiments, the amount of rotation of each frame at blocks 1402 and 1406 is predefined (e.g., rotate the input frames 300(1) and 300(2) by 45 degrees). Rotating the frames 300(1) and 300(2) by 45 degrees may cause the horizontal and vertical edges in a scene to be oriented diagonally, and, as a result, these diagonal edges may not cause as many "strange" motion vectors to be generated by the video encoder of the GPU 304. In some embodiments, the amount of rotation of each frame at blocks 1402 and 1406 may be a random amount of rotation for each frame 300. This may temporally hide any edges that may align with 45 degrees.

Figure 15:
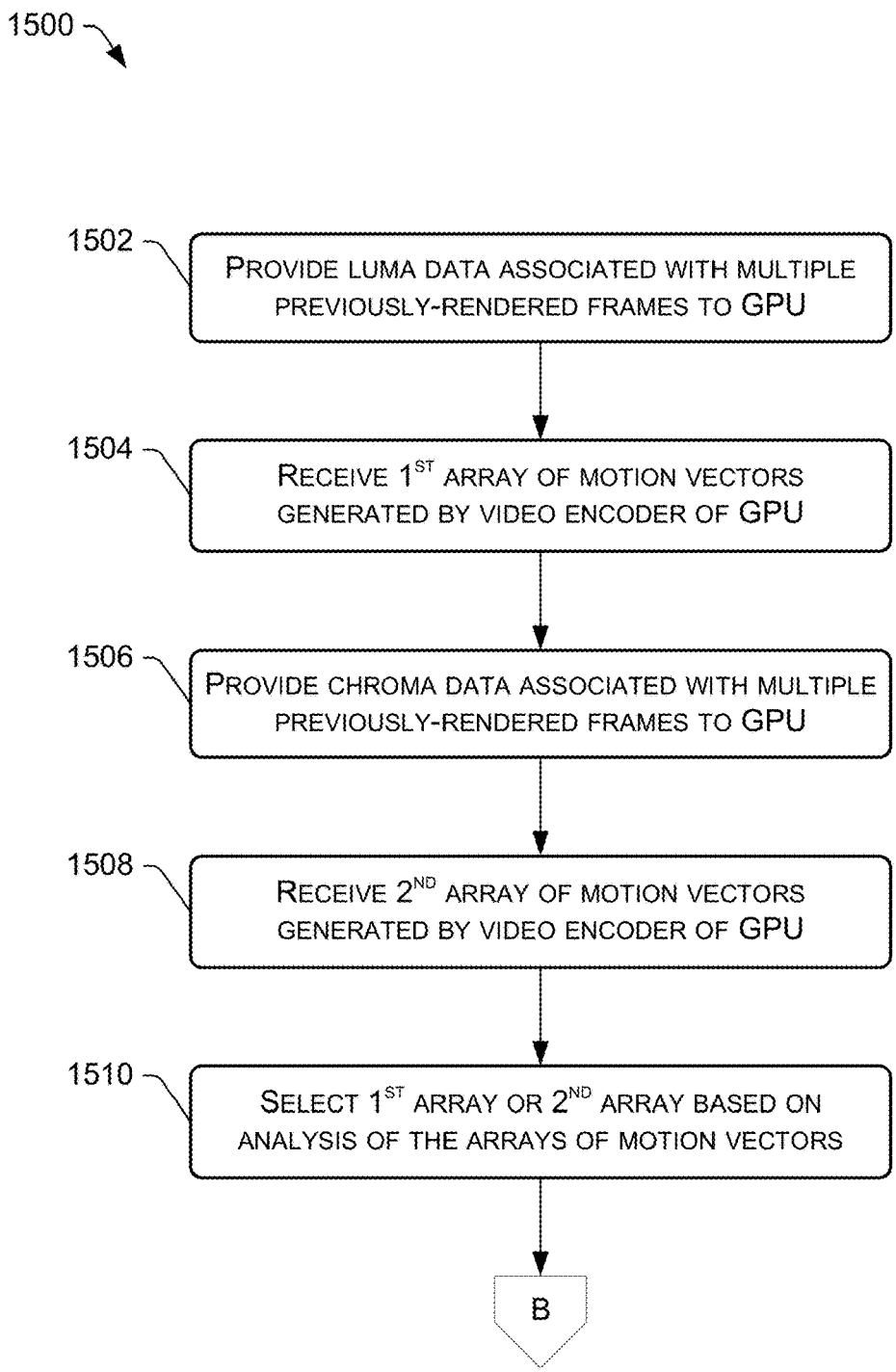
FIG. 15 is a flow diagram of an example process for selecting between arrays of motion vectors that are generated based on luma data and chroma data of previously-rendered frames, in accordance with embodiments disclosed herein.

FIG. 15 is a flow diagram of an example process 1500 for selecting between arrays of motion vectors that are generated based on luma data and chroma data of previously-rendered frames, in accordance with embodiments disclosed herein. For discussion purposes, the process 1500 is described with reference to the previous figures. Furthermore, as shown by the off-page reference "B" in FIGS. 5 and 15, the process 1500 may represent operations that are performed prior to the operations at block 506 of FIG. 5, and the process 500 may, in some embodiments, continue with the operations of blocks 506-514.

At 1502, logic (e.g., logic of the host computer 106) may provide luma data associated with previously-rendered frames 300 as input to a GPU 304. For example, first pixel data 110(1)(1) associated with a first frame 300(1) may include first luma data, first chroma data, and/or additional types of data. Similarly, second pixel data 110(1)(2) associated with the second frame 300(2) may include similar types of data, such as second luma data, second chroma data, and so on. Accordingly, the first luma data and the second luma data may be provided as input to the GPU 304 at block 1502.

At 1504, the logic (e.g., logic of the host computer 106) may receive, from the GPU 304, a first array of motion vectors 110(2) generated by the video encoder of the GPU 304 based at least in part on the first luma data and the second luma data.

At 1506, the logic (e.g., logic of the host computer 106) may provide first chroma data associated with the first frame 300(1) and second chroma data associated with the second frame 300(2) as input to the GPU 304.

At 1508, the logic (e.g., logic of the host computer 106) may receive, from the GPU 304, a second array of motion vectors 110(2) generated by the video encoder of the GPU 304 based at least in part on the first chroma data and the second chroma data.

At 1510, logic (e.g., logic of the host computer 106, or logic of the HMD 102 after receipt of the multiple arrays of motion vectors 110(2)) may select one of the first array of motion vectors 110(2) or the second array of motion vectors 110(2) as a selected array of motion vectors based on an analysis of the first array of motion vectors 110(2) and the second array of motion vectors 110(2). For instance, a selection algorithm may be based on the magnitudes and/or the directions of the motion vectors 110(2) in each field of motion vectors 110(3) to select one that is the least erratic, as an example. For instance, when bright flashing light (e.g., a virtual explosion) occurs in the second frame 300(2), the luma data may cause the GPU 304 to output motion vectors 110(2) with magnitudes exceeding some threshold magnitude, whereas the chroma data for the same previously-rendered frames 300 may cause the GPU 304 to output motion vectors 110(2) that do not include such motion vectors with extremely large magnitudes. In this case, the array of motion vectors 110(2) generated from the chroma data may be selected at block 1510. This is merely one example of a selection algorithm, and others may be employed. As mentioned, the process 1500 may continue from block 1510 to block 506 of the process 500 where pixel data 110(1)(3) for a re-projected frame 300(3) is modified based on the selected array of motion vectors 110(2) from block 1510.

Figure 16:
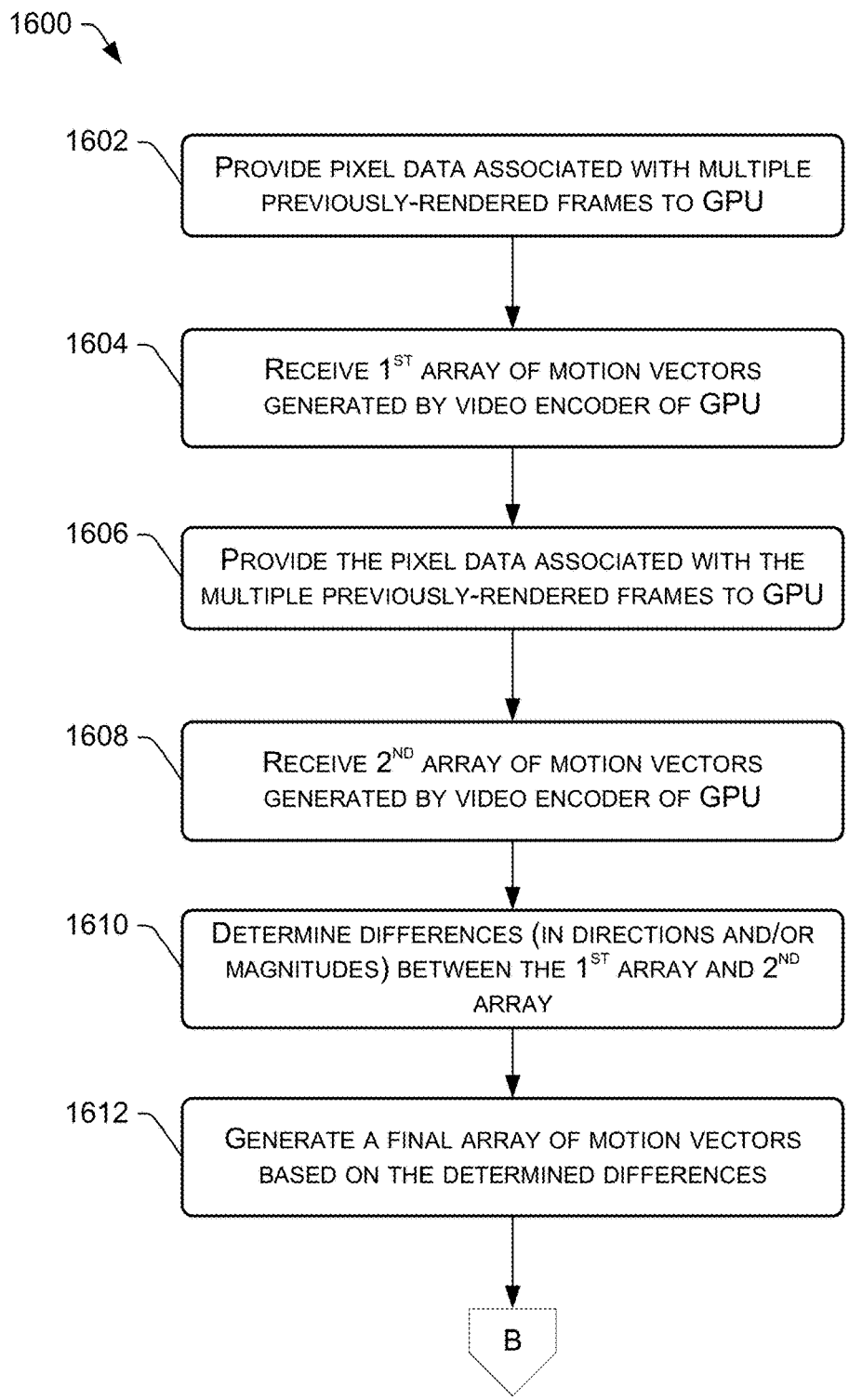
FIG. 16 is a flow diagram of an example process for obtaining multiple arrays of motion vectors, determining differences between the arrays, and generating a final array of motion vectors based on the determined differences for motion smoothing, in accordance with embodiments disclosed herein.

FIG. 16 is a flow diagram of an example process 1600 for obtaining multiple arrays of motion vectors, determining differences between the arrays, and generating a final array of motion vectors based on the determined differences for motion smoothing, in accordance with embodiments disclosed herein. For discussion purposes, the process 1600 is described with reference to the previous figures. Furthermore, as shown by the off-page reference "B" in FIGS. 5 and 16, the process 1600 may represent operations that are performed prior to the operations at block 506 of FIG. 5, and the process 500 may, in some embodiments, continue with the operations of blocks 506-514.

At 1602, logic (e.g., logic of the host computer 106) may provide first pixel data 110(1)(1) associated with previously-rendered frames 300 as input to a GPU 304. The operation(s) performed at block 1602 may be similar to those described with respect to block 502 of the process 500.

At 1604, the logic (e.g., logic of the host computer 106) may receive a first array of motion vectors 110(2) from the GPU 304 based on the first pixel data 110(1)(1) provided as input at block 1602.

At 1606, the logic (e.g., logic of the host computer 106) may provide second pixel data 110(1)(2) associated with previously-rendered frames 300 as input to a GPU 304.

At 1608, the logic (e.g., logic of the host computer 106) may receive, from the GPU 304, and based at least in part on the second pixel data 110(1)(2), a second array of motion vectors 110(2).

At 1610, logic (e.g., logic of the host computer 106, or logic of the HMD 102 after receipt of the arrays of motion vectors 110(2) from the host computer 106) may determine differences in directions and/or magnitudes of motion vectors 110(2) between the first array 110(2) and the second array 110(2). For example, a comparison can be made between a motion vector 404 in the first array 110(2) and a corresponding motion vector 404 in the second array 110(2) to determine if the motion vectors are different in terms of either or both of direction or magnitude of the motion vectors, and if so, an amount by which they are different.

At 1612, the logic (e.g., logic of the host computer 106, or logic of the HMD 102) may generate a final array of motion vectors 110(2) based at least in part on the differences between the first array of motion vectors 110(2), or the second array of motion vectors 110(2), as determined at block 1610. For example, the final array of motion vectors 110(2) may represent a set of motion vectors that results from attenuating individual ones of the motion vectors in the first array 110(2) or the second array 110(2), or from attenuating averaged motion vectors that represent averages of the corresponding motion vectors in each array 110(2). As mentioned, the process 1600 may continue from block 1612 to block 506 of the process 500 where pixel data 110(1)(3) for a re-projected frame 300(3) is modified based on the final array of motion vectors 110(2) generated at block 1612.

As an illustrative example of how the process 1600 can be used, consider an example where the first array of motion vectors 110(2) is received at block 1604 based on pixel data 110(1) of input frames 300(1) and 300(2) in their original ("y-up") orientation, and the second array of motion vectors 110(2) is received at block 1608 based on pixel data 110(1) of input frames 300(1) and 300(2) that have been rotated 45 degrees. This concept of rotating the input image frames 300 was described with reference to FIG. 14. Thus, in this illustrative example, pixel data 110(1) for the first frame 300(1) and the second frame 300(2) may be provided as input at block 1602 to generate the first array of motion vectors 110(2), and pixel data 110(1) for the first rotated frame 1404(1) and the second rotated frame 1404(2) may be provided as input at block 1606 to generate the second array of motion vectors 110(2). In this illustrative example, the two arrays of motion vectors 110(2) may be realigned (e.g., by rotating the second array 110(2) by 45 degrees in the reverse direction) and then compared to determine mismatches by looking at the angular differences (direction)

and/or length differences (magnitude) between the corresponding vectors in both arrays 110(2). It may be the case that actual motion (e.g., moving or animating objects in the scene) may generate very similar arrays of motion vectors for the rotated input frames 300, while incorrectly detected motion may generate very different arrays of motion vectors. In this illustrative example, the final array of motion vectors 110(2) can be generated at block 1612 by attenuating the length of the average of two corresponding vectors in each array 110(2) by the dot product of the two normalized vectors. In some embodiments, an attenuation texture, like the one described with reference to FIGS. 10 and 11, may be utilized at block 1612 to generate the final array. For instance, the set of delta vectors determined at block 1102 of the process 1100 may be based on deltas between the first array of motion vectors 110(2) received at block 1604 and the second array of motion vectors 110(2) received at block 1608, and the resulting attenuation texture may be used at block 1612 to attenuate the first array 110(2), the second array 110(2), or a combination (e.g., average) of vectors between the two arrays 110(2).

As another illustrative example of how the process 1600 can be used, consider an example where a first mip level (mipmap level) is generated for the input textures of the multiple previously-rendered frames 300, and the corresponding pixel data 110(1) for this first mip level is provided as input to the GPU 304 at block 1602 to generate the first array of motion vectors 110(2). Meanwhile, a second mip level may be generated for the input textures of the multiple previously-rendered frames 300, and the corresponding pixel data 110(1) for this second mip level may be provided as input to the GPU 304 at block 1606 to generate the second array of motion vectors 110(2). This can even be done for any number of mip levels to generate any number of corresponding arrays of motion vectors. In some embodiments, 3 or 4 mip levels of the input textures can be generated so that 3 or 4 arrays of motion vectors 110(2) are received prior to block 1610. In some embodiments, each mip level is half the width and height of the previous mip level (e.g., 25% of the area). At block 1610, in this illustrative example, differences between pairs of arrays 110(2) generated from different mip levels may be determined, and, at block 1612, a final array of motion vectors 110(2) may be generated based on the determined differences. For instance, the logic may detect anomalies across the multiple arrays of motion vectors 110(2) for different mip levels, and the anomalous motion vectors can be attenuated (e.g., decreased to zero). This example of using different mip levels of the input frames 300 to generate different arrays of motion vectors 110(2) may help in situations where there is a large area of a repeating pattern (e.g., wallpaper) in a scene, and where the video encoder of the GPU 304 might otherwise generate lots of high magnitude motion vectors thinking that there is lots of motion due to the frequency of the repeating pattern relative to the motion vector resolution, even though there are no moving or animating objects. Accordingly, the process 1600, when used to generate arrays of motion vectors 110(2) for different mip levels, may help detect anomalies across different frequencies of the repeating pattern, and, when detected, an attenuation texture can be used to attenuate (e.g., zero out) those motion vectors 110(2).

As yet another example of how the process 1600 can be used, consider an example where the multiple arrays 110(2) are obtained at different resolutions, and the differences are determined at block 1610 by comparing a single motion vector in the first array 110(2) to multiple corresponding motion vectors in the second array 110(2) (e.g., to an average, in terms of direction and/or magnitude, of the multiple corresponding motion vectors in the second array 110(2)). Using arrays of motion vectors 110(2) at different resolutions may yield differences that are useful for generating a final array of motion vectors at block 1612.

Figure 17:
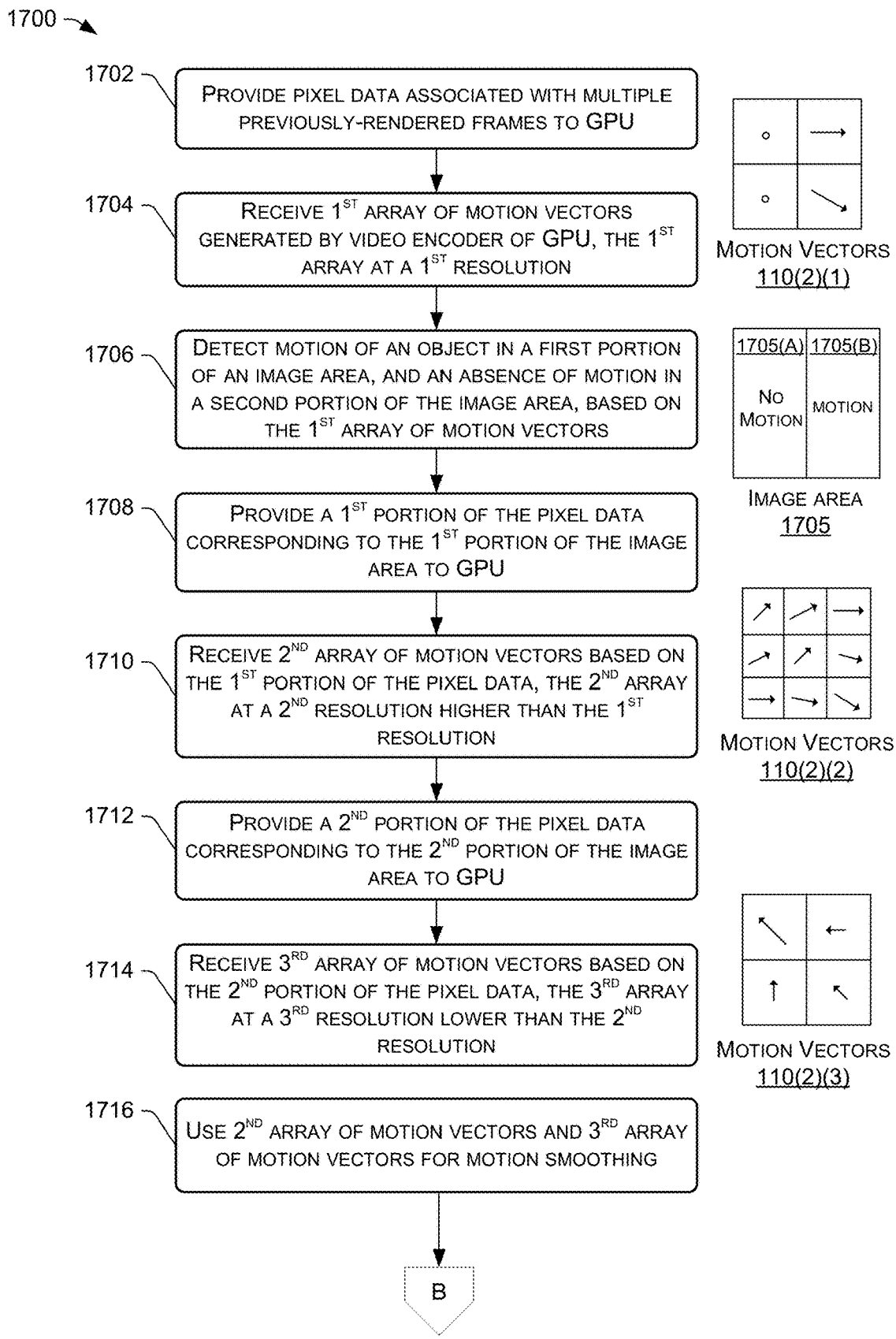
FIG. 17 is a flow diagram of an example process for obtaining multiple arrays of motion vectors at different resolutions for different portions of the image area, in accordance with embodiments disclosed herein.

FIG. 17 is a flow diagram of an example process 1700 for obtaining multiple arrays of motion vectors at different resolutions for different portions of the image area, in accordance with embodiments disclosed herein. For discussion purposes, the process 1700 is described with reference to the previous figures. Furthermore, as shown by the off-page reference "B" in FIGS. 5 and 17, the process 1700 may represent operations that are performed prior to the operations at block 506 of FIG. 5, and the process 500 may, in some embodiments, continue with the operations of blocks 506-514.

At 1702, logic (e.g., logic of the host computer 106) may provide pixel data 110(1) associated with previously-rendered frames 300 as input to a GPU 304. The operation(s) performed at block 1702 may be similar to those described with respect to block 502 of the process 500.

At 1704, the logic (e.g., logic of the host computer 106) may receive a first array of motion vectors 110(2)(1) from the GPU 304, the first array of motion vectors 110(2)(1) being received at, or otherwise up-sampled or down-sampled to, a first resolution.

At 1706, the logic (e.g., logic of the host computer 106) may detect an absence of motion in a first portion 1705(A) of an image area 1705 spanning a display based at least in part on the first array of motion vectors 110(2)(1), and may detect motion of an object 302 in a second portion 1705(B) of the image area 1705 based at least in part on the first array of motion vectors 110(2)(1). For instance, non-zero motion vectors may be detected in a right half of the image area 1705, while the left half of the image area 1705 may contain zero-valued motion vectors without any non-zero motion vectors.

At 1708, the logic (e.g., logic of the host computer 106) may provide a first portion of the first pixel data 110(1)(1) (associated with the first frame 300(1)) and a first portion of the second pixel data 110(1)(2) (associated with the second frame 300(2)) as input to the GPU 304. The first portion of the first pixel data 110(1)(1) and the first portion of the second pixel data 110(1)(2) may each correspond to the first portion 1705(A) of the image area 1705 where an absence of motion was detected at block 1706.

At 1710, the logic (e.g., logic of the host computer 106) may receive, from the GPU 304, a second array of motion vectors 110(2)(2) generated by the video encoder of the GPU 304 based at least in part on the first portion of the first pixel data 110(1)(1) and the first portion of the second pixel data 110(1)(2). This second array of motion vectors 110(2)(2) may be generated at a second resolution that is a higher resolution than the first resolution of the first array of motion vectors 110(2)(1). Obtaining a higher resolution motion vector field 110(2)(2) for the first portion 1705(A) of the image area 1705 where an absence of motion was detected may be based on the notion that a motion vector field 110(2)(2) at a higher resolution may help detect small-scale movement in the first portion 1705(A) of the image area 1705 where large-scale movement was not detected.

At 1712, the logic (e.g., logic of the host computer 106) may provide a second portion of the first pixel data 110(1)(1) (associated with the first frame 300(1)) and a second portion of the second pixel data 110(1)(2) (associated with the second frame 300(2)) as input to the GPU 304. The second portion of the first pixel data 110(1)(1) and the second portion of the second pixel data 110(1)(2) may each correspond to the second portion 1705(B) of the image area 1705 where motion of an object 302 was detected at block 1706.

At 1714, the logic (e.g., logic of the host computer 106) may receive, from the GPU 304, a third array of motion vectors 110(2)(3) generated by the video encoder of the GPU 304 based at least in part on the second portion of the first pixel data 110(1)(1) and the second portion of the second pixel data 110(1)(2). This third array of motion vectors 110(2)(3) may be generated at a third resolution that is a lower resolution than the second resolution of the second array of motion vectors 110(2)(2). This relatively lower resolution motion vector field 110(2)(3) for the second portion 1705(B) of the image area 1705 where motion was detected may be based on the notion that a higher resolution motion vector field may not be necessary to detect the movement in the second portion 1705(B) of the image area 1705 where large-scale movement was already detected at the first resolution of the first motion vector field 110(2)(1).

At 1716, the logic (e.g., logic of the host computer 106, or logic of the HMD 102 after receipt of the arrays of motion vectors 110(2) from the host computer 106) may use the second array of motion vectors 110(2)(2) and the third array of motion vectors 110(2)(3) for motion smoothing. The process 1700 may continue from block 1716 to block 506 of the process 500 where pixel data 110(1)(3) for a re-projected frame 300(3) is modified based on the motion vectors 110(2) from block 1716. In an example, using multiple arrays of motion vectors at block 1716 for motion smoothing may include the operations described with reference to block 1612 of the process 1600.

Figure 18B:
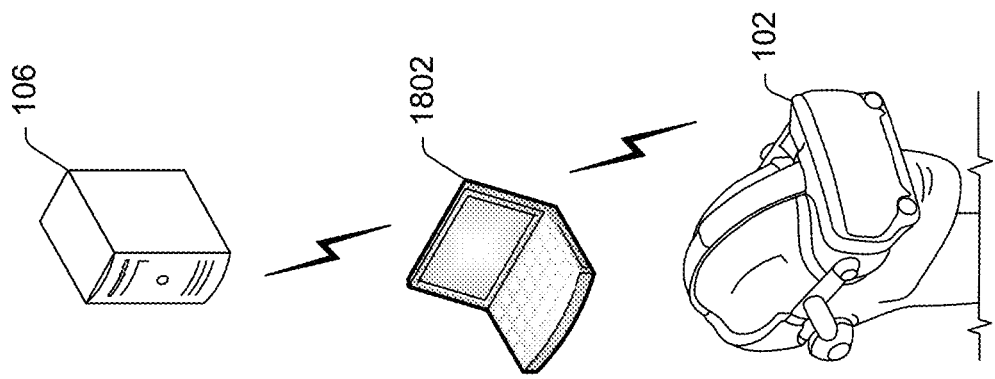
FIGS. 18A and 18B illustrate two alternative setups of a system that utilizes a HMD and a host computer, in accordance with embodiments disclosed herein.
Figure 18A:
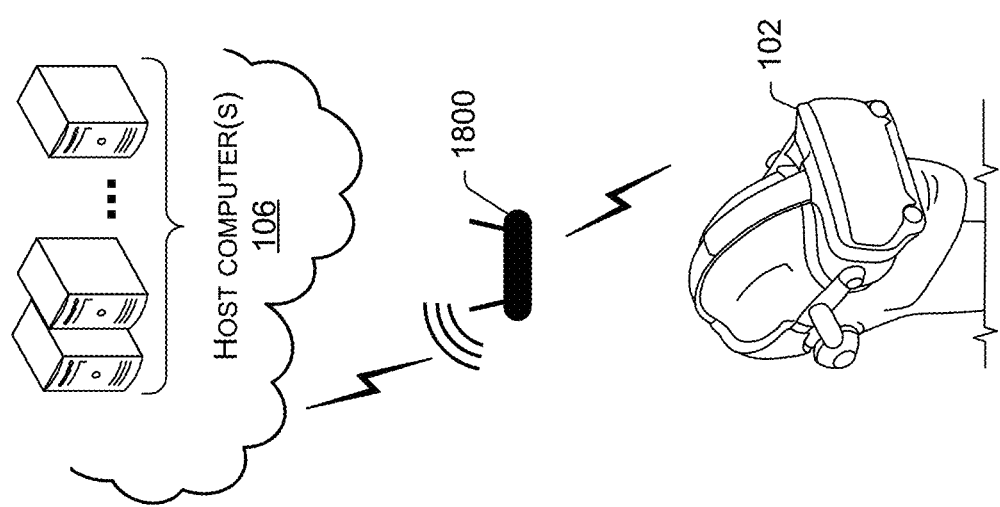

FIGS. 18A and 18B illustrate two alternative setups of a system that utilizes a HMD 102 and a host computer 106, in accordance with embodiments disclosed herein. As depicted in FIG. 1, an example implementation is where the host computer 106 is collocated in an environment with the HMD 102 worn by the user 104. For example, the host computer 106 may be located in the user's 104 house while the user 104 is using the HMD 102 in the house, regardless of whether the host computer 106 is located in the same room or a different room as the HMD 102. Alternatively, the host computer 106 in the form of a mobile computing device (e.g., a tablet or laptop) may be carried in a backpack on the back of the user 104, thereby allowing for greater mobility. For example, the user 104 could be located in a public park while using such a system.

FIG. 18A shows an alternative implementation where the host computer 106 represents one or more server computers located at a geographically remote location with respect to the HMD 102. In this case, the HMD 102 may be communicatively coupled to the host computer(s) 106 via an access point (AP) 1800, such as a wireless AP (WAP), a base station, etc. In an illustrative example, data is exchanged (e.g., streamed) between the host computer 106 and the HMD 102 via the AP 1800, such as by streaming data over the Internet.

FIG. 18B shows yet another alternative implementation where the host computer 106 is communicatively coupled to the HMD 102 via an intermediate computing device 1802, such as a laptop or a tablet computer. A difference between FIGS. 18A and 18B is that the AP 1800 in FIG. 18A may simply act as a data routing device that does not perform rendering, while the intermediate computing device 1802 of FIG. 18B may perform a portion of the rendering workload. That is, instead of bifurcating the rendering workload between the host computer 106 and the HMD 102, the rendering workload can be partitioned between more than two devices, such as three device: the host computer 106, the intermediate computing device 1802, and the HMD 102. In the scenario of FIG. 18B, the host computer 106 may generate pixel data 110(1), as described herein, the intermediate computing device 1802 may perform a first set of rendering operations to modify the pixel data 110(1), and the HMD 102 may perform a final set of rendering operations to modify the modified pixel data.

Figure 19:
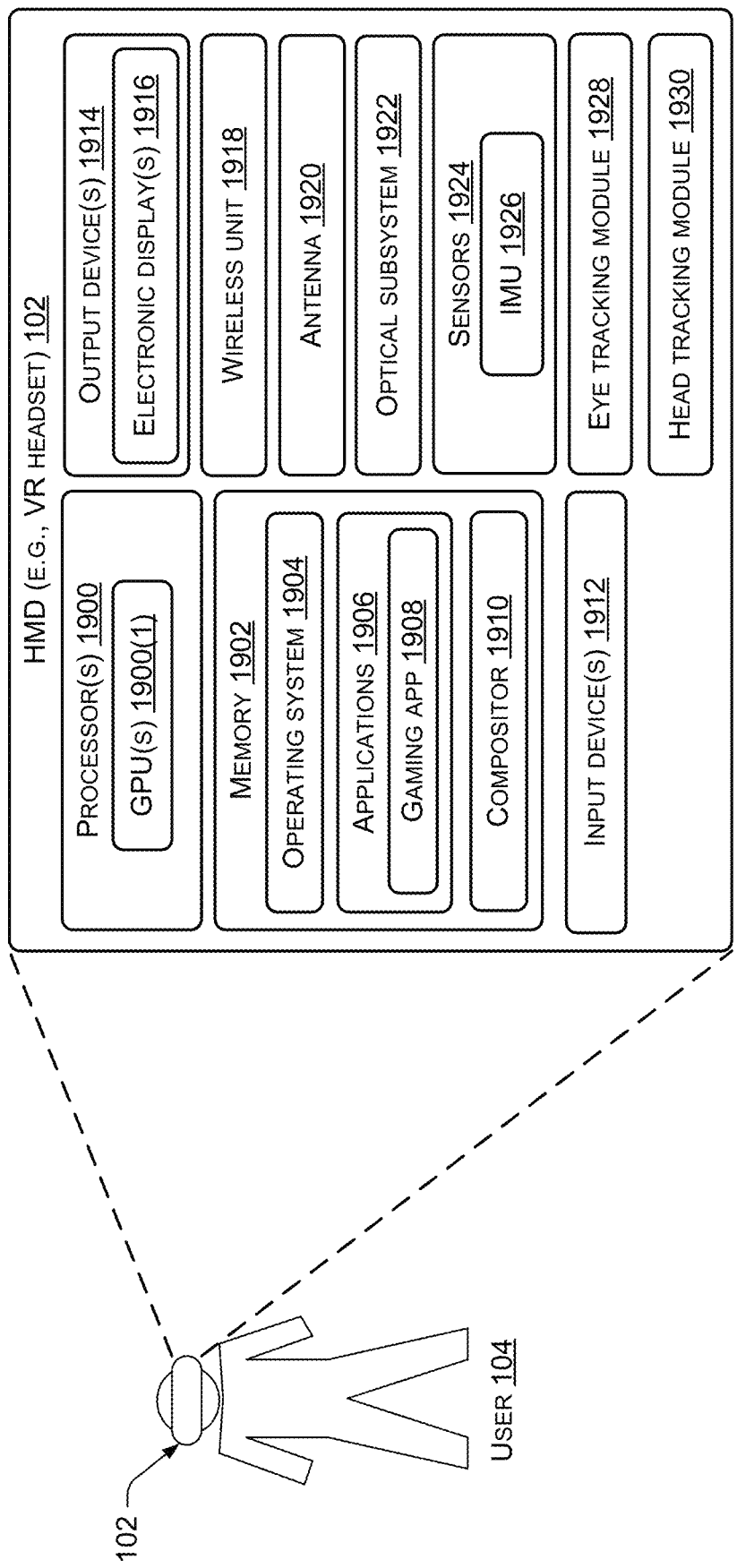
FIG. 19 illustrates example components of a wearable device, such as a VR headset, in which the techniques disclosed herein can be implemented.

FIG. 19 illustrates example components of a HMD 1900, such as a VR headset, according to the embodiments disclosed herein may be embedded. The HMD 102 may be implemented as a device that is to be worn by a user 104 (e.g., on a head of the user 104). In some embodiments, the HMD 102 may be head-mountable, such as by allowing a user 104 to secure the HMD 102 on his/her head using a securing mechanism (e.g., an adjustable band) that is sized to fit around a head of a user 104. In some embodiments, the HMD 102 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 102. However, it is to be appreciated that these types of devices are merely example of a HMD 102, and it is to be appreciated that the HMD 102 may be implemented in a variety of other form factors.

In the illustrated implementation, the HMD 102 includes one or more processors 1900 and memory 1902 (e.g., computer-readable media 1902). In some implementations, the processors(s) 1900 may include a central processing unit (CPU), a GPU(s) 1900(1), both CPU and GPU 1900(1), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1900 may possess its own local memory, which also may store program modules, program data, and/or one or more operating systems.

The memory 1902 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1902 may be implemented as computer-readable storage media ("CRSM"), which may be any available physical media accessible by the processor(s) 1900 to execute instructions stored on the memory 1902. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1900.

In general, the HMD 102 may include logic (e.g., software, hardware, and/or firmware, etc.) that is configured to implement the techniques, functionality, and/or operations described herein. The computer-readable media 1902 is shown as including various modules, such as instruction, datastores, and so forth, which may be configured to execute on the processor(s) 1900 for carrying out the techniques, functionality, and/or operations described herein. A few example functional modules are shown as stored in the computer-readable media 1902 and executable on the processor(s) 1900, although the same functionality may alternatively be implemented in hardware, firmware, or as a system on a chip (SOC), and/or other logic.

An operating system module 1904 may be configured to manage hardware within and coupled to the HMD 102 for the benefit of other modules. In addition, in some instances the HMD 102 may include one or more applications 1906 stored in the memory 1902 or otherwise accessible to the HMD 102. In this implementation, the application(s) 1906 includes a gaming application 1908. However, the HMD 102 may include any number or type of applications and is not limited to the specific example shown here. A compositor 1910, in combination with other logic of the HMD 102, may be configured to perform the motion smoothing techniques described herein to render motion-smoothed, re-projected frames 300.

Generally, the HMD 102 has input devices 1912 and output devices 1914. The input devices 1912 may include control buttons. In some implementations, one or more microphones may function as input devices 1912 to receive audio input, such as user voice input. In some implementations, one or more cameras or other types of sensors (e.g., inertial measurement unit (IMU)) may function as input devices 1912 to receive gestural input, such as a hand and/or head motion of the user 104. In some embodiments, additional input devices 1912 may be provided in the form of a keyboard, keypad, mouse, touch screen, joystick, and the like. In other embodiments, the HMD 102 may omit a keyboard, keypad, or other similar forms of mechanical input. Instead, the HMD 102 may be implemented relatively simplistic forms of input device 1912, a network interface (wireless or wire-based), power, and processing/memory capabilities. For example, a limited set of one or more input components may be employed (e.g., a dedicated button to initiate a configuration, power on/off, etc.) so that the HMD 102 can thereafter be used. In one implementation, the input device(s) 1912 may include control mechanisms, such as basic volume control button(s) for increasing/decreasing volume, as well as power and reset buttons.

The output devices 1914 may include a display(s) 1916, which may include one or multiple display panels (e.g., a stereo pair of display panels). The output devices 1914 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 102 may further include a wireless unit 1918 coupled to an antenna 1920 to facilitate a wireless connection to a network. The wireless unit 1918 may implement one or more of various wireless technologies, such as Wi-Fi, Bluetooth, radio frequency (RF), and so on. It is to be appreciated that the HMD 102 may further include physical ports to facilitate a wired connection to a network, a connected peripheral device (including the host computer 106, such as a PC, game console, etc.), or a plug-in network device that communicates with other wireless networks.

The HMD 102 may further include optical subsystem 1922 that directs light from the electronic display(s) 1916 to a user's eye(s) using one or more optical elements. The optical subsystem 1922 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 1922 may have one or more coatings, such as anti-reflective coatings. Magnification of the image light by optical subsystem 1922 allows electronic display(s) 1916 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 1922 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to electronic display(s) 1916 for display is pre-distorted, and optical subsystem 1922 corrects the distortion when it receives image light from electronic display(s) 1916 generated based on the content.

The HMD 102 may further include one or more sensors 1924, such as sensors used to generate motion, position, and orientation data. These sensors 1924 may be or include gyroscopes, accelerometers, magnetometers, video cameras, color sensors, or other motion, position, and orientation sensors. The sensors 1924 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 102 may include light sensors that are sensitive to light (e.g., infrared or visible light) that is projected or broadcast by base stations in the environment of the HMD 102.

In an example, the sensor(s) 1924 may include an inertial measurement unit (IMU) 1926. IMU 1926 may be an electronic device that generates calibration data based on measurement signals received from accelerometers, gyroscopes, magnetometers, and/or other sensors suitable for detecting motion, correcting error associated with IMU 1926, or some combination thereof. Based on the measurement signals such motion-based sensors, such as the IMU 1926, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). IMU 1926 can, for example, rapidly sample the measurement signals and calculate the estimated position of HMD 102 from the sampled data. For example, IMU 1926 may integrate measurement signals received from the accelerometers over time to estimate a velocity vector and integrates the velocity vector over time to determine an estimated position of a reference point on HMD 102. The reference point is a point that may be used to describe the position of the MID 1900. While the reference point may generally be defined as a point in space, in various embodiments, reference point is defined as a point within FIMD 102 (e.g., a center of the IMU 1926). Alternatively, IMU 1926 provides the sampled measurement signals to an external console (or other computing device), which determines the calibration data.

The sensors 1924 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 1924 may include light sensors that are sensitive to light emitted by base stations in the environment of the HMD 102 for purposes of tracking position and/or orientation, pose, etc., of the HMD 102 in 3D space. The calculation of position and/or orientation may be based on timing characteristics of light pulses and the presence or absence of light detected by the sensors 1924.

The HMD 102 may further include an eye tracking module 1928. A camera or other optical sensor inside MID 102 may capture image information of a user's eyes, and eye tracking module 1928 may use the captured information to determine interpupillary distance, interocular distance, a three-dimensional (3D) position of each eye relative to HMD 102 (e.g., for distortion adjustment purposes), including a magnitude of torsion and rotation (i.e., roll, pitch, and yaw) and gaze directions for each eye. In one example, infrared light is emitted within HMD 102 and reflected from each eye. The reflected light is received or detected by a camera of the HMD 102 and analyzed to extract eye rotation from changes in the infrared light reflected by each eye. Many methods for tracking the eyes of a user 104 can be used by eye tracking module 1928. Accordingly, eye tracking module 1928 may track up to six degrees of freedom of each eye (i.e., 3D position, roll, pitch, and yaw) and at least a subset of the tracked quantities may be combined from two eyes of a user 104 to estimate a gaze point (i.e., a 3D location or position in the virtual scene Where the user is looking). For example, eye tracking module 1928 may integrate information from past measurements, measurements identifying a position of a user's 104 head, and 3D information describing a scene presented by electronic display(s) 1916. Thus, information for the position and orientation of the user's 104 eyes is used to determine the gaze point in a virtual scene presented by HMD 102 where the user 104 is looking.

The HMD 102 may further include a head tracking module 1930. The head tracking module 1930 may leverage one or more of the sensor 1924 to track head motion, including head rotation, of the user 104, as described above. For example, the head tracking module 1930 can track up to six degrees of freedom of the MID 102 (i.e., 3D position, roll, pitch, and yaw). These calculations can be made at every frame 300 of a series of frames 300 so that an application (e.g., a video game) can determine how to render a scene in the next frame 300 and/or so that the compositor 1910 can determine how to render a re-projected frame 300 in accordance with the head position and orientation. In some embodiments, the head tracking module 1930 is configured to predict a future position and/or orientation of the IBM 102 based on current and/or past data. This is because an application is asked to render a frame 300 before the user 104 actually sees the light (and, hence, the image) on the display(s) 1916. Accordingly, a next frame 300 can be rendered based on this future prediction of head position and/or orientation that was made at an earlier point in time, such as roughly 25-30 milliseconds (ms) prior to rendering the frame 300. In a distributed system where a host computer 106 is communicatively (e.g., wirelessly) coupled to the HMD 102, the future prediction of the head pose may be made 30 ms or more in advance of the illumination time for the frame 300 to account for network latency, compression operations, etc. Rotation data provided by the head tracking module 1930 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

Figure 20:
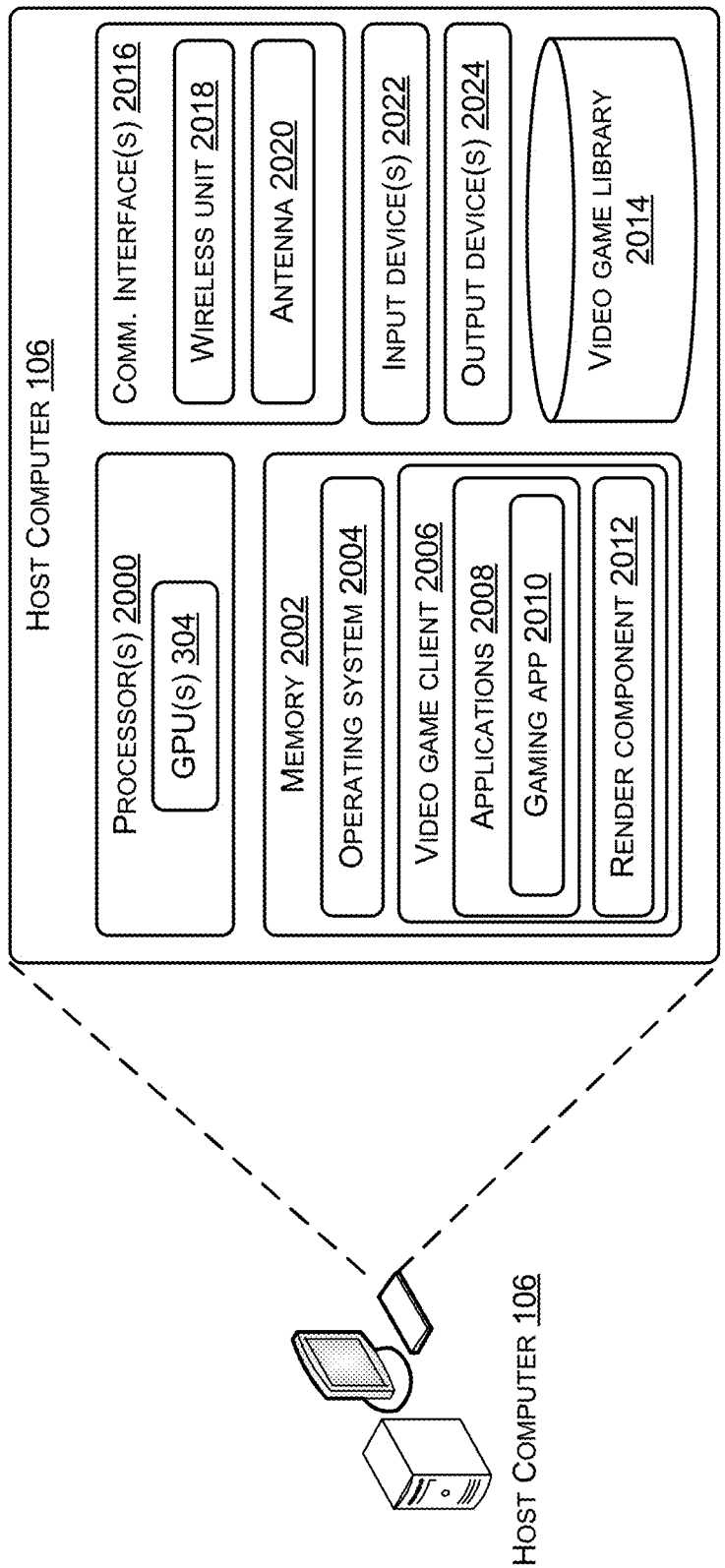
FIG. 20 illustrates example components of a host computer, in which the techniques disclosed herein can be implemented.

FIG. 20 illustrates example components of a host computer 106, in which the techniques disclosed herein can be implemented. In the illustrated implementation, the host computer 106 includes one or more processors 2000 and memory 2002 (e.g., computer-readable media 2002). In some implementations, the processors(s) 2000 may include a CPU(s), a GPU(s) 304, both CPU(s) and GPU(s) 304, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include FPGAs, ASICs, ASSPs, SOCs, CPLDs, etc. Additionally, each of the processor(s) 2000 may possess its own local memory, which also may store program modules, program data, and/or one or more operating systems.

The memory 2002 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, DVD or other optical storage, magnetic cassettes, magnetic tape, magnetic disk storage or other magnetic storage devices, RAID storage systems, or any other medium which can be used to store the desired information and which can be accessed by a computing device. The memory 2002 may be implemented as CRSM, which may be any available physical media accessible by the processor(s) 2000 to execute instructions stored on the memory 2002. In one basic implementation, CRSM may include RAM and Flash memory. In other implementations, CRSM may include, but is not limited to, ROM, EEPROM, or any other tangible medium which can be used to store the desired information and which can be accessed by the processor(s) 2000.

In general, the host computer 106 may include logic (e.g., software, hardware, and/or firmware, etc.) that is configured to implement the techniques, functionality, and/or operations described herein. The computer-readable media 2002 can include various modules, such as instruction, datastores, and so forth, which may be configured to execute on the processor(s) 2000 for carrying out the techniques, functionality, and/or operations described herein. Example functional modules in the form of an operating system 2004, a video game client 2006, including an applications 2008, such as a video game (or gaming app 2010), and a render component 2012 are shown as being stored in the computer-readable media 2002 and executable on the processor(s) 2000. In some embodiments, additional or different functional modules may be stored in the computer-readable media 2002 and executable on the processor(s) 2000.

The operating system 2004 may be configured to manage hardware within and coupled to the host computer 106 for the benefit of other modules. The video game client 2006 may represent an executable client application that is configured to launch and execute programs, such as video games (or video game programs). In other words, the video game client 2006 may include gaming software that is usable to play video games on the system that includes the HMD 102 and the host computer 106. With the video game client 2006 installed, the host computer 106 may then have the ability to receive (e.g., download, stream, etc.) video games from a remote system over the computer network (e.g., the Internet), and to execute the video games via the video game client 2006. Any type of content-distribution model can be utilized for this purpose, such as a direct purchase model where video games are individually purchasable for download and execution on a host computer 106, a subscription-based model, a content-distribution model where video games are rented or leased for a period of time, and so on. Accordingly, the host computer 106 may include one or more video games within a video game library 2014. These video games may be retrieved and executed by loading the video game client 2006. In an example, a user 104 may choose to play one of multiple video games they have purchased and downloaded to the video game library 2014 by loading the video game client 2006 and selecting a video game to start execution of the video game. The video game client 2006 may allow users to login to a video game service using credentials (e.g., a user account, password, etc.).

The application(s) 2008 executing on the host computer 106 can be a graphics-based application(s) 2008 (e.g., a video game 2010). An application 2008 is configured to generate pixel data for a series of frames, and the pixel data is ultimately used to present corresponding images on the display panel(s) 1916 of the HMD 102. During runtime, for a given frame, the render component 2012 may determine a predicted "illumination time" for the frame. This predicted "illumination time" for the frame represents a time at which light emitting elements of the display panel(s) 1916 of the HMD 102 will illuminate for the frame. This prediction can account for, among other things, the inherent latency of a wireless communication link between the host computer 106 and the HMD 102, as well as a predicted render time and/or a known scan-out time of the pixels from the frame buffer(s). In other words, the prediction may be different for a wireless communication link than it is for a wired communication link. For instance, the render component 2012 may, for a wired communication link, predict an illumination time that is a first amount of time in the future (e.g., about 22 milliseconds in the future), whereas the render component 2012 may, for a wireless communication link, predict an illumination time that is a second, greater amount of time in the future (e.g., about 44 milliseconds in the future), due to the inherent differences in latency when transferring data over a wired connection verses a wireless connection.

As described herein, the host computer 106 may also receive, from the HMD 102, the head tracking data 208 generated by the head tracking module 1930 of the HMD 102. This head tracking data 208 may be generated and/or sent at any suitable frequency, such as a frequency corresponding to the target frame rate and/or the refresh rate of the HMD 102, or a different (e.g., faster) frequency, such as 1000 Hz (or 1 sensor reading every 1 millisecond). The render component 2012 is configured to determine a predicted pose that the HMD 102 will be in at the predicted illumination time based at least in part on the head tracking data 208. The render component 2012 may then provide pose data indicative of the predicted pose to the executing application 2008 for rendering the frame (e.g., generating pixel data for the frame) based on the predicted pose, and the render component 2012 may obtain, from the application 2008, pixel data 110(1) associated with the frame 300.

The host computer 106 may further include a communications interface(s) 2016 including, without limitation, a wireless unit 2018 coupled to an antenna 2020 to facilitate a wireless connection to a network and/or to a second device, such as the HMD 102. The wireless unit 2018 may implement one or more of various wireless technologies, such as Wi-Fi, Bluetooth, radio frequency (RF), and so on. It is to be appreciated that the host computer 106 may further include physical ports to facilitate a wired connection to a network and/or a second device, such as the HMD 102.

Generally, the host computer 106 has input devices 2022 and output devices 2024. The input devices 2022 may a keyboard, keypad, mouse, touch screen, joystick, control buttons, microphones, cameras, and the like. The output devices 2024 may include, without limitation, a display(s), a light element (e.g., LED), a vibrator to create haptic sensations, a speaker(s) (e.g., headphones), and/or the like. It is to be appreciated that, in some embodiments, a subset of the components shown as being implemented on the HMD 102 may be implemented on the host computer 106 or another computing device that is separate from the HMD 102, and/or that a subset of the components shown as being implemented on the host computer 106 may be implemented on the HMD 102 or another computing device that is separate from the host computer 106.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) comprising:
one or more display panels;
a processor; and
memory storing computer-executable instructions that, when executed by the processor, cause the HMD to:
receive, from a host computer that is communicatively coupled to the HMD, an array of motion vectors representing compressed pixel data;
decompress the compressed pixel data to obtain pixel data;
generate a render mesh, wherein the render mesh comprises a tessellated mesh;
move, based at least in part on non-zero motion vectors among the array of motion vectors, vertices of the render mesh to different locations within the render mesh as moved vertices;
modify the pixel data to obtain modified pixel data, wherein the pixel data is modified based at least in part on:
a predicted pose of the HMD; and the moved vertices, wherein modifying the pixel data based at least in part on the moved vertices comprises moving pixel values of the pixel data in accordance with the moved vertices of the render mesh to obtain the modified pixel data; and present an image on the one or more display panels based at least in part on the modified pixel data.

2. The HMD of claim 1, wherein the vertices are moved:
in directions of the non-zero motion vectors; and
by amounts corresponding to magnitudes of the non-zero motion vectors.

3. The HMD of claim 1, wherein the computer-executable instructions, when executed by the processor, further cause the HMD to extract the array of motion vectors from an encoded data stream.

4. The HMD of claim 1, wherein:
the host computer is wirelessly coupled to the HMD; and
the array of motion vectors is received wirelessly from the host computer.

5. The HMD of claim 1, wherein the computer-executable instructions, when executed by the processor, further cause the HMD to:
apply a filter to the array of motion vectors to obtain a modified array of motion vectors,
wherein modifying the pixel data comprises modifying the pixel data based at least in part on the modified array of motion vectors.

6. A method comprising:
receiving, by a head-mounted display (HMD), from a host computer, an array of motion vectors representing compressed pixel data;
decompressing, by the HMD, the compressed pixel data to obtain pixel data;
generating, by the HMD, a render mesh, wherein the render mesh comprises a tessellated mesh;
moving, based at least in part on non-zero motion vectors among the array of motion vectors, vertices of the render mesh to different locations within the render mesh as moved vertices;
modifying, by the HMD, the pixel data based at least in part on the moved vertices to obtain modified pixel data, wherein the modifying of the pixel data based at least in part on the moved vertices comprises moving pixel values of the pixel data in accordance with the moved vertices of the render mesh to obtain the modified pixel data; and
presenting an image on one or more display panels of the HMD based at least in part on the modified pixel data.

7. The method of claim 6, further comprising, prior to the modifying of the pixel data:
caching the pixel data in memory of the HMD as cached pixel data;
determining that the cached pixel data represents the most recently decompressed pixel data available to the HMD; and
retrieving the cached pixel data from the memory of the HMD.

8. The method of claim 6, further comprising extracting the array of motion vectors from an encoded data stream.

9. The method of claim 6, further comprising, prior to the presenting of the image:
receiving, by the HMD, from the host computer, pose data indicative of a predicted pose of the HMD that was used by an application executing on the host computer to generate the pixel data,
wherein the modifying of the pixel data is further based at least in part on a comparison between the predicted pose and an updated pose prediction of the HMD.

10. The method of claim 6, further comprising, prior to the presenting of the image:
receiving, by the HMD, from the host computer, depth data representing Z-buffer data output by an application executing on the host computer,
wherein the modifying of the pixel data is further based at least in part on the depth data.

11. The method of claim 6, further comprising:
applying, by the HMD, a filter to the array of motion vectors to obtain a modified array of motion vectors,
wherein the modifying of the pixel data comprises modifying the pixel data based on of the modified array of motion vectors.

12. A display system comprising:
one or more display panels;
a processor; and
memory storing computer-executable instructions that, when executed by the processor, cause the display system to:
receive, from a host computer, an array of motion vectors representing compressed pixel data;
decompress the compressed pixel data to obtain pixel data;
generate a render mesh, wherein the render mesh comprises a tessellated mesh;
move, based at least in part on non-zero motion vectors among the array of motion vectors, vertices of the render mesh to different locations within the render mesh as moved vertices;
modify the pixel data based at least in part on the moved vertices to obtain modified pixel data, wherein modifying the pixel data based at least in part on the moved vertices comprises moving pixel values of the pixel data in accordance with the moved vertices of the render mesh to obtain the modified pixel data; and
present an image on the one or more display panels based at least in part on the modified pixel data.

13. The display system of claim 12, wherein the computer-executable instructions, when executed by the processor, cause the display system to, prior to modifying the pixel data:
cache the pixel data in the memory as cached pixel data;
determine that the cached pixel data represents the most recently decompressed pixel data available to the HMD; and
retrieve the cached pixel data from the memory.

14. The display system of claim 12, wherein:
the host computer is wirelessly coupled to the display system; and
the array of motion vectors is received wirelessly from the host computer.

15. The display system of claim 12, wherein the computer-executable instructions, when executed by the processor, cause the display system to, prior to presenting the image:
receive, from the host computer, depth data representing Z-buffer data output by an application executing on the host computer,
wherein modifying the pixel data is further based at least in part on the depth data.

16. The display system of claim 12, wherein the computer-executable instructions, when executed by the processor, cause the display system to:

apply a filter to the array of motion vectors to obtain a modified array of motion vectors, wherein modifying the pixel data comprises modifying the pixel data based on of the modified array of motion vectors.

17. The display system of claim 12, wherein the display system comprises at least one of a virtual reality (VR) headset or an augmented reality (AR) headset.

18. The display system of claim 12, wherein the computer-executable instructions, when executed by the processor, further cause the display system to extract the array of motion vectors from an encoded data stream.

19. The HMD of claim 1, wherein the computer-executable instructions, when executed by the processor, further cause the HMD to, prior to presenting the image:

receive, from the host computer, depth data representing Z-buffer data output by an application executing on the host computer, wherein modifying the pixel data is further based at least in part on the depth data.

20. The HMD of claim 1, wherein the computer-executable instructions, when executed by the processor, further cause the HMD to, prior to modifying the pixel data:

cache the pixel data in the memory as cached pixel data;

determine that the cached pixel data represents the most recently decompressed pixel data available to the HMD; and retrieve the cached pixel data from the memory.

* * * * *